United States Patent [19]
Duree et al.

[11] Patent Number: 5,940,393
[45] Date of Patent: Aug. 17, 1999

[54] TELECOMMUNICATIONS SYSTEM WITH A CONNECTION PROCESSING SYSTEM

[75] Inventors: Albert Daniel Duree, Independence, Mo.; Tracy Lee Nelson, Shawnee Mission, Kans.

[73] Assignee: Sprint Communications Co. L.P., Kansas City, Mo.

[21] Appl. No.: 08/653,852

[22] Filed: May 28, 1996

[51] Int. Cl.⁶ .................................................. H04L 12/56
[52] U.S. Cl. .......................... 370/392; 370/395; 370/401; 370/426; 370/524; 370/466
[58] Field of Search .................................. 370/392, 389, 370/395–399, 401, 409, 905, 426, 524–526, 522, 466, 467; 395/200.16; 379/207, 201

[56] References Cited

U.S. PATENT DOCUMENTS

| | | | |
|---|---|---|---|
| 4,201,889 | 5/1980 | Lawrence et al. | 320/68 |
| 4,310,727 | 1/1982 | Lawser | 179/18 B |
| 4,348,554 | 9/1982 | Asmuth | 179/18 B |
| 4,453,247 | 6/1984 | Suzuki et al. | 370/94 |
| 4,554,659 | 11/1985 | Blood et al. | 370/88 |
| 4,565,903 | 1/1986 | Riley | 179/18 B |
| 4,683,563 | 7/1987 | Rouse | 370/16 |
| 4,748,658 | 5/1988 | Gopal et al. | 379/221 |
| 4,823,338 | 4/1989 | Chan et al. | 370/85 |
| 4,853,955 | 8/1989 | Thorn et al. | 379/230 |
| 4,896,319 | 1/1990 | Lidinsky et al. | 370/60 |
| 4,916,690 | 4/1990 | Barri | 370/60 |
| 4,926,416 | 5/1990 | Weik | 370/60.1 |
| 4,985,889 | 1/1991 | Frankish et al. | 370/94.1 |
| 5,003,584 | 3/1991 | Benyacar et al. | 379/119 |
| 5,018,191 | 5/1991 | Catron et al. | 379/100 |
| 5,036,318 | 7/1991 | Bachhuber | 340/825.16 |
| 5,048,081 | 9/1991 | Gavaras et al. | 379/221 |
| 5,067,123 | 11/1991 | Hyodo et al. | 370/58.1 |

(List continued on next page.)

FOREIGN PATENT DOCUMENTS 408251183  9/1996  Japan .............................. H04L 12/28

OTHER PUBLICATIONS

"ATM at a Glance," Transmission Technologies Access Guide, pp. 40–42, 1993.
Paglialunga, A., "ISCP Baseline Document (VER. 3.1)," ITU Telecommunication Standardization Sector, 1993, Centre Studi E Laboratori Telecommunicazioni S.p.A., Geneva.
ITU—Telecommunication Standardization Sector, Study Group 13, Jul. 10–21 1995, "Draft Revised Recommendation 1.580," Geneva.
McDysan, David E. And Spohn, Darren L., ATM Theory and Application © 1994, p. 256: 9.3.1 ATM Layer VPI/VCI Level Addressing.
ITU Draft Recommendation I.363.1, B–IDSN ATM Adaptation Layer (AAL) Specification, Types 1 & 2, Jul. 21, 1995.
The ATM Forum Technical Committee, Circuit Emulation Service Interoperability Specifidation Version 2.0 (Baseline Draft), 95–1504, Dec. 1995.
ITU–Telecommunication Standardization Sector, "In/B–ISDN Signalling Three Ways of Integration," Study Group 11, Geneva, Nov. 29—Dec. 17, 1993.
ITU–Telecommunication Standardization Sector, "Interworking B–ISUP and Q.93B for DDI, MSN, TP and SUB," Study Group 11, Geneva, Nov. 29—Dec. 17, 1993.

(List continued on next page.)

*Primary Examiner*—Douglas W. Olms
*Assistant Examiner*—Matthew C. Phillips
*Attorney, Agent, or Firm*—Harley R. Ball

[57] ABSTRACT

The invention is a system and method for processing connections. Connection identifiers are assigned to indexes and stored in corresponding index latches. When communications arrive over a particular connection, the identifier for the particular connection is provided to all of the index latches. The index latch that stores a matching connection identifier provides its associated index. The index can be used to access a memory location that houses a processing instruction for the particular connection. The invention can be used within ATM multiplexers and gateways to facilitate connection processing.

48 Claims, 26 Drawing Sheets

U.S. PATENT DOCUMENTS

| | | | |
|---|---|---|---|
| 5,084,867 | 1/1992 | Tachibana et al. | 370/60 |
| 5,085,104 | 2/1992 | Yonehara et al. | 370/14 |
| 5,089,954 | 2/1992 | Rago | 395/600 |
| 5,091,903 | 2/1992 | Schrodi | 370/58.1 |
| 5,101,404 | 3/1992 | Kunimoto et al. | 370/60 |
| 5,163,057 | 11/1992 | Grupp | 371/47.1 |
| 5,168,492 | 12/1992 | Beshai et al. | 370/60.1 |
| 5,179,556 | 1/1993 | Turner | 370/94.1 |
| 5,185,743 | 2/1993 | Murayama | 370/110.1 |
| 5,204,857 | 4/1993 | Obara | 370/60 |
| 5,216,669 | 6/1993 | Hofstetter et al. | 370/84 |
| 5,218,602 | 6/1993 | Grant et al. | 370/582 |
| 5,231,631 | 7/1993 | Buhrke et al. | 370/60 |
| 5,231,633 | 7/1993 | Hluchyj et al. | 370/94.1 |
| 5,233,607 | 8/1993 | Barwig et al. | 370/94.1 |
| 5,239,539 | 8/1993 | Uchida et al. | 370/58.3 |
| 5,249,178 | 9/1993 | Kurano et al. | 370/60 |
| 5,251,255 | 10/1993 | Epley | 379/242 |
| 5,253,247 | 10/1993 | Hirose et al. | 370/14 |
| 5,255,266 | 10/1993 | Watanabe et al. | 370/60.1 |
| 5,258,752 | 11/1993 | Fukaya et al. | 340/825.8 |
| 5,258,979 | 11/1993 | Oomuro et al. | 370/95.1 |
| 5,268,895 | 12/1993 | Topper | 370/58.3 |
| 5,271,010 | 12/1993 | Miyake et al. | 370/94.1 |
| 5,274,680 | 12/1993 | Sorton et al. | 375/118 |
| 5,278,889 | 1/1994 | Papanicolaou et al. | 379/53 |
| 5,282,244 | 1/1994 | Fuller et al. | 379/230 |
| 5,285,441 | 2/1994 | Bansal et al. | 370/16 |
| 5,291,479 | 3/1994 | Vaziri et al. | 370/58.2 |
| 5,311,509 | 5/1994 | Heddes et al. | 370/60 |
| 5,317,562 | 5/1994 | Nardin et al. | 370/16 |
| 5,323,389 | 6/1994 | Bitz | 370/60.1 |
| 5,327,421 | 7/1994 | Hiller et al. | 370/60.1 |
| 5,329,308 | 7/1994 | Binns et al. | 348/14 |
| 5,339,318 | 8/1994 | Tanaka et al. | 370/60.1 |
| 5,345,443 | 9/1994 | D'Ambrogio et al. | 370/60 |
| 5,345,445 | 9/1994 | Hiller et al. | 370/60.1 |
| 5,345,446 | 9/1994 | Hiller et al. | 370/60.1 |
| 5,357,510 | 10/1994 | Norizuki et al. | 370/60.1 |
| 5,363,433 | 11/1994 | Isono | 379/92 |
| 5,365,524 | 11/1994 | Hiller et al. | 370/94.2 |
| 5,367,566 | 11/1994 | Moe et al. | 379/243 |
| 5,373,504 | 12/1994 | Tanaka et al. | 370/58.2 |
| 5,377,186 | 12/1994 | Wegner et al. | 370/62 |
| 5,384,771 | 1/1995 | Isidoro et al. | 370/58.2 |
| 5,384,840 | 1/1995 | Blatchford et al. | 379/229 |
| 5,394,393 | 2/1995 | Brisson et al. | 370/60 |
| 5,414,701 | 5/1995 | Shayter | 370/58.2 |
| 5,418,783 | 5/1995 | Yamaki et al. | 370/84 |
| 5,420,857 | 5/1995 | Jurkevich | 370/60 |
| 5,420,858 | 5/1995 | Marshall et al. | 370/60.1 |
| 5,420,916 | 5/1995 | Sekiguchi | 379/230 |
| 5,422,882 | 6/1995 | Hiller et al. | 370/60.1 |
| 5,425,090 | 6/1995 | Orriss | 379/201 |
| 5,426,636 | 6/1995 | Hiller et al. | 370/60.1 |
| 5,428,607 | 6/1995 | Hiller et al. | 370/60.1 |
| 5,428,609 | 6/1995 | Eng et al. | 370/60.1 |
| 5,434,852 | 7/1995 | La Porta et al. | 370/58.2 |
| 5,446,738 | 8/1995 | Kim et al. | 370/94.1 |
| 5,453,981 | 9/1995 | Katsube et al. | 370/60.1 |
| 5,454,034 | 9/1995 | Martin | 379/230 |
| 5,463,620 | 10/1995 | Sriram | 370/60 |
| 5,463,621 | 10/1995 | Suzuki | 370/60 |
| 5,473,677 | 12/1995 | D'Amato et al. | 379/112 |
| 5,473,679 | 12/1995 | La Porta et al. | 379/201 |
| 5,477,537 | 12/1995 | Dankert et al. | 370/60 |
| 5,479,401 | 12/1995 | Bitz et al. | 370/60.1 |
| 5,479,402 | 12/1995 | Hata et al. | 370/60 |
| 5,479,495 | 12/1995 | Blumhardt | 379/207 |
| 5,483,527 | 1/1996 | Doshi et al. | 370/60.1 |
| 5,485,455 | 1/1996 | Dobbins et al. | 370/60 |
| 5,504,742 | 4/1996 | Kakuma et al. | 370/60.1 |
| 5,506,844 | 4/1996 | Rao | 370/84 |
| 5,509,010 | 4/1996 | La Porta et al. | 370/68.1 |
| 5,509,123 | 4/1996 | Dobbins et al. | 395/200.15 |
| 5,513,178 | 4/1996 | Tanaka | 370/110.1 |
| 5,521,910 | 5/1996 | Matthews | 370/54 |
| 5,522,042 | 5/1996 | Fee et al. | 395/200.01 |
| 5,533,106 | 7/1996 | Blumhardt | 379/142 |
| 5,539,698 | 7/1996 | Kozaki et al. | 370/60.1 |
| 5,539,815 | 7/1996 | Samba | 379/220 |
| 5,539,816 | 7/1996 | Pinard et al. | 379/229 |
| 5,539,884 | 7/1996 | Robrock, II | 395/200.12 |
| 5,541,918 | 7/1996 | Ganmukhi et al. | 370/60.1 |
| 5,541,926 | 7/1996 | Saito et al. | 370/94.2 |
| 5,544,152 | 8/1996 | Obermanns et al. | 370/16 |
| 5,544,161 | 8/1996 | Bigham et al. | 370/58.1 |
| 5,550,914 | 8/1996 | Clarke et al. | 379/230 |
| 5,563,939 | 10/1996 | La Porta et al. | 379/220 |
| 5,568,475 | 10/1996 | Doshi et al. | 370/58.2 |
| 5,570,368 | 10/1996 | Murakami et al. | 370/94.2 |
| 5,600,640 | 2/1997 | Blair et al. | 370/360 |
| 5,600,643 | 2/1997 | Robrock, II | 370/399 |
| 5,636,210 | 6/1997 | Agrawal et al. | 370/390 |
| 5,680,390 | 10/1997 | Robrock, II | 370/229 |

OTHER PUBLICATIONS

ITU–Telecommunication Standardization Sector, "Revised Draft of Q.2650 (DSS2/B_ISUP Interworking Recommendation)," Study Group 11, Geneva, Nov. 29—Dec. 17, 1993.

ITU–Telecommunication Standardization Sector,"Draft Broadband/Narrowband NNI interworking recommendation," Study Group 11, Geneva, Dec. 1993.

ITU–Telecommunication Standardization Sector, "Draft Recommendation Q.2761," Study Group 11, Geneva, Nov. 29—Dec. 17, 1993.

ITU–Telecommunication Standardization Sector, "Q2931 Overview," Geneva, Nov. 29—Dec. 17, 1993.

ITU–Telecommunication Standardization Sector,"Clean final draft text for B–ISUP formats and codes (Q.2763) in ASN.1," Study Group 11, Geneva, Nov. 29—Dec. 17, 1993.

ITU–Telecommunication Standardization Sector, "Updated draft of Q.2764 (BQ.764)," Study Group 11, Geneva, Nov. 29—Dec. 17, 1993.

ITU–Telecommunication Standardization Sector,"Final B–ISUP SDLs," Study Group 11, Geneva, Nov. 29—Dec. 17, 1993.

ITU–Telecommunication Standardization Sector,"Draft Recommendation Q.2650," Study Group 11, Geneva, Nov. 29—Dec. 17, 1993.

ITU–Telecommunication Standardization Sector, "Revised Draft of Q.2650 (DSS2/B–ISUP Interworking Recommendation)," Study Group 11, Geneva, Nov. 29—Dec. 17, 1993.

ITU–T SG 11 WP 2, "Revision of Recommendation of Q.850," Geneva, Dec. 2–15, 1993.

ITU–Telecommunication Standardization Sector, "Draft Text for Q.2931 (CH. 1, 2 and 3)," Study Group 11, Geneva, Dec. 1993.

ITU–Telecommunication Standardization Sector, "Q.2931, Clause 4—Information Elements," Geneva, Nov. 29–Dec. 17, 1993.

ITU–Telecommunication Standardization Sector, "Section 5 of Q.93B," Study Group 11, Geneva, Nov. 29–Dec. 17, 1993.

ITU–Telecommunication Standardization Sector, "Chapter 6 of Recommendation Q.93B," Study Group 11, Geneva, Nov. 29–Dec. 17, 1993.

ITU–Telecommunication Standardization Sector, "Clauses 7 and 8 of Q. 2931," Study Group 11, Dec. 1993.

ITU–Telecommunications Standardization Sector, "Revised Q.2931 User Side SDL Diagrams," Study Group 11, Nov. 29–Dec. 17, 1993.

ITU–Telecommunication Standardization Sector, "Revised Q.2931 Network Side SDL Diagrams," Study Group 11, Nov. 29–Dec. 17, 1993.

ITU–Telecommunication Standardization Sector,"Annexes B, C, D, F, H and I of Q.2931," Study Group 11, Nov. 29–Dec. 17, 1993.

ITU–Telecommunication Standardiztion Sector, "Annex E of Recommendation Q.93B," Study Group 11, Nov. 29–Dec. 17, 1993.

ITU–Telecommunication Standardization Sector, "Rec. Q.2931, Annex G—Status Monitoring of SPCs," Study Group 11, Nov. 29–Dec. 17, 1993.

ITU–Telecommunication Standardization Sector, "Annex J of Q.2931," Study Group 11, Dec. 1993.

ITU–Telecommunications Standardization Sector, "Appendix 1/Q.2931: Guidelines for the Use of Instruction Indicators," Study Group 11, Nov. 29–Dec. 17, 1993.

ITU–Telecommunication Standardization Sector, "Draft text for Q.2931: Appendix II (Information Items Required for Connection Establishment and Routing in B–ISDN)," Study Group 11.

ITU–Telecommunication Standardization Sector, "General Recommendations on Telephone Switching and Signalling—Intelligent Network/Distributed Functional Plane for Intelligent Network CS–1,"ITU–T Recommendation Q.1214.

TELECOMMUNICATIONS SYSTEM WITH A CONNECTION PROCESSING SYSTEM

BACKGROUND

1. Field of the Invention

The invention relates to the field of telecommunications. In particular, the invention relates to telecommunications systems with connection processing systems.

2. Description of the Related Art

Asynchronous Transfer Mode (ATM) technology has become a well known means of communication. ATM is based on the 53 byte cell that contains a five byte header and a 48 byte payload. The header includes a virtual connection identification field known as the Virtual Path Identifier/ Virtual Channel Identifier (VPI/VCI). The VPI/VCI is typically a 28 bit field that designates the virtual connection for the cell. The VPI/VCI is used by the network to route and handle ATM cells. Typically the VPI/VCI is used to identify a virtual connection, but other virtual channel identifiers could also be used in the context of the invention.

At present, VPI/VCIs are processed by using the VPI/VCI to access a memory location that stores processing instructions for the VPI/VCI. Using a 28 bit VPI/VCI to access memory is a cumbersome process. This entails writing the 28 bit VPI/VCI to one register and then repeatedly reading and writing successive VPI/VCI table entries into another register for comparison. This can entail several read/write operations before a match is found. The entire table must be searched if no match is available. This problem is compounded by processing over an 8 bit or 16 bit bus. With an 8 bit bus, a 28 bit number requires 4 write operations to transfer the number. A 16 bit bus requires 2 write operations. These conditions cause problems in broadband systems where high speed transport is used. VPI/VCI processing speed is often a critical factor. For example, when OC-3 transport is used to carry the ATM cells, a cell arrives for processing every 2.73 microseconds.

One solution is to restrict the number of bits that are actually used in the VPI/VCI. By restricting the 28 bit VPI/VCI to only 8 active bits, processing speed is improved. However, this limitation places severe restrictions on a network's ability to utilize the full capability of ATM virtual connection identification. As a result, this solution is often unacceptable.

SUMMARY

The invention reduces the connection processing time required in prior systems by assigning connection identifiers to indexes and storing the connection identifiers in associated index latches. During subsequent processing, a particular connection is processed by providing the connection identifier to each index latch for comparison with any assigned connection identifiers stored in the latches. These comparisons can occur simultaneously across all index latches. The index latch that finds a match outputs its index. This is the index that was originally assigned to the connection. The index can be used to access instructions in memory or it could signify other actions that need to be taken. In this way, a smaller index can be used to process the connection instead of a large connection identifier. The index latch circuitry allows connections to be associated with indexes in nanoseconds.

The invention comprises a connection processing method where there are a plurality of connection identifiers. One of the connection identifiers is a first connection identifier that identifies a first connection and another one of the connection identifiers is a second connection identifier that identifies a second connection. There are a plurality of index latches and a plurality of associated indexes. One of the indexes is a first index that is associated with a first index latch and another one of the indexes is a second index that is associated with a second index latch.

The method comprises assigning the first connection identifier to the first index and assigning the second connection identifier to the second index. The first index is associated with a first index latch and the second index is associated with a second index latch. The method comprises storing the first connection identifier in the first index latch and storing the second connection identifier in the second index latch. The assignment and storage creates assigned connection identifiers in the first and second index latches. The method comprises receiving communications over the first connection and obtaining the first connection identifier. The method comprises providing the first connection identifier to each index latch and comparing the first connection identifier to any assigned connection identifiers stored in the index latches. The method comprises providing the first index associated with the first index latch in response to the first connection identifier matching the assigned connection identifier stored in the first index latch. The method comprises receiving communications over the second connection and obtaining the second connection identifier. The method comprises providing the second connection identifier to each index latch and comparing the second connection identifier to any assigned connection identifiers stored in the index latches. The method comprises providing the second index associated with the second index latch in response to the second connection identifier matching the assigned connection identifier stored in the second index latch.

In some embodiments the invention also comprises storing a processing instruction for the first connection in a memory location that can be accessed with the first index, and using the first index provided by the first index latch to access the processing instruction in the memory location. In various other embodiments, the invention facilitates the processing of virtual connections, VPI/VCIs, DS0 connections, and Circuit Identification Codes (CICs). In some embodiments, the invention comprises receiving write and read instructions where the addresses in the instructions represent one of the incoming connection register, one of the index latches, or the assigned index register; and decoding the instructions to determine what the address represents to facilitate execution of the instruction.

The invention comprises a system for processing connection identifiers for connections where connection identifiers are assigned to indexes to create assigned connection identifiers and corresponding assigned indexes. The connections are identified by incoming connection identifiers when incoming communications from the connections are received by the system. The system comprises index latches that are each associated with one of the indexes and that are each operational to receive and store one of the assigned connection identifiers, to receive and compare the incoming connection identifiers with the stored assigned connection identifier, and to produce the associated index if one of the incoming connection identifiers matches the stored assigned connection identifier. The system also comprises an incoming connection register that is connected to each index latch and that is operational to receive the incoming connection identifiers and provide them to each index latch; and an assigned index register that is connected to each index latch and that is operational to receive the associated indexes from the index latches.

In some embodiments, the system further comprises a microprocessor that is operational to provide write and read instructions that comprise first instructions to write the assigned connection identifiers to addresses that represent the index latches that are associated with the assigned indexes, a second instruction to write the incoming connection identifier to an address that represents the incoming connection identifier register, and a third instruction to read the assigned index from an address that represents the assigned index register. In these embodiments, the system also comprises an address decoder that is operational to receive the first instructions and to provide the assigned connection identifiers to the index latches that are associated with the assigned indexes, to receive the second instruction and to provide the incoming connection identifier to the incoming connection register, and to receive the third instruction and to provide the assigned index to the microprocessor from the assigned index register.

The invention can be used in various devices and architectures as discussed below. This includes ATM interworking multiplexers and ATM gateways. This also includes architectures that employ signaling processors.

DESCRIPTION

ATM technology has become a well known means of communication. ATM is based on the 53 byte cell that contains a five byte header and a 48 byte payload. The header includes a virtual connection identification field known as the Virtual Path Identifier/Virtual Channel Identifier (VPI/VCI). The VPI/VCI is typically a 28 bit field that designates the virtual connection for the cell. The VPI/VCI is used by the network to route and handle ATM cells. Typically the VPI/VCI is used to identify a virtual connection, but other virtual channel identifiers could also be used in the context of the invention.

In order to facilitate the processing of the VPI/VCI of a given cell, the VPI/VCI may first be associated with an index. The index is typically several bits shorter than the VPI/VCI. Once a VPI/VCI is assigned to the index, the relatively short index may be used instead of the VPI/VCI to access information pertaining to the VPI/VCI. For example, VPI/VCI "X" (28 bits) may be assigned to index "304" (12 bits), and routing instructions for VPI/VCI "X" could be stored at a memory location corresponding to index "304". When a cell arrives with a VPI/VCI="X", then the cell processor can associate "X" with index "304" and obtain the routing instructions from the memory location that corresponds to index "304". It is easier and more efficient to access memory using the shorter index than the lengthier VPI/VCI.

The number of indexes can be much less than the number of potential VPI/VCI combinations. (4,096 possible VPIs and 65,536 possible VCIs in each VPI) The number of indexes could be set at the number of simultaneous VPI/VCIs the processor must handle. Once an index is freed up, it could be re-assigned to the another VPI/VCI. For example, a processor may have 4,096 indexes, and could use them to handle 4,096 simultaneous VPI/VCIs, even though all of the millions of possible VPI/VCIs may be used at one time or another. In this example, the designation of 4,096 indexes would require 12 bits per index. As stated above, the 12 bit index is easier to process than a 28 bit VPI/VCI.

In some embodiments, the invention is a connection processing system that facilitates the association of VPI/VCIs with indexes. In other embodiments, the invention is a connection processing system that facilitates the association of other connections, such as DS0 connections, with an index. For example, the index can be used to correlate virtual connections and virtual connections, DS0s and virtual connections, and DS0s with DS0s.

THE CONNENTION PROCESSING SYSTEM

Figure 1:
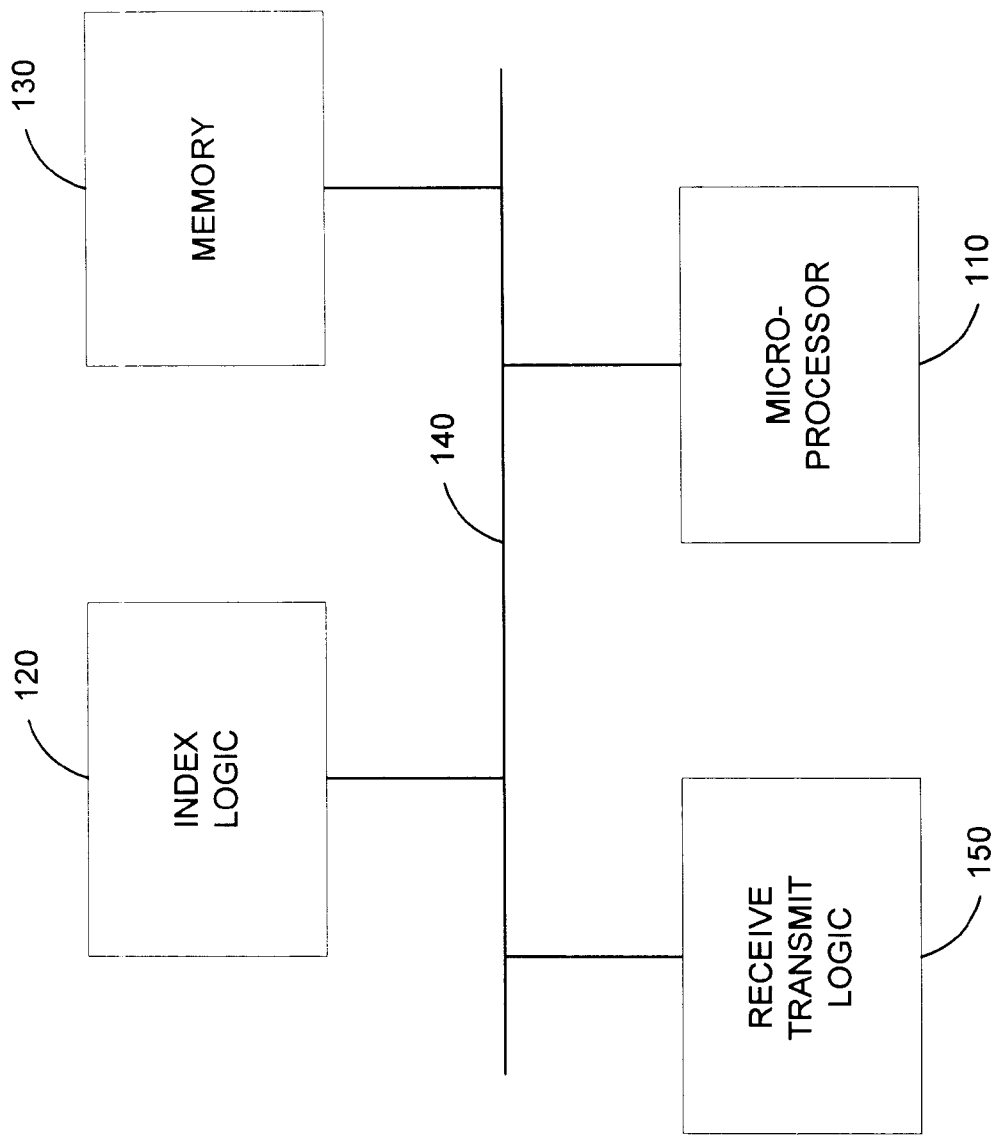
FIG. 1 is a block diagram of a version of the invention.

FIG. 1 depicts a version of the invention and shows microprocessor 110, index logic 120, memory 130, bus 140, and receive/transmit logic 150. Microprocessor 110 could be a conventional microprocessing chip configured in accord with the present invention. Index logic 120 could be Large Scale Integrated (LSI) circuitry configured in accord with the present invention. As will be discussed below, index logic 120 should be configured to first accept assignments of virtual connections to indexes, and then later associate the virtual connections of incoming cells with their assigned indexes. Memory 130 and bus 140 could be a conventional elements typically associated with microprocessing chips. Receive/transmit logic 150 is logic that receives communications from various connections. Some examples would be standard ATM Adaption Layer (AAL) Segmentation and Reassembly (SAR) processing logic and standard Time Division Multiplex (TDM) processing logic. Preferably, the connection processing system operates with 32 bit bus structures and 32 bit processors.

In operation, various indexes are set-up to point to particular locations in memory 130. When one of these indexes is assigned to a virtual connection, the index/virtual connection assignment is provided to index logic 120. This virtual connection or index will be referred to as the "assigned VPI/VCI" or the "assigned index". Information about the assigned VPI/VCI is stored in a location in memory 130 that can be accessed with the assigned index. Typically these assignments come from the microprocessor, but they could also come from other control entities.

When an ATM cell arrives on bus 140 through receive/transmit logic 150, it is stored in memory 130. Microprocessor 110 will provide the incoming cell's VPI/VCI to index logic 120. This VPI/VCI will be referred to as the "incoming VPI/VCI" Index logic 120 will then produce the index that is assigned to the incoming VPI/VCI. Microprocessor 110 will obtain the assigned index from index logic 120 and use it to access information in memory 130. For example, the memory location may contain information instructing microprocessor 110 to forward the cell to receive/transmit logic 150 for distribution over a particular DS0 connection.

Those skilled in the art are aware that computer logic and circuitry is more detailed than that shown on the figures. For example, bus 140 may actually be implemented using multiple bus structures, such as I/O, control, data, and addressing to name some examples. One skilled in the art will appreciate these details, and for the sake of clarity, they have been omitted from the figures.

Figure 2:
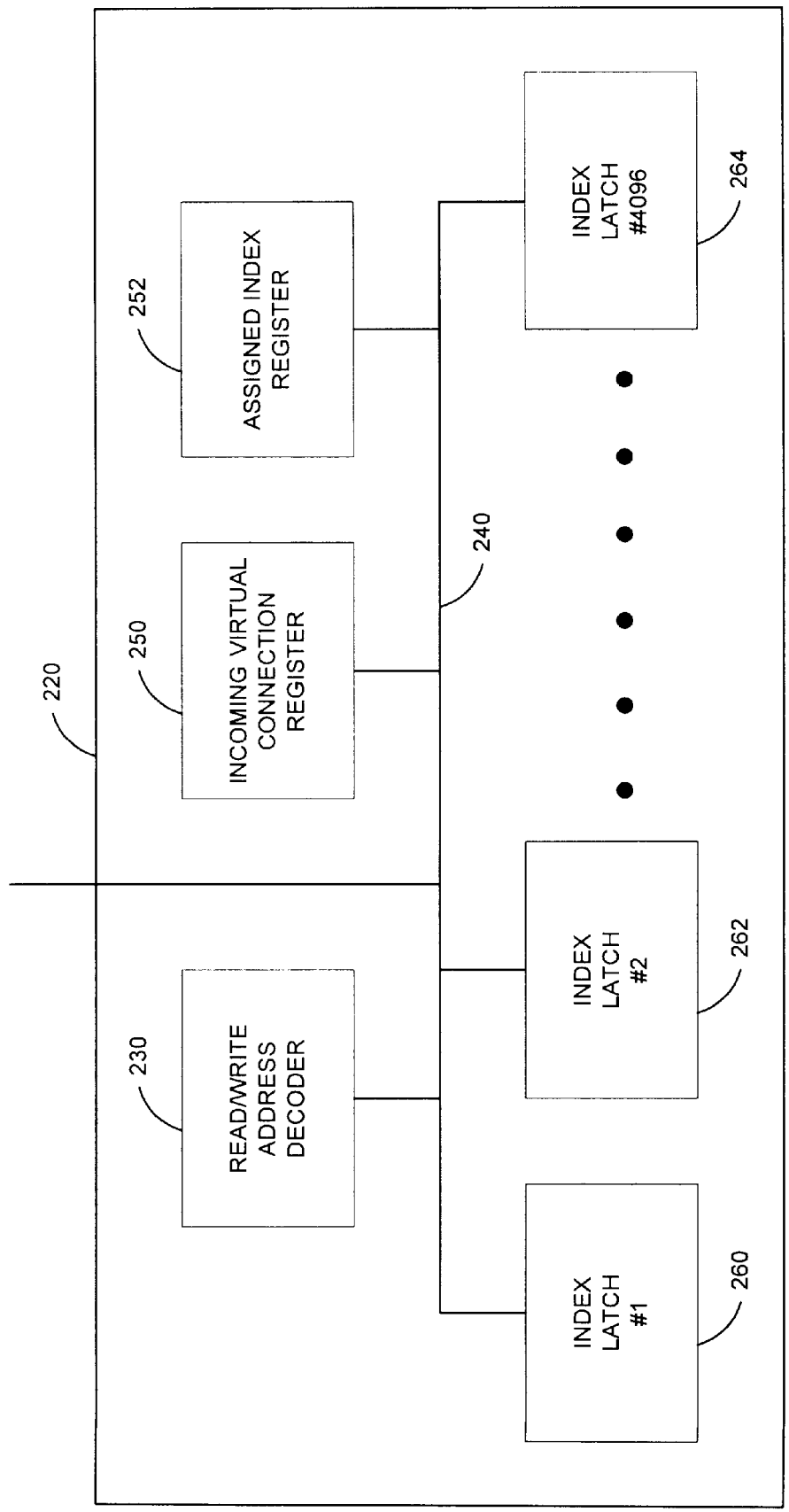
FIG. 2 is a block diagram of a version of the invention.

FIG. 2 depicts a version of index logic 120 from FIG. 1, which is now depicted as index logic 220. Index logic 220 includes read/write address decoder 230, incoming virtual connection register 250, and assigned index register 252. Also shown are index latches 260, 262, and 264. As indicated, there are actually 4,096 index latches, but all are not shown for reasons of clarity. As will be appreciated, the number of index latches varies in accord with the number of required indexes. Bus 240 is also shown and would be connected to bus 140 from FIG. 1. (As discussed above, bus 240 would typically be comprised of multiple bus structures as would be appreciated by one skilled in the art).

Those skilled in the art appreciate various techniques that processors use to read and write information using addresses. In this embodiment of the invention, the microprocessor is able to read from and write to index logic 220 as if it were memory. Read/write address decoder 230 is connected to bus 240 and is functional to receive the microprocessor's read/write instructions and execute the instruction. This is accomplished by associating the address in the instruction with the appropriate element of index logic 220. The address could use the same designation as the element or they could be related through a translation table.

For example, the instruction from microprocessor may be to write data to address "A435". Read/write address decoder would decode this instruction as follows. It would translate the address into its corresponding element. In this case address "A435" could translate to index latch "262". The data provided to index logic 220 along with the instruction could be VPI/VCI "Y". Read/write address decoder 230 would arm index latch 262 to accept the data. As a result the write data to address "A435" would result in VPI/VCI "Y" being provided to index latch "262". In effect, VPI/VCI "Y" has been assigned to index "262".

When the microprocessor handles incoming cells it will write data (the incoming VPI/VCI) to a particular address. Read/write address decoder 230 will use the address to identify the appropriate element of index logic 220. In the case of an incoming VPI/VCI, the element would be incoming virtual connection register 250.

The microprocessor will then read data (the assigned index) from a particular address. Read/write address decoder 230 will use the address to identify the appropriate element of index logic 220. In the case of an assigned index, the element would be assigned index register 252. The data in assigned index register will be provided to the microprocessor.

Read/write address decoder 230 also facilitates the use of various bus sizes. For example, if the microprocessor uses an 8 bit data bus, it will take four writes to provide a 28 bit VPI/VCI. If a 16 bit bus is used, it will take two writes. Read/write address decoder 230 will collect all the data and then arm the appropriate element for accepting the complete set of data. In a similar fashion, read/write address decoder 230 may facilitate multiple reads to provide the index to the microprocessor.

Read/write address decoder 230 also provides a synchronization and clocking function to index logic 220. As one skilled in the art will appreciate, synchronization and clocking is needed to address race and timing functions. The various stages of index logic 222 will have a strobing mechanism derived from the system clock that synchronizes the transfer of information from one stage to another.

Incoming virtual connection register 250 is connected to bus 240. Incoming virtual connection register 250 could be a standard register that is functional to accept the incoming VPI/VCI under the control of read/write address decoder 230 and broadcast it to all of the index latches.

Index latches 260, 262, and 264 are each connected to bus 240. Each index latch is functional to accept and store an assigned VPI/VCI under the control of read/write address decoder 230. Each index latch is functional to accept an incoming VPI/VCI and compare it to its assigned VPI/VCI using comparitor circuitry. When a particular index latch finds a match, it will output its index (the assigned index) to assigned index register 252. The index latches are discussed in greater detail below.

Assigned index register 252 is connected to bus 240. Assigned index register 252 could be a standard register that is functional to accept the assigned indexes from the index latches. It would provide the assigned index to the microprocessor under the control of read/write address decoder 230.

In operation, an instruction to write an assigned VPI/VCI to an address arrives at read/write address decoder 230. Read/write address decoder 230 causes the assigned VPI/VCI to be provided to the index latch that corresponds to the address. This procedure is repeated for each assignment. Typically, several index latches will each store a particular VPI/VCI that is currently assigned to its respective index.

When a cell arrives, an instruction to write the incoming VPI/VCI to an address arrives at read/write address decoder 230. Read/write address decoder 230 causes the incoming VPI/VCI to be provided to incoming virtual connection register 250. Incoming virtual connection register 250 provides the incoming VPI/VCI to all of the index latches.

Each index latch compares the incoming VPI/VCI to its assigned VPI/VCI. If an index latch finds a match, it provides its index to assigned index register 252. For example, if index latch 262 found a match, then it would provide "262" to assigned index register 252. The microprocessor will then attempt to read the assigned for the incoming VPI/VCI from an address. In response to this instruction, read/write address decoder 230 will cause the index in assigned index register 252 to be provided to the microprocessor. If the assigned index is all 0's, that indicates that no match was found and that the cell should be discarded.

As a result, the microprocessor can assign VPI/VCIs to indexes as required by writing the VPI/VCI to a particular address. Instructions can be loaded into memory locations corresponding to the indexes. In nanoseconds, the microprocessor can write incoming VPI/VCIs to the index logic and then read the assigned index from the index logic. The index can be used to access instructions in memory.

As an alternative, the index itself can signify an action or instruction without the need for a memory location. For example, the index latches could be configured to output indexes that directly identify connections so no further look-up is needed. In this way, the microprocessor could assign and associate particular connections with other connections without also using the index to access memory. In one embodiment, ATM VPI/VCIs could be assigned to indexes that were actually DS0 Circuit Identification Codes (CICs). The microprocessor could assign VPI/VCIs to CICs and then obtain the correct CIC for each arriving cell by writing the VPI/VCI of the cell to the index logic and then reading the associated CIC for the VPI/VCI from the index logic.

As cells arrive, the microprocessor can simply write the incoming VPI/VCIs to an address, and then read the corresponding index from another address. The index logic handles these instructions for the microprocessor. The microprocessor can then use this index to access memory or take other actions as the case may be. This provides a distinct advantage over prior systems that had to access memory using the VPI/VCI instead of an index. This is a cumbersome process unless the bits in the VPI/VCI are limited. Such a limitation is often unacceptable.

Figure 3:
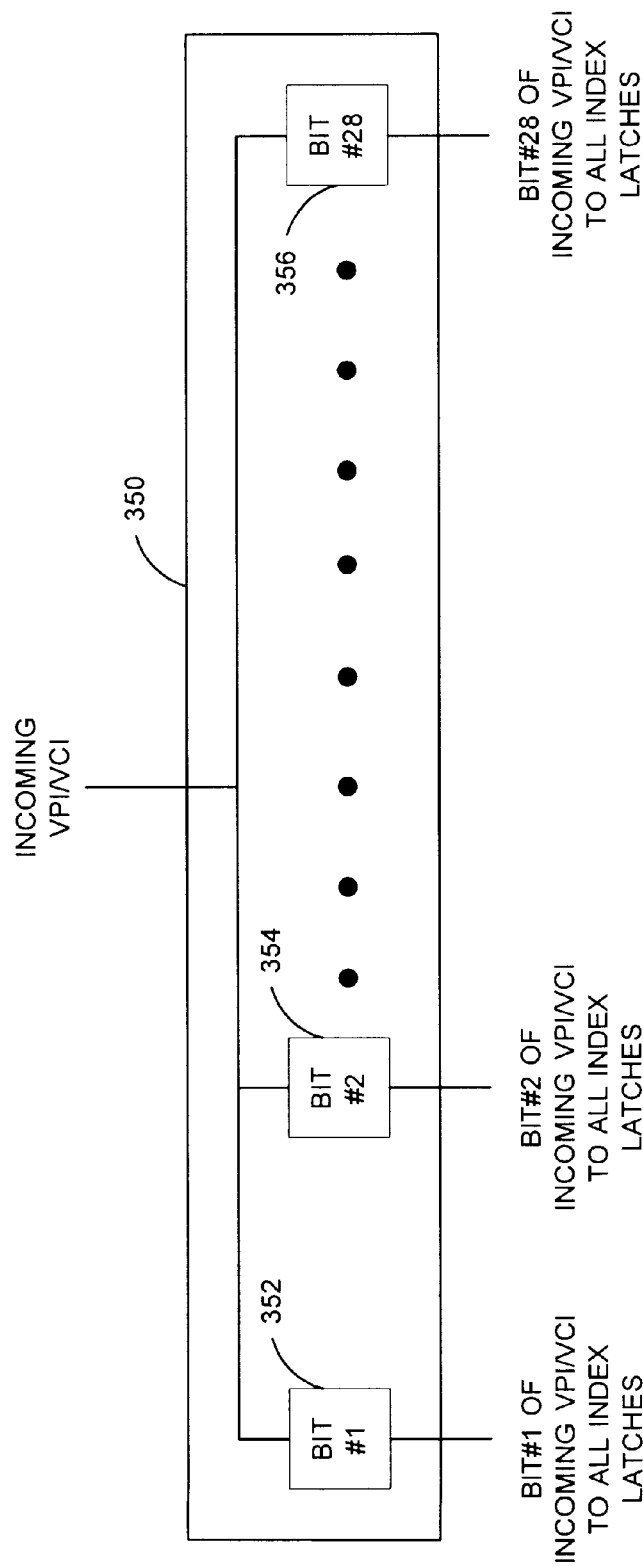
FIG. 3 is a block diagram of a version of the invention.

FIG. 3 shows a version of the incoming virtual connection register (250 from FIG. 2). Incoming virtual connection register 350 is shown. Incoming virtual connection register 350 includes flip-flops 352, 354, 356, etc. that store the 28 bits of the incoming VPI/VCI. Preferably, the flip-flops are clocked "D" flip-flops. All of the flip-flops are not shown for reasons of clarity. Incoming virtual connection register 350 is connected to each index latch at the bit level. Bit #1 of the incoming VPI/VCI is transmitted to the incoming VPI/VCI bit #1 position for each index latch. Bit #2 of the incoming VPI/VCI is transmitted to the incoming VPI/VCI bit #2 position of each index latch. This continues on through bit #28. In this way, each bit of the incoming VPI/VCI is transmitted to each index latch.

Figure 4:
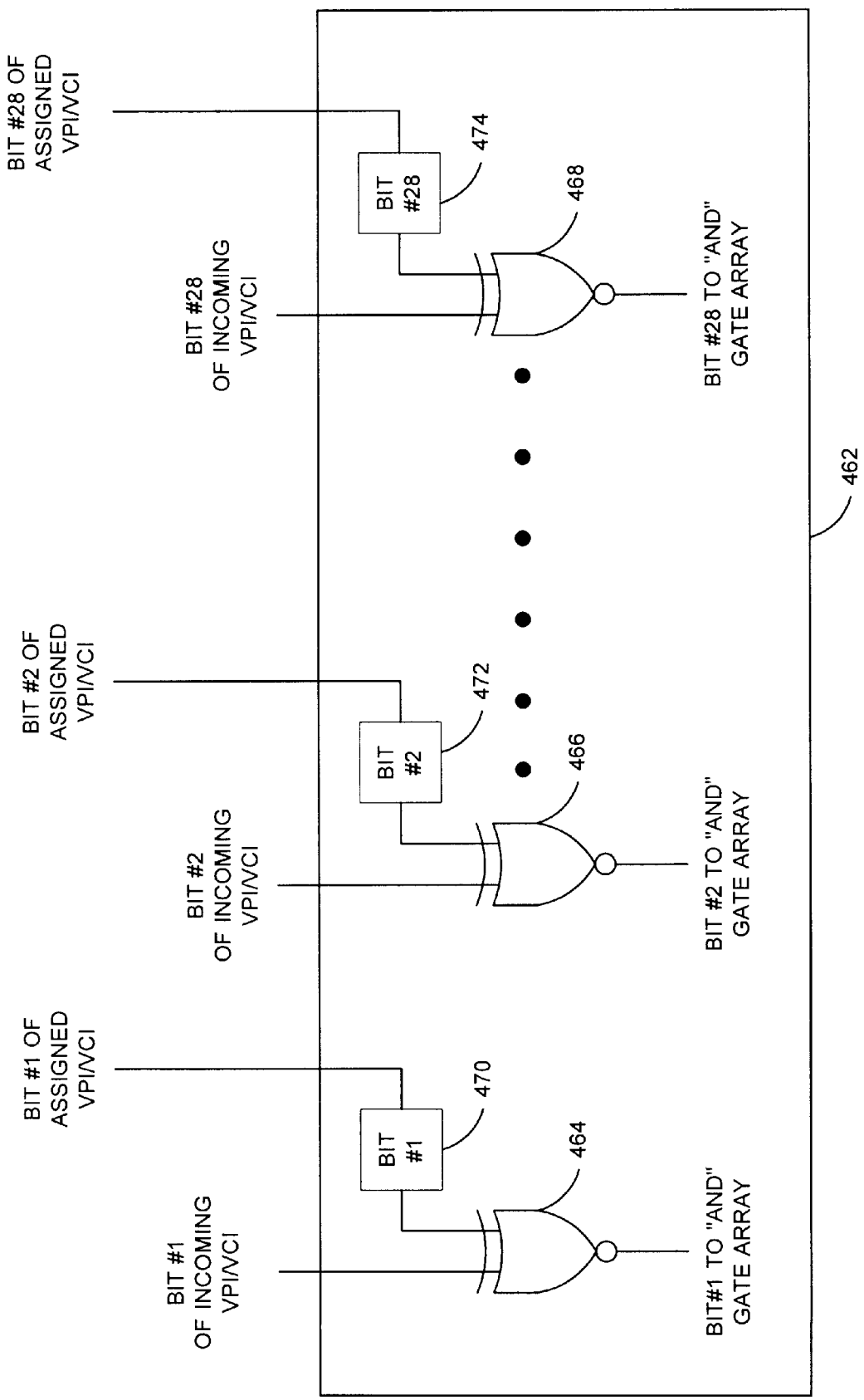
FIG. 4 is a block diagram of a version of the invention.
Figure 5:
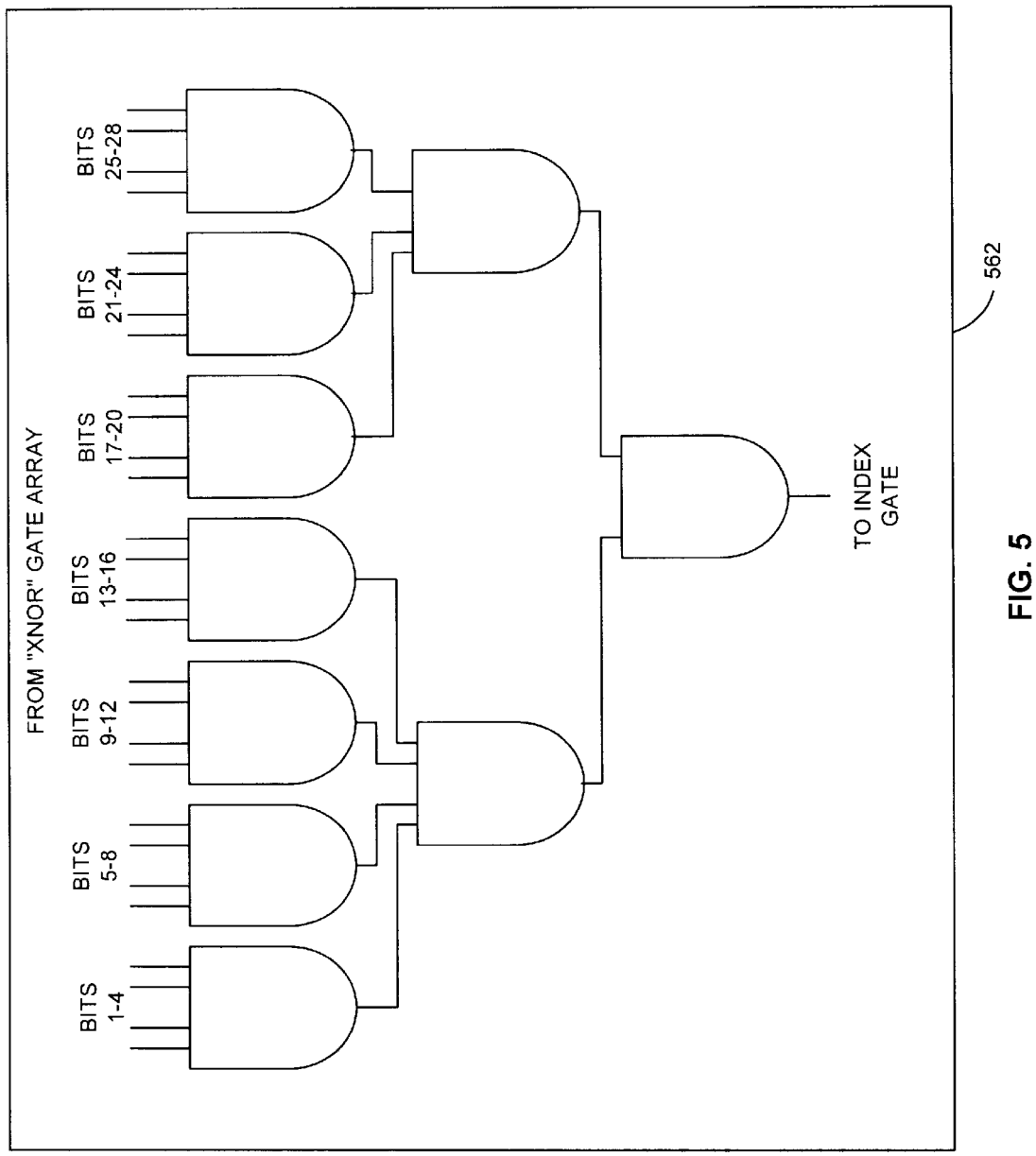
FIG. 5 is a block diagram of a version of the invention.
Figure 6:
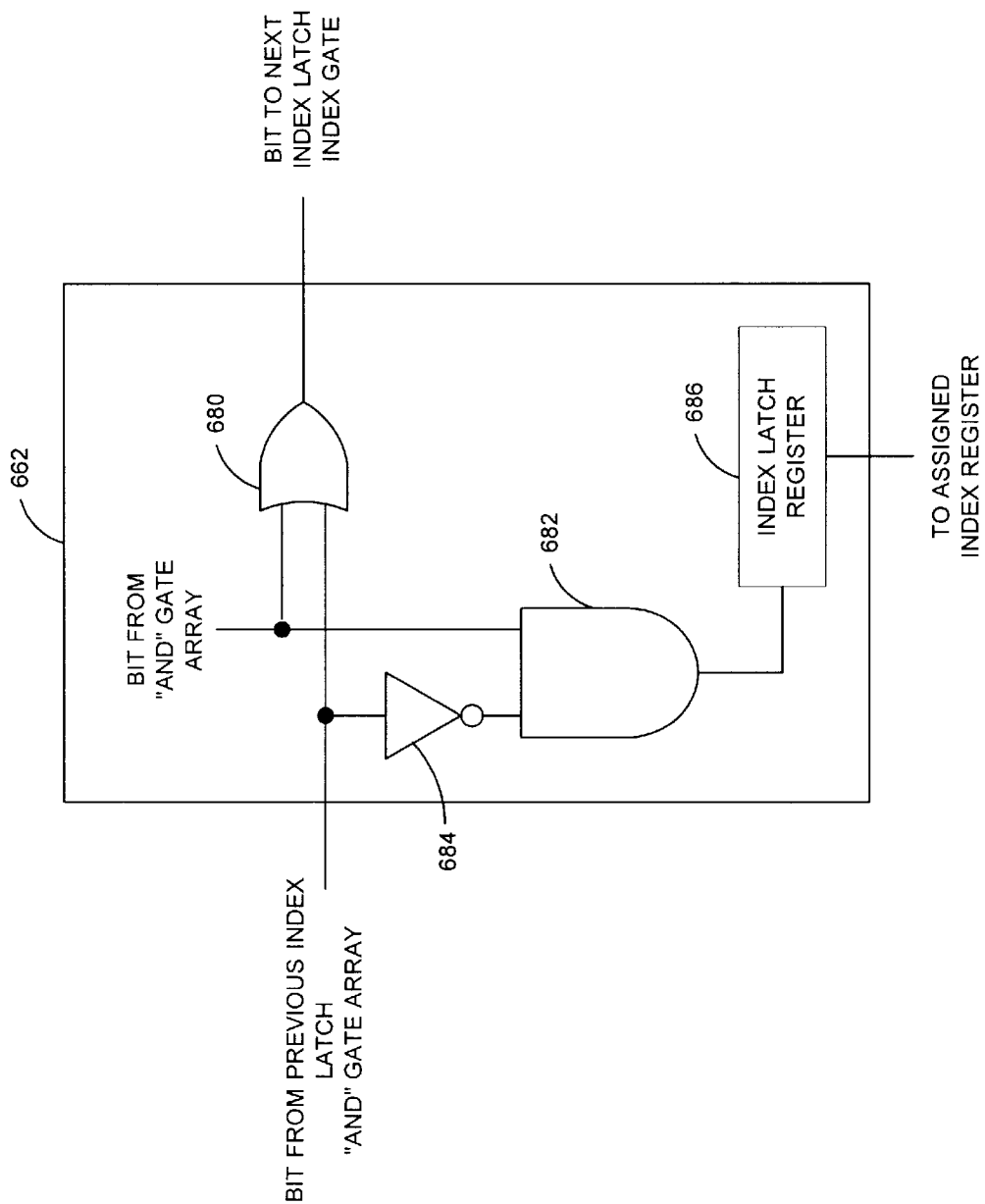
FIG. 6 is a block diagram of a version of the invention.

FIGS. 4–6 depict an individual index latch and would be repeated for each index latch. FIG. 4 depicts a portion of one of the index latches. Shown is exclusive "or" ("XNOR") gate array 462. The connections to receive the incoming VPI/VCI from the virtual connection register are shown. Also shown are flip-flops 470, 472, and 474 (preferably clocked "D"). Each flip flop receives and stores the corresponding bit of the assigned VPI/VCI. "XNOR" gates 464, 466, and 468 are also shown connected to the above flip-flops and to the connections to the virtual connection register. All 28 flip-flops and "XNOR" gates are not shown for reasons of clarity. These "XNOR" gates accept the incoming VPI/VCI and compare it on a bit by bit basis with the assigned VPI/VCI. The results of the "XNOR" gates are provided to the "AND" gate array. "XNOR" gates produce a 1 with an input of 0 and 0, or with an input of 1 and 1. "XNOR" gates produce a 0 with an input of 0 and 1, or an input of 1 and 0. If all 28 bits of the two VPINCIs match, the output from each "XNOR" gate will be a 1.

FIG. 5 depicts the next portion of the index latch. Shown is "AND" gate array 562 which is connected to the "XNOR" gate array of FIG. 4. It can be seen from the configuration of the "AND" gates that a 1 is produced only if all inputs from the "XNOR" gate array (bits 1–28) are 1's. If one of the input bits is a 0, then the output of "AND" gate array 562 is a 0. Together, FIGS. 4 and 5 form a comparitor circuit. If the two VPI/VCIs match, the output of "AND" gate array 562 is a 1, but if they do not, the output bit is a 0. The output bit is provided to the index gate.

FIG. 6 depicts the next portion of the index latch. FIG. 6 depicts index gate 662. Index gate 662 is connected to the output of "AND" gate array 562 of FIG. 5. Index gate 662 is comprised of "OR" gate 680, "AND" gate 682, inverter 684, and index latch register 686. Index gate 662 accepts a bit from the "AND" gate array of the previous index latch indicating if the previous index latch found a match. For example index latch "304" would receive this input from index latch "303". If the previous index latch found a match, then the input would be 1. The 1 becomes a 0 when passing through inverter 684, and it locks out "AND" gate 682. This is so two index latches will not find a match on the same incoming VPI/VCI. If the previous index latch did not find a match then the 0 input is inverted to a 1 and enables "AND" gate 682. In this case, a 1 from the "AND" gate array of the present index latch causes the gate 682 to send a 1 to index latch register 686. This 1 enables index latch register 686 to output the index to the assigned index register. Each index latch would be configured to output its corresponding index. "OR" gate 680 works to lock out the remaining gates if a match is found in either a previous index latch or in the present index latch.

Figure 7:
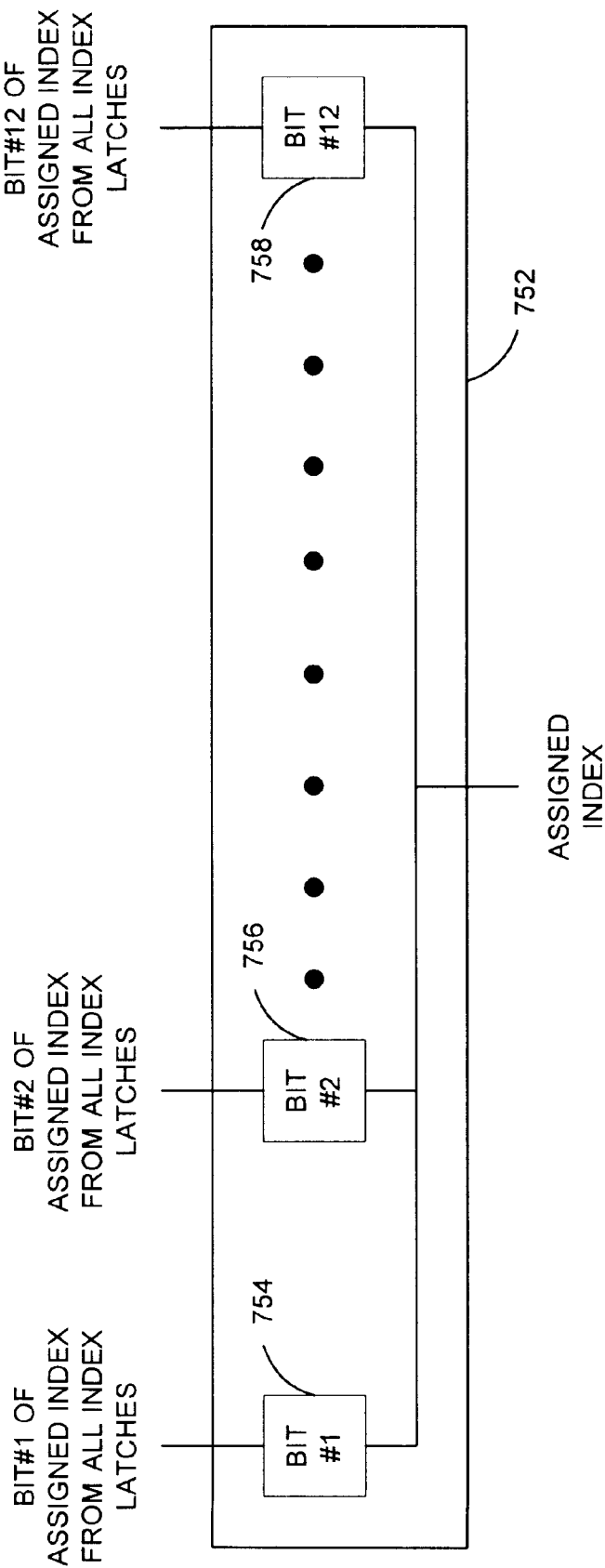
FIG. 7 is a block diagram of a version of the invention.

FIG. 7 shows a version of the assigned index register. (252 from FIG. 2). Assigned index register 752 is shown. Assigned index register 752 includes flip-flops 754, 756, 758, etc. that store the 12 bits of the assigned index. All of the flip-flops are not shown for reasons of clarity. Assigned index register 752 is connected to each index latch at the bit level. Bit #1 of the assigned index is transmitted from the index latches to the bit #1 position of assigned index register 752. Bit #2 of the assigned index is transmitted from the index latches to the bit #2 position of assigned index register 752. This continues on through bit #12. In this way, each bit of the assigned index is transmitted from the index latches to assigned index register 752 so it can be provided to the microprocessor.

In operation, FIGS. 3–7 depict a system in which VPI/VCIs can be assigned to indexes. By providing the assigned VPI/VCIs to the index logic, the index logic is able to accept incoming VPI/VCIs and output the index that is assigned to the incoming VPI/VCI. The microprocessor is able to use read/write instructions with the index logic as if it were memory. The microprocessor can then use the index to access information about the virtual connection. The number of indexes is set by the number of index registers. The number of bits of the connection identifiers and indexes can also be increased or decreased as needed. As one skilled in art can now appreciate, this would be accomplished by altering the size of the registers and the number of index latches.

Advantageously, the invention reduces the processing time over conventional systems that require consecutive read/write operations until a match is found in a memory table. In the context of the invention, a 100 MHz processor using a 32 bit bus could write the incoming VPI/VCI and read the assigned index in the same amount of time that it would take to write and read data to a 60 nanosecond RAM memory—two direct memory cycle times. If an 8 bit bus is used, it would take 4 write and 2 read direct memory cycle times.

One skilled in the art will also recognize that the system described above could be used in several different embodiments. For example, the invention could be used to associate non-ATM connections with ATM connections. For example, a DS0 CIC would be assigned to an index and the VPI/VCI would be stored in a memory location accessed by the index. In other embodiments, a connection processing system could be employed for the conversion of ATM traffic into non-ATM traffic, for example, from VPI/VCIs to DS0 CICs. Both embodiments could be used at opposite ends of an ATM system to facilitate ingress and egress from the ATM system. In yet other embodiments, the invention could be employed for the conversion of ATM VPI/VCIs into other ATM VPI/VCIs.

THE PREFERRED EMBODIMENT

The above-described connection processing system is preferably used in the following embodiment. For purposes of clarity, the term "connection" will be used to refer to the transmission media used to carry user traffic. The term "link" will be used to refer to the transmission media used to carry signaling or control messages. On the Figures, connections are shown by a single line and signaling links and data links are shown by double lines.

Figure 8:
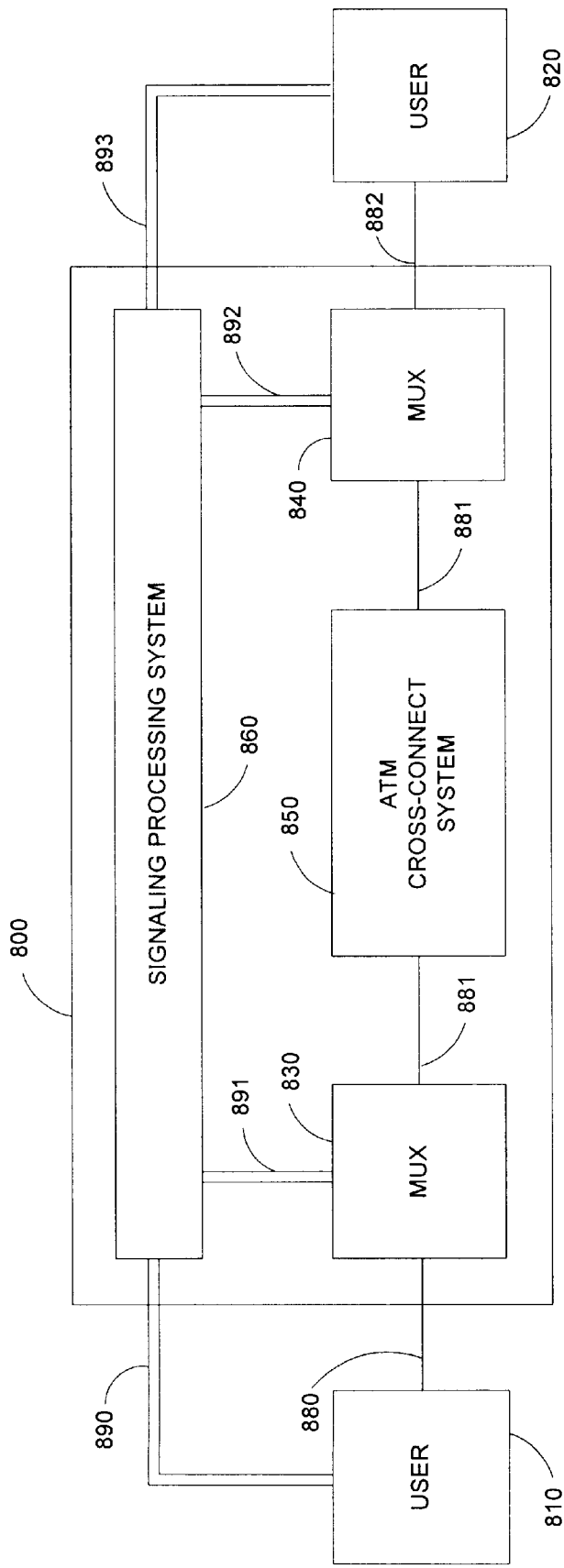
FIG. 8 is a block diagram for a version of the invention.

FIG. 8 depicts telecommunications system 800, user 810, and user 820. Telecommunications system 800 includes ATM interworking multiplexer (mux) 830, mux 840, ATM cross-connect system 850, and signaling processing system 860. User 810 is connected to mux 830 by connection 880. Mux 830 and mux 840 are connected through cross-connect system 850 by connection 881. Mux 840 is connected to user 820 by connection 882. Signaling processing system 860 is linked to user 810 by link 890, to mux 830 by link 891, to mux 840 by link 892, and to user 820 by link 893.

Those skilled in the art are aware that large networks have many more components than are shown. For example, there would typically be a multitude of virtual connections through ATM cross-connect system 850. The number of these components has been restricted for clarity. The invention is fully applicable to a large network.

User 810 and user 820 could be any entity that supplies telecommunications traffic to network 800. Some examples would be a local exchange carrier (LEC) switch or customer premises equipment (CPE). Connections 880 and 882 represent any connection that might be used by user 820 to access system 800. Typically, the user traffic would be provided to system 800 in DS3, format with embedded DS0 circuits, but could also include formats such as DS1, a fractional DS1, 56 kbit data, DS2, clear DS3, E1, E3, or even an SDH or SONET signal with a DS3 or VT based structure. As such, these connections are periodically referred to as access connections. Links 890 and 893 are any links capable of transferring signaling messages with examples being Signaling System #7 (SS7) links or C7 links. ATM cross-connect system 850 is any system that provides a plurality of virtual connections. Such a system could be comprised of individual ATM cross-connect devices interconnected by ATM connections using DS3 or SONET for transport. An example of an ATM cross-connect is the NEC Model 10. Connection 881 could be any virtual connection. In ATM, virtual connections can be designated by a Virtual Path Identification and/or and Virtual Channel Identification in the cell header. Ranges of VPI/VCI may be used to designate the virtual connection. Typically, the virtual connection would use DS1, DS3, or SONET for transport. ATM cross-connect system 850 would be pre-provisioned to provide a plurality of virtual connections through the cross-connect system, and virtual connection 881 represents one of these connections. As virtual connections are logical paths, many physical paths can be used based on the pre-provisioning of ATM cross-connect system 850. Links 891 and 892 could be any links capable of transporting control messages. Examples of such links could be SS7 links, UDP/IP over an ethernet connection, or a bus arrangement using a conventional bus protocol. The components described in this paragraph are known in the art.

Signaling processing system 860 is any processing platform that can receive and process signaling to select virtual connections, and then generate and transmit messages to identify the selections. Various forms of signaling are contemplated, including SS7, C7, and user to network interface (UNI) signaling. A preferred embodiment of the signaling processor is discussed in detail toward the end of the disclosure.

Mux 830 could be any muxing system operable to place user information arriving over connection 880 on the virtual connection selected by signaling processing system 860. Typically, this involves receiving control messages from signaling processing system 860 that identify assignments of virtual connections to access connections on a call by call basis. The mux would convert user traffic from access connection 880 into ATM cells that identify the selected virtual connection. Mux 840 is similar to mux 830. Mux 830 would incorporate the above-described connection processing system to handle these connection assignments. For example, the assigned virtual connection could be stored in a memory location accessed by an index assigned to the access connection. A preferred embodiment of these muxes are also discussed in detail below.

The system would operate as follows for a call from user 810 to user 820. User 810 would seize a connection to system 800. The connection is represented by connection 880 to mux 830. Although, only one connection is shown for purposes of clarity, numerous connections would typically be available for seizure. User 810 would also send a signaling message over link 890 to system 800 initiating the call. This signaling would identify seized connection 880. Signaling processing system 860 would process the message. Such processing could include validation, screening, translating, route selection, echo control, network management, signaling, and billing. In particular, a virtual connection through ATM cross-connect system 850 from mux 830 to mux 840 would be selected, and a connection from mux 840 to user 820 would also be selected. Although many possible connections would be available, only the selected connections are shown—connection 881 and connection 882. Generally, the selection is based on the dialed number, but call processing can entail many other factors with a few examples being the caller's number, destination conditions, network loads and user routing instructions. Also, the dialed number may be translated to make the selection. Signaling processing system 860 would send a control message over link 891 to mux 830 that identifies seized connection 880 and selected connection 881. Signaling processing system 860 would send a control message over link 892 to mux 840 that identifies selected connections 881 and 882.

If required, user 820 would receive signaling to facilitate completion of the call. The signaling from signaling processing system 860 would indicate that system 800 was connecting to user 820 over connection 882. Typically, user 820 would accept and acknowledge the connection in a signaling message back to system 800.

In the above procedure, mux 830 would receive control messages from signaling processing system 860 identifying connection 880 as the access connection and connection 881 as the selected virtual connection through ATM cross-connect system 850. Mux 830 would convert the user information from connection 880 into ATM cells. Mux 830 would designate connection 881 in the cell headers. Connection 881 would have been previously provisioned through ATM cross-connect system 850 from mux 830 to mux 840.

Mux 840 would receive control messages from signaling processing system 860 identifying connection 881 as the selected virtual connection and connection 882 as the selected access connection to user 820. Mux 840 would convert cells arriving on connection 881 to user information suitable for connection 882 to user 820. Although the above example employs two muxes, a single mux could be employed for calls that enter and exit system 800 through the same mux. In this case, the ATM system would simply provide a virtual connection back to the same mux. In alternative embodiments, the mux could even cross-connect the two access connections in and out of the network. This cross-connection of two access connections in a single mux could use an internal cell bus or be accomplished by cross-connection without using ATM. Mux 830 and mux 840 would use the connection processing system describe above to handle the connection assignments in the control messages.

From the above discussion, it can be seen that multiple virtual connections can be pre-provisioned through an ATM cross-connect system to interconnect ATM interworking multiplexers. When a user places a call, one of the virtual connections is selected for the call by the signal processing system and identified to the appropriate muxes. The muxes convert the user information into cells that identify the selected connection. As such, user information can be switched through an ATM fabric on a call by call basis. The system does not require the call processing or signaling capabilities of an ATM switch (although an ATM switch could be used to provide the virtual connections without using its call processing and signaling functions). The system can also implement enhanced services such as N00 and virtual private network (VPN).

Figure 9:
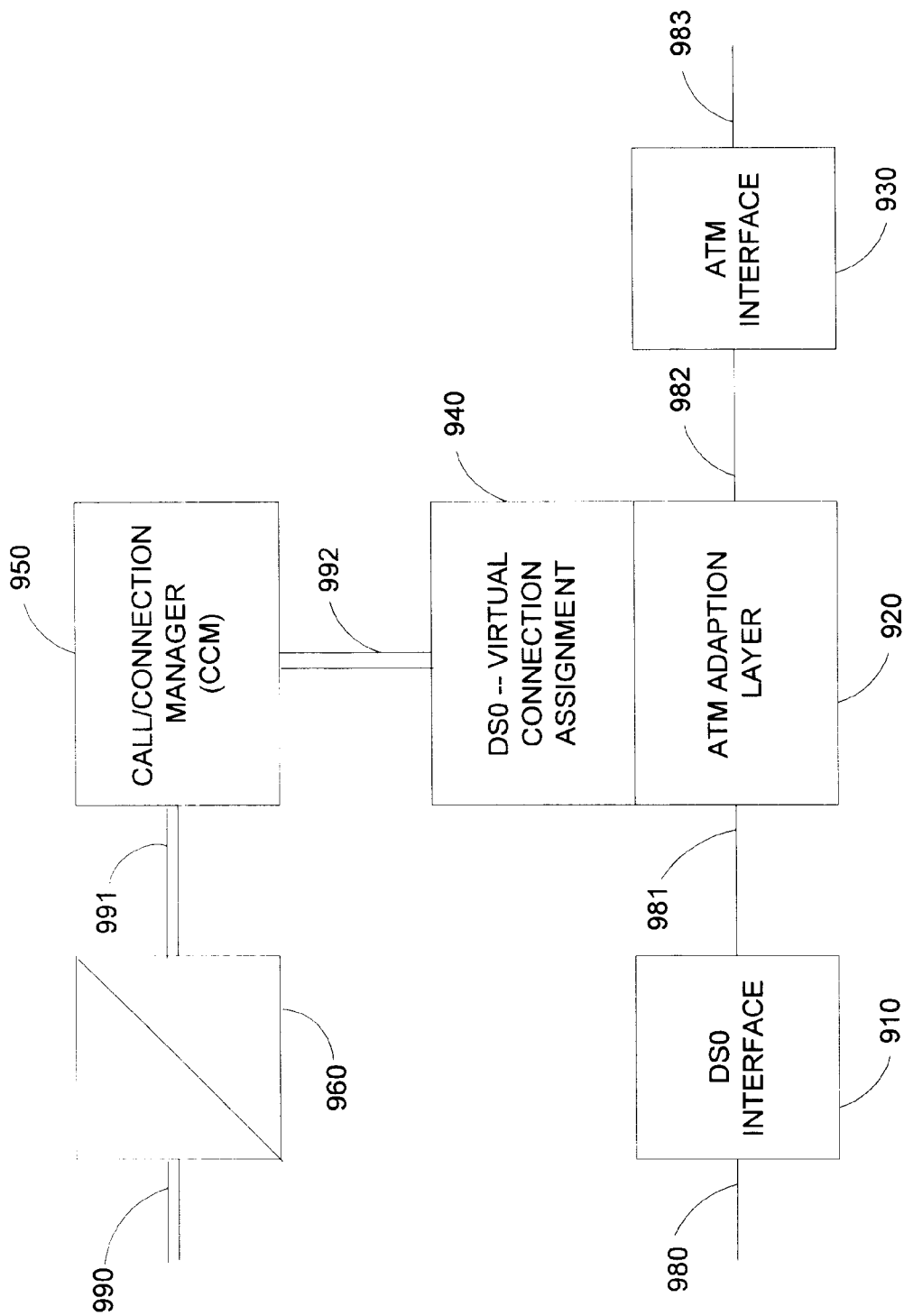
FIG. 9 is a block diagram for a version of the invention.

FIG. 9 DS0 interface 910, ATM adaption layer (AAL) 920, ATM interface 930, DS0—virtual connection assignment 940, call/connection manager (CCM) 950 and signal transfer point (STP) 960. Also shown are connections 980–983 and links 990–992.

Connection 980 could by any connection or group of connections that contain information that can be converted to DS0 format. Examples of these connections are OC-3, VT1.5, DS3, and DS1. DS0 interface 910 is operable to convert user information in these formats into the DS0 format. AAL 920 comprises both a convergence sublayer and a segmentation and reassembly (SAR) layer. AAL 920 is operational to accept the user information in DS0 format from DS0 interface 910 and convert the information into ATM cells. AALs are known in the art and information about AALs is provided by International Telecommunications Union (ITU) document I.363.1. An AAL for voice is also described in patent application Ser. No. 08/395,745, filed on Feb. 28, 1995, entitled "Cell Processing for Voice Transmission", and hereby incorporated by reference into this application. ATM interface 930 is operational to accept ATM cells and transmit them over connection 983. Connection 983 is a standard DS1, DS3 or SONET connection transporting ATM cells. For example, ATM interface 930 and connection 983 might provide transmission for ATM cells over an OC-3c connection. Connection 981 is operational for the DS0 format and connection 982 is operational to transfer ATM cells. It is important to note that the invention is not restricted to AALs for voice, but would be applicable to all AALs.

It can be seen that a communications path through connections 980–983 could be established to carry user information. Although the communications path has been described from connection 980 to connection 983, other components could be used that are also operational to perform reciprocal processing in the reverse direction. If the communications path is bidirectional, user information in ATM cells arriving on connection 983 would be processed for output on connection 980 in the appropriate format. Those skilled in the art will appreciate that separate connections could also be set-up in each direction, or that only a connection in one direction may be required. These components and their operation are known in the art.

Signaling links 990 and 991 are SS7 links. Link 992 is a data link with an example being an ethernet connection transporting UDP/IP, although a bus arrangement could be used if the CCM and the mux are physically integrated. STP 960 is device that routes signaling messages. STPs are well known in the art. CCM 950 would be identified by its own signaling point code. Point codes designate various points in the network and they are used to route signaling messages to these points. STP 960 would route signaling messages with the point code of CCM 950 to CCM 950. The signaling protocol could be based on narrowband Integrated Services Digital Network (ISDN) User Part (N-ISUP) employing Message Transfer Part (MTP) levels 1–3. In some embodiments, the signaling uses N-ISUP messages transported over broadband connections. This would entail a protocol stack of MTP3—Signaling ATM Adaption Layer (SAAL)—ATM. In other words, N-ISUP messages from MTP3 would be encapsulated into ATM cells for transport.

In some embodiments, STP 960 may also convert point codes between the point code for CCM 950 and other point codes. This is so messages sent to other network elements can be diverted to the CCM, and so that messages sent from the CCM can be masked with a point code that is recognized by other network elements. Although point code conversion is not essential, it facilitates the transition of a network to the new systems. The conversion could be implemented through a conversion table located between the discrimination function and the routing function of the MTP level 3 function of STP 960. Mapping would be implemented on a linkset by linkset basis, so affected linksets would flag all incoming messages. Flagged messages would access the conversion table. The conversion table would typically convert the destination point code of the message to that of CCM 950, so that the route function of MTP 3 would forward the message to CCM 950. Point code conversion could be based on many factors with a few examples being the destination point code, the origination point code, the signaling link, the circuit identification code, the message type, and various combinations of these and other factors. For example, any SS7 ISUP messages with particular OPC/DPC combinations could have the DPC converted to the point code of CCM 950. These signaling messages would then be routed to CCM 950 by STP 960. In some scenarios, the origination point code of a message leaving CCM 950 may need to be converted to mask CCM 950 as another point code (i.e. a retired switch). The point code mapping would also have to be implemented within the Signaling Network Management function. In some situations, transfer restricted or transfer prohibited messages will need point code conversion to mask the CCM as the sender. One version of a suitable STP is disclosed in U.S. patent application Ser. No. 08/525,868 entitled "Telecommunications Apparatus, System, and Method with Enhanced Signal Transfer Point", which is hereby incorporated by reference into this application.

CCM 950 is a signaling processor that operates as discussed above. A preferred embodiment of CCM 950 is provided later. In this embodiment CCM 950 would be operable to receive and process SS7 signaling to select connections, and to generate and transmit control messages identifying the selections. Preferably, a single CCM would be associated with a single mux or a group of muxes.

Assignment 940 is a control interface that accepts messages from CCM 950. In particular, assignment 940 receives and identifies DS0/virtual connection assignments in the messages from link 992. These assignments are provided to AAL 920 for implementation. As such, AAL 920 obtains the virtual path identifier (VPI) and virtual channel identifier (VCI) for each call from assignment 940. AAL 920 also obtains the identity of the DS0 for each call (or the DS0s for an N×64 call). AAL 920 then converts user information between the identified DS0 and the identified ATM virtual connection. Assignment 940 would use the connection processing system to facilitate this processing. Acknowledgments that the assignments have been implemented may be sent back to CCM 950 if desired. It should be noted that these assignments are dynamically received and implemented on a call-by-call basis. This is in contrast to conventional interworking muxes that operate using static assignments. The static assignments can be altered through a provisioning process, but provisioning is not dynamically done on a call-by-call basis.

In operation, calls are processed as follows. Signaling messages for calls arrive on link 990 and are routed by STP 960 to CCM 950. Access connections are typically seized contemporaneously with the signaling. All of these connections are represented by connection 980. DS0 interface 910 would convert the traffic on connection 980 into the DS0 format and provide the DS0s to AAL 920 over connection 981.

The signaling received by CCM 950 would identify the access connections for the calls (i.e. the particular DS0s on connection 980), and contain call information, such as dialed numbers. CCM 950 would process the signaling and select connections for the calls. Since multiple virtual connections are pre-provisioned from ATM interface 930 to the other destinations in the network, CCM 950 can select a virtual connection to the destination. The selection process can be accomplished through table look-ups. For example, a table could be used to translate a portion of the dialed number into a VPI. The VCI would be selected based on the available VCIs in the selected VPI. The VPI/VCI combination would correspond to a unique virtual connection pre-provisioned from ATM interface 930 to the appropriate network destination. The selections represent the DS0—virtual connection assignments that are provided to assignment 940 over link 992.

Assignment 940 accepts the DS0—virtual connection assignments and provides them to AAL 920. When AAL 920 receives a particular assignment, it places user information bytes from the designated DS0 into cells and appends a header to the cells that identifies the designated VPI/VCI. The cells are provided to ATM interface 930 over connection 982. ATM interface 930 accepts the cells and places them within the transport format for connection 983. The cells are then transported over the selected virtual connection to the appropriate destination.

Calls also exit the network through connection 980. In this case, other CCMs at the origination points select the virtual connections to ATM interface 930. The originating CCMs also send signaling messages to CCM 950. The signaling messages identify the destinations for the calls and the selected virtual connections. CCM 950 will have a list of available access connections to the identified destinations. CCM 950 will select the access connections to the destinations from the list. For example, the connection selected by CCM 950 could be a DS0 embedded within a DS3 connected to a LEC. The virtual connections on connection 983 and selected access connections on connection 980 are provided to assignment 940 over link 992. Assignment 940 provides these assignments to AAL 920.

ATM interface 930 will demux the cells arriving from connection 983 and provide them to AAL 920. AAL 920 converts the user information in the cells into the DS0 format. AAL 920 make the conversion so that cells from a particular virtual connection are provided to the assigned DS0 on connection 981. DS0 interface will convert the DS0s from connection 981 into the appropriate format, such as DS3, for connection 980. Those skilled in the art are aware of the techniques for muxing and transporting DS0 signals. The above-described connection processing system could also be used for this reciprocal processing.

From the above discussion, it can be seen that user information for calls can flow from connection 980 to connection 983, and in the reverse direction from connection 983 to connection 980. DS0 interface 910 and ATM interface 930 provide user information in their respective formats to AAL 920. AAL 920 converts the user information between DS0 and ATM formats based on the assignments from assignment 940. CCM 950 can select the DS0—virtual connection assignments that drive the process.

THE ATM INTERWORKING MULTIPLEXER

Figure 10:
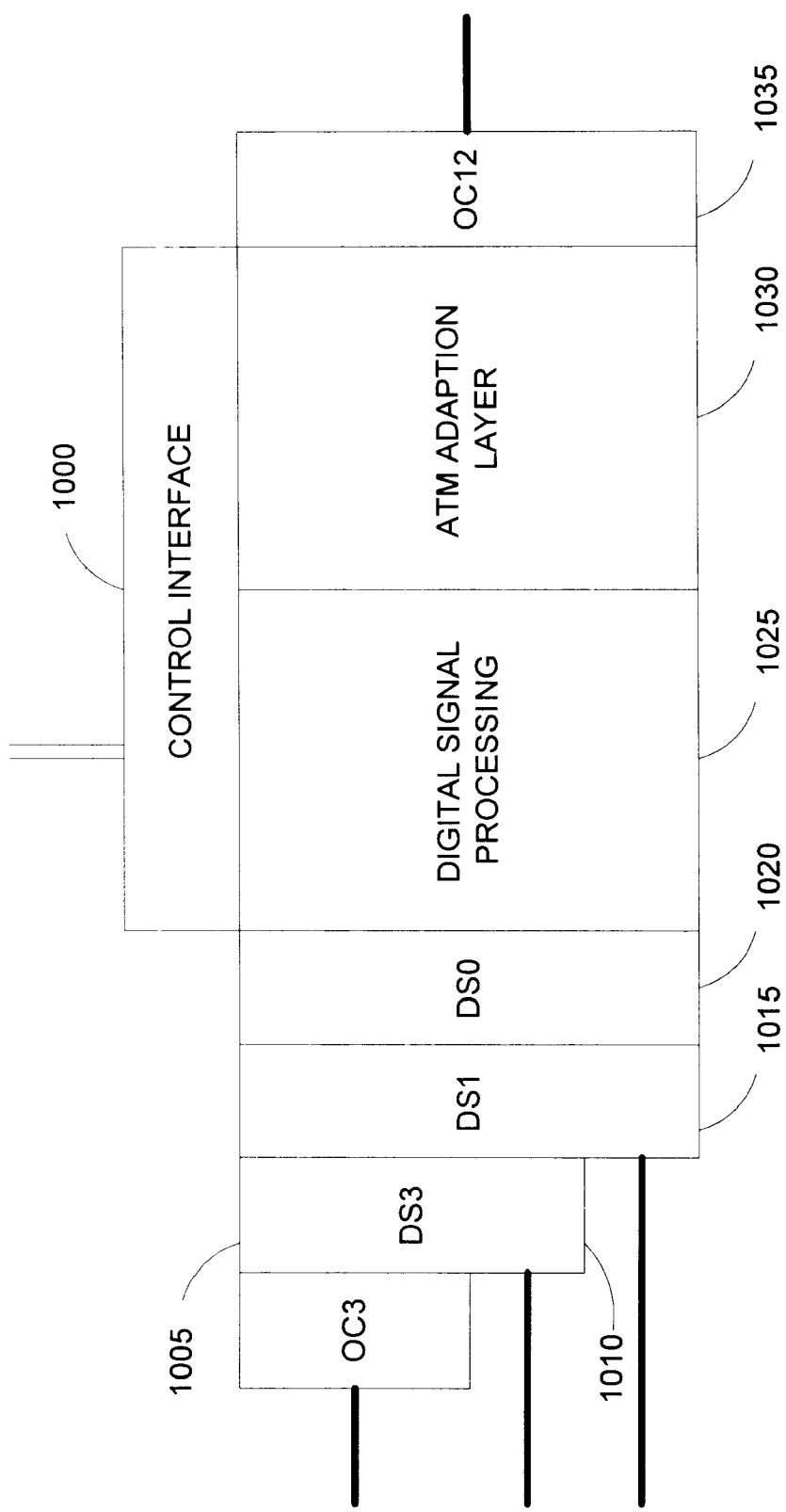
FIG. 10 is a block diagram for a version of the invention.

FIG. 10 shows one embodiment of the mux, but other muxes that support the requirements of the invention are also applicable. Shown are control interface 1000, OC-3 interface 1005, DS3 interface 1010, DS1 interface 1015, DS0 interface 1020, digital signal processing (DSP) 1025, AAL 1030, and OC-12 interface 1035.

OC-3 interface 1005 accepts the OC-3 format and makes the conversion to DS3. DS3 interface 1010 accepts the DS3 format and makes the conversion to DS1. DS3 interface 1010 can accept DS3s from OC-3 interface 1005 or from an external connection. DS1 interface 1015 accepts the DS1 format and makes the conversion to DS0. DS1 interface 1015 can accept DS1s from DS3 interface 1010 or from an external connection. DS0 interface 1020 accepts the DS0 format and provides an interface to digital signal processing (DSP) 1025.

DS0 interface 1020 is coupled to DSP 1025. DSP 1025 is capable of manipulating the user information to improve transmission quality. DSP processing primarily entails echo cancellation, but could include other features as well. As is known, echo cancellation can be required for voice calls. DSP 1025 passes the DS0s through echo cancellers. These echo cancellers must be disabled for calls that do not require echo control. Data calls do not require echo cancellation, and the CCM has the ability to recognize data calls that require an echo canceller to be disabled. The CCM will send a control message to DSP 1025 indicating the particular echo canceller that is to be disabled. The CCM selects the echo canceller based on the Circuit Identification Code (CIC) in the signaling it receives from the user. After the data call, the CCM sends a message that causes the particular echo canceller to be enabled again for subsequent voice calls. The above technique of applying echo control is preferred, but other means of implementing echo control instructions from the CCM are also applicable.

In addition to echo control, the CCM and the mux can work to provide other digital signal processing features on a call by call basis. Compression algorithms can be applied, either universally, or on a per call basis. The decibel level could be adjusted for calls form a particular origin or to a particular destination, i.e. where a hearing impaired person may reside. Encryption could be applied on a call-by-call basis based on various criteria like the origination number or the destination number. Stored messages could be placed on the line, DTMF tones could be detected and transmitted on the line. DTMF information might be exchanged with the CCM, or another service platform. Various DSP features could be associated with various call parameters and implemented by the CCM through DSP 1025.

DSP 1025 is connected to AAL 1030. AAL 1030 operates as described above for an AAL. DS0—virtual connection assignments from control interface 1000 are implemented by AAL 1030 when converting between the DS0 and ATM formats. Calls with a bit rate greater than 64 kbit/sec. are known as N×64 calls. If desired, AAL 1030 can be capable of accepting control messages through control interface 1000 from the CCM for N×64 calls. The CCM would instruct AAL 1030 to group the DS0s for the call. In addition, the above-described connection processing system would be used to handle these connection assignments.

THE ATM CROSS-CONNECT SYSTEM

Figure 11:
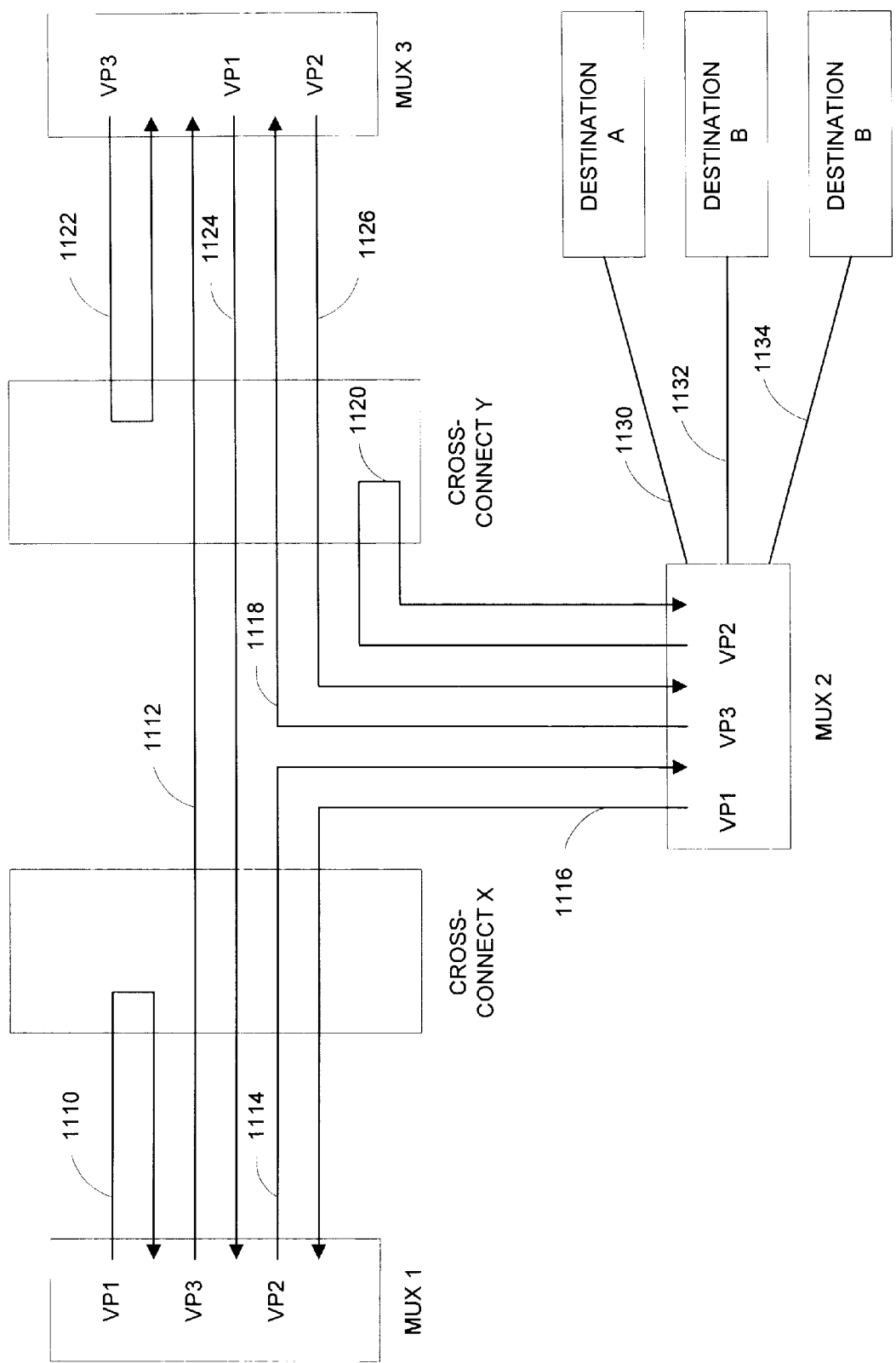
FIG. 11 is a logic diagram for a version of the invention.

FIG. 11 depicts virtual connections provided by the ATM cross-connect system, although numerous other techniques for providing virtual connections will be appreciated by one skilled in the art. Shown are virtual connections 1110, 1112, 1114, 1116, 1118, 1120, 1122, 1124, and 1126. These virtual connections are shown interconnecting muxes 1, 2, and 3 through cross-connects X and Y. Virtual connections are provisioned in between each mux. Each mux would have a virtual path provisioned through the cross-connect system to every mux. Additional virtual paths could be provisioned between two muxes using diverse physical routes for the sake of redundancy. These virtual paths are designated in the ATM cells by the VPI. The VPIs are designated locally by the cross-connects to be the destination mux. For example, connections 1110, 1116, and 1124 are all designated as VP1 because they terminate at mux 1. Connections that terminate at mux 2 can be defined locally as VP2. On a call entering at mux 1, the NPA-NXX of the dialed number might be analyzed to select mux 2 as the terminating mux. As such the VPI used on the call would be VP2. From mux 1, VP2 connects to mux 2. The VCIs in VP2 would also be tracked and an available one would be selected. As an alternative to VPI provisioning between muxes, ranges of VCIs may be provisioned between muxes to add granularity below the VPI level.

Additional granularity is required to specify the destination beyond the mux. For example, a mux might be connected to several different destination over several different DS3 trunks. This is illustrated by connections 1130, 1132, and 1134 between mux 2 and destinations A, B, and C respectively. On a call through mux 2, it could be desirable to specify the destination for the call to mux 2 in addition to the VPI/VCI the call will use. This could be done by designating both the VPI/VCI and the destination code in the message from the originating CCM to the terminating CCM. The terminating CCM would then select the DS0 to the destination. This allows the local CCM to select DS0s to a pre-selected destination.

Typically, calls will require a bi-directional voice connection. Conventional voice circuits, such as the DS0, are bi-directional. ATM connections are not typically bi-directional. For this reason, a virtual connection must also be selected to transport user information in the opposite direction—terminating to receiving. This could be done by simply loading corresponding memory locations with the corresponding VPI/VCI to make the connection bi-directional. If only a uni-directional communications path is required, this may be omitted.

OPERATION WITHIN A NETWORK

Figure 12:
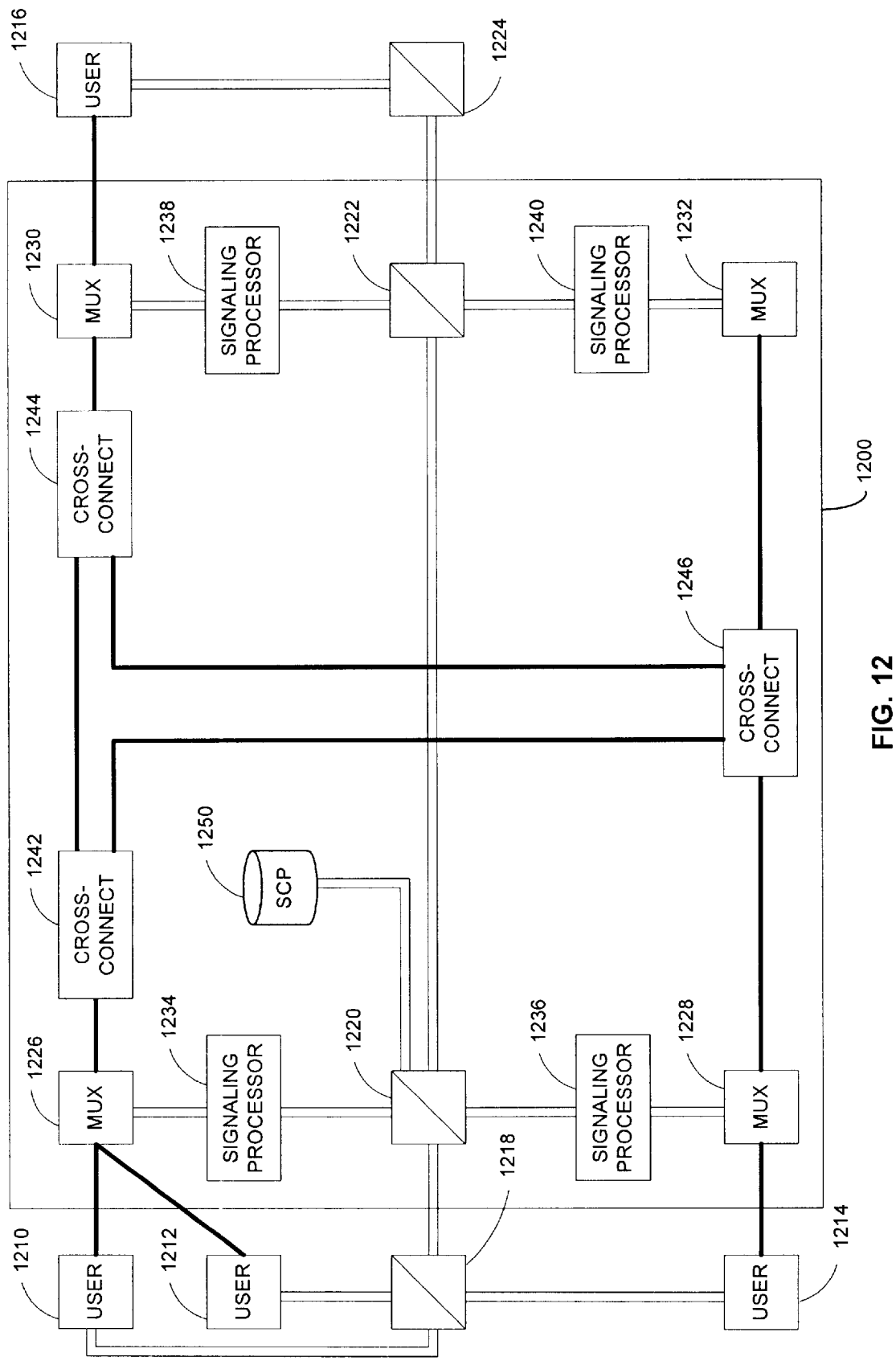
FIG. 12 is a block diagram for version of the invention.

FIG. 12 depicts telecommunications system 1200. Shown are user 1210, user 1212, user 1214, user 1216, STP 1218, STP 1220, STP 1222, STP 1224, mux 1226, mux 1228, mux 1230, mux 1232, call/connection manager (CCM) 1234, CCM 1236, CCM 1238, CCM 1240, ATM cross-connect 1242, ATM cross-connect 1244, ATM cross-connect 1246, and Service Control Point (SCP) 1250. The CCMs are designated as "signaling processor" on FIG. 12. For clarity, the connections and signaling links are not numbered. Except for the SCP, all of these components are described above, and the CCMs are also discussed below. SCPs are well known in the art. An SCP is a processor and database that answers signaling queries to assist in call processing. An example is an "800" routing query between a switch and an SCP.

In operation, user 1210 may forward an 800 call to system 1200. User 1210 could be connected to mux 1226 with a DS3 connection. The 800 call would occupy a DS0 embedded in the DS3 connected to mux 1226. User 1210 would send an SS7 Initial Address Message (IAM) through STP 1218 to system 1200. STP 1220 would be configured to route the IAM to CCM 1234. An IAM contains information such as the dialed number, the caller's number, and the circuit identification code (CIC). The CIC identifies the DS0 used by user 1210 for the call.

CCM 1234 would process the IAM and identify that the call was an 800 call. After initial call processing, CCM 1234 would query SCP 1250 for routing instructions. SCP 1250 would translate the dialed number based on the 800 subscriber's routing plan. For example, 800 calls from user 1210 may be routed to user 1212 during business hours, to user 1214 at night, and to user 1216 on weekends. If the call is placed from user 1212 on a weekend, the call would be routed to user 1216. As such, SCP 1250 would return the POTS number for user 1216 to CCM 1234.

CCM 1234 would process the POTS number to select: 1) the VPI/VCI for a virtual connection from mux 1226 to mux 1230, 2) the destination point code (DPC) for CCM 1238, and 3) the identification of a trunk group from mux 1230 to user 1216. CCM 1234 would generate an IAM message to send to CCM 1238 and insert the selected information. Since the two muxes define the VPI between them, the originating point code and the destination point code of the IAM can be used by CCM 1238 to identify the selected VPI for the call. The OPC and DPC would be placed in the routing label of the IAM.

The VCI and trunk group ID could be placed in the CIC field of the IAM including the two spare bits. Since 16 bits are available, 256 trunk groups and 256 VCIs are available. These bits should be configured to allocate 256 VCIs to each of the 256 trunk groups that are available for each VPI. The terminating CCM would have to use both the VPI code and the CIC to identify the actual VCI in the cell headers. In other words, between an originating mux and a terminating mux there is one VPI. For that VPI, there are 256 possible trunk groups to connect to on the other side of the mux, and 256 VCIs are allocated for each VPI/trunk group combination. CCM 1234 would send the IAM message to CCM 1238 through STP 1220 and STP 1222. If the IAM is N-ISUP, it could be transported conventionally or over ATM connections by using an SAAL and an ATM layer to encapsulate the message. In the alternative to the above scenario, the VPI, VCI, and trunk group could be identified in a private parameter of the IAM, or they could be delivered in a separate message between the CCMs.

CCM 1234 has effectively routed the call for CCM 1238. If N-ISUP is used for the IAM format, the routing label and the CIC are at a fixed location. Because the VPI/VCI and the trunk group to user 1216 are coded into the IAM at a fixed location. CCM 1238 does not need to parse the entire IAM or perform detailed call processing. CCM 1238 only needs to select an available DS0 in the identified trunk group and to select the DPC for user 1216. The service indicator, also at a fixed location of the IAM, could be used to indicate to a terminating CCM that the originating CCM has pre-routed the call, and that call processing need only entail selection of a DS0 and DPC for the identified trunk group. DS0 and DPC selection could be accomplished by a database look-up. Echo control can be handled in a similar manner. CCM 1234 handles echo control at the originating side of the call. For echo control at the terminating side, CCM 1234 could use the service indicator to indicate that echo control did not need to be handled by CCM 1238. This would be the case for a conventional voice call where an echo canceller is already active at the terminating side. Alternatively, CCM 1238 could assess echo control using fixed parts of the IAM and still avoid parsing the entire message. In some embodiments, it may be desirable to have CCM 1238 process the IAM in a similar fashion as CCM 1234.

Typically, mux 1230 would be connected to user 1216 with a DS3 trunk group. CCM 1238 would select a DS0 embedded in the DS3 and would send an IAM to user 1216 through STP 1222 and STP 1224. The CIC of this IAM would indicate that a call was being routed to user 1216 over the selected DS0. This CIC would be in conventional 14 bit format with two spare bits. User 1216 would process the IAM and complete the call. When the call is answered, user 1216 would transmit an answer message (ANM) through STP 1224 back to system 1200.

CCM 1234 would also send a UDP/IP message to mux 1226 instructing it to assemble the user information in the DS0 from user 1210 into ATM cells with a cell header identifying the selected VPI/VCI. CCM 1238 would send a UDP/IP message to mux 1230 instructing it to dis-assemble ATM cells from the selected VPI/VCI and output the user information to the selected DS0 to user 1216. ATM cross-connect 1242 would route ATM cells from mux 1226 to ATM cross-connect 1244 based on the cell header. Likewise, ATM cross-connect 1244 would route these cells to mux 1230 based on the cell header. As such, user information for the call would flow from user 1210 to user 1216 over the DS0 from user 1210, the virtual connection selected by CCM 1234, and the DS0 to user 1216 selected by CCM 1238. The muxes would implement the selections of the CCMs.

The call would require that a voice channel be available in both directions. As such, the DS0s and virtual connection would be bi-directional. In the ATM system, this could be accomplished by assigning a reciprocal VPI/VCI in the reverse direction for each VPI/VCI in the forward direction. Cut-through on the receive channel (from the user 1216 to the user 1210) would occur after the address complete message (ACM) had been received by system 1200. Cut-through on the transmit channel (from the user 1210 to the user 1216) would occur after the answer message (ANM) had been received by system 1200. This could be accomplished by not allowing mux 1230 to release any cells for the call until the ANM has been received by system 1200.

If user 1210 were to place the call at night, CCM 1234 and SCP 1250 would determine that user 1214 was the destination. Accordingly, a pre-provisioned virtual connection from mux 1226 through ATM cross-connect 1242 and ATM cross-connect 1246 to mux 1228 would be selected by CCM 1234 for the call. CCM 1236 would select the DS0 to user 1214.

If user 1210 were to place the call during the day, CCM 1234 would determine that user 1212 was the destination. Accordingly a pre-provisioned virtual connection from mux 1226 through ATM cross-connect 1242 and back to mux 1226 would be selected for the call. CCM 1234 would also select the DS0 to user 1212. In some embodiments, the mux could be designed to cross-connect DS0 to DS0 as well as DS0 to VPI/VCI. In this case, mux 1226 would make a DS0 to DS0 connection in response to the message from CCM 1234 and the ATM system would not be used.

THE CALL/CONNECTION MANAGER (CCM)

Figure 13:
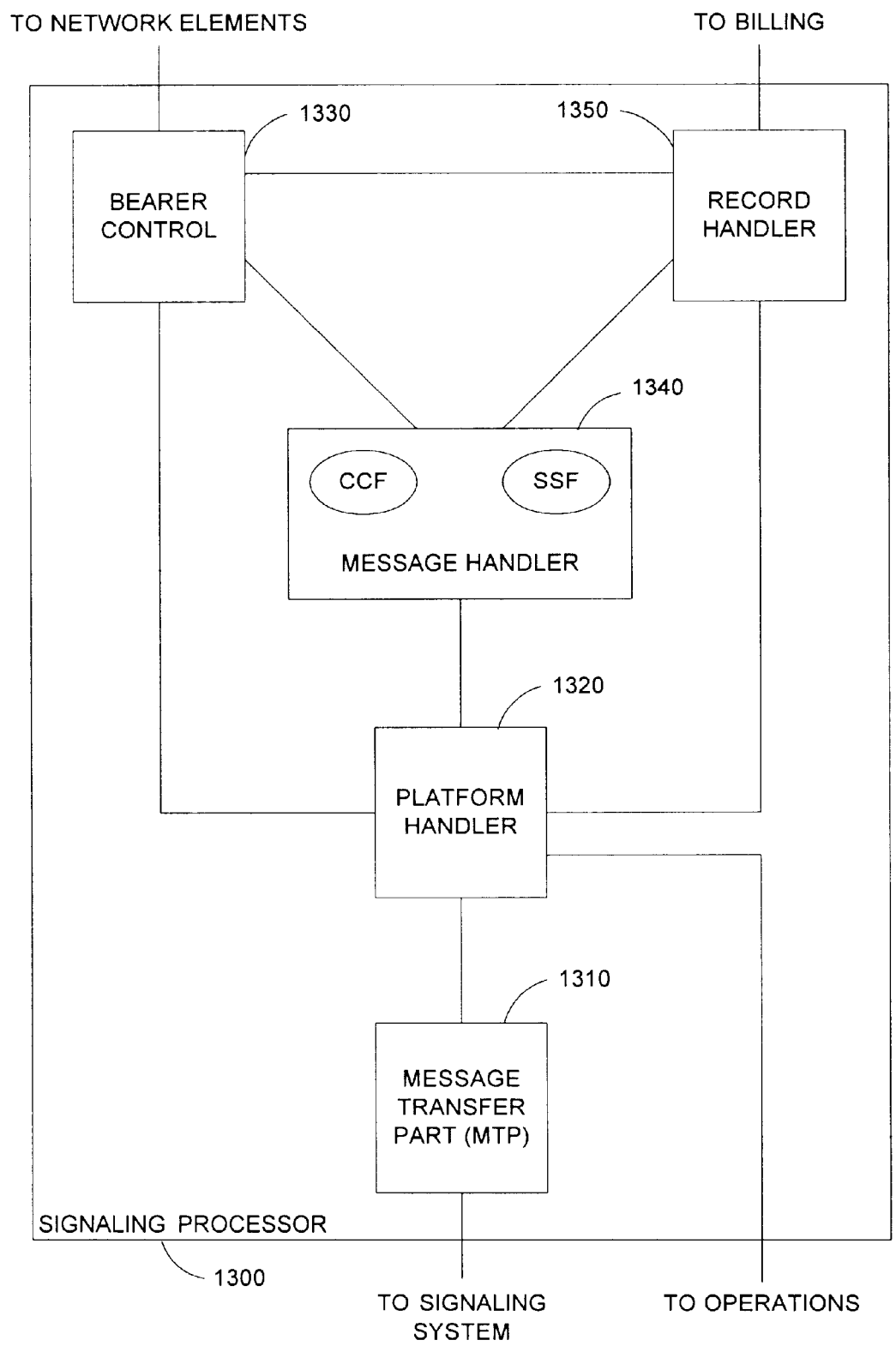
FIG. 13 is a logic diagram for a version of the invention.

FIGS. 13–12 refer to a preferred embodiment of the signaling processor, also known as the CCM, but any processor which supports the stated requirements would suffice. FIG. 13 depicts one such signaling processor. Signaling processor 1300 would typically be separate from the mux, but those skilled in the art appreciate that they could be housed together and coupled in a bus arrangement instead of being coupled by a data or signaling link. Signaling processor 1300 may support a single mux or support multiple muxes.

Signaling processor 1300 includes Message Transfer Part (MTP) 1310. MTP 1310 can be comprised of signaling point software that is known in the art. MTP 1310 includes various levels known as MTP 1, MTP 2, and MTP 3. MTP 1 defines the physical and electrical requirements for a signaling link. MTP 2 sits on top of MTP 1 and maintains reliable transport over a signaling link by monitoring status and performing error checks. Together, MTP 1–2 provide reliable transport over an individual link. A device would need MTP 1–2 functionality for each link it uses. MTP 3 sits on top of MTP 2 and provides a routing and management function for the signaling system at large. MTP 3 directs messages to the proper signaling link (actually to the MTP 2 for that link). MTP 3 directs messages to applications using MTP 1310 for access to the signaling system. MTP 3 also has a management function which monitors the status of the signaling system and can take appropriate measures to restore service through the system. MTP levels 1–3 correspond to layers 1–3 of the open systems interconnection basic reference model (OSIBRF). MTP 1310 could also include Signaling Connection Control Part (SCCP) functions, as well as, TCAP, and ISUP functional interfaces. In addition, MTP 1310 may be equipped with ISUP timers that generate release messages or re-transmit messages where appropriate.

If B-ISUP signaling is being used, MTP 1310 could also be equipped with B-ISUP capability. All of these elements are known in the art.

Also shown for signaling processor 1300 are platform handler 1320, bearer control 1330, message handler 1340, and record handler 1350. MTP 1310 could be connected to platform handler 1320 by an ethernet interface supporting TCP/IP which transfers signaling messages from MTP 1310 to platform handler 1320. Those skilled in the art will recognize other interfaces and protocols which could support these functions.

Platform handler 1320 is a system which accepts ISUP messages from MTP 1310 and routes them to message handler 1340. Message handler 1340 is a system which exchanges signaling with platform handler 1320 and controls the connection and switching requirements for the calls. Bearer control 1330 handles bearer capabilities for the call. Record handler 1350 generates call records for back-office systems.

In operation, ISUP messages are routed by MTP 1310 to platform handler 1320. Platform handler 1320 would route the ISUP messages to message handler 1340. Message handler 1340 would process the ISUP information. This might include validation, screening, and retrieving additional data for call processing. Bearer control 1330 would implement the bearer capabilities required, such as echo cancellation, through control messages to the appropriate network elements. Message handler 1340 would complete call processing. Message handler 1340 would generate the appropriate messages to implement the call and pass the messages to platform handler 1320 for subsequent transmission to the designated network elements. Message handler 1340 would also receive ISUP messages from MTP 1310 at the completion of the call. Message handler 1340 would process these messages and generate subsequent messages to tear down the call. Record handler 1350 would obtain call information from message handler 1340 and use this information to generate call records. The call records could be used for billing purposes.

Functional entities are well known in the art. Message handler 1340 includes at least the call control function (CCF) and the service switching function (SSF). The CCF establishes and releases call connections, and the SSF recognizes triggers during call processing by the CCF and provides an interface between the CCF and the service control function (SCF). The SCF identifies services and obtains data for the service, and is preferably housed in a remote database, such as an SCP. (As such, the SCF is not shown on FIG. 13.) Message handler 1340 is able to control connections, recognize triggers, and access the SCF in a remote database.

Signaling processor 1300 is comprised of hardware and software. One example of a such hardware is the FT-Sparc provided by Integrated Micro Products PLC. The FT-sparc could use the Solaris operating system also provided by Integrated Micro Products PLC. MTP 1310 could be constructed using commercially available SS7 software interface tools. An example of such tools would be SS7 interface software provided by either Trillium, Inc or by Dale, Gesek, McWilliams, and Sheridan, Inc. Any data storage requirements could be met with conventional database software systems.

Software for platform handler 1320, bearer control 1330, message handler 1340, and record handler 1350 could be produced in the following manner. The Intelligent Network Conceptual Model (INCM) of the ITU-T Q.1200 series could be mapped to Specification Design Language (SDL) of ITU-T Z.200 and Message Sequence Charts (MSC) of ITU-T Z.120. Various detection points and points-in-call in the INCM can be skipped to optimize call processing. The SDL could then be compiled into C or C++ and loaded onto the FT-sparc. The software is primarily comprised of several static processes, instantiated processes (from static processes), and communication channels between the processes. Preferably, the software processes would be partitioned into several operating system tasks. Further requirements for the software design will become apparent in the following discussion.

THE PLATFORM HANDLER

Platform handler 1320 is preferred, but is not required as its functions could be handled by MTP 1310 and/or message handler 1340. Platform handler 1320 has messaging interfaces that exchange, buffer, dis-assemble, and re-assemble messages for MTP 1310, bearer control 1330, message handler 1340, and record handler 1350. Platform handler 1320 could exchange these messages over an ethernet—TCP/IP interface, but any technique for transfer of messages is contemplated. Platform handler 1320 could also check the messages for basic flaws. Should more than one message handler be connected to platform handler 1320, ISUP messages could be allocated to the message handlers based on the SLS of the particular ISUP message. Platform handler 1320 also accepts routing instructions from message handler 1340 for routing certain ISUP messages to particular select call model processes of message handler 1340.

Platform handler 1320 is also responsible for managing and monitoring CCM activities. Among these are CCM start-up and shut-down, log-in and log-off of various CCM modules, handling administrative messages (i.e. error, warning, status, etc.) from the CCM modules, and handling messages from network operations such as queries, configuration instructions, and data updates. The connections to the various CCM modules are shown. The connection to network operations is the man machine interface which allows the CCM to be controlled and monitored by either a remote or a local operator. Platform handler 1320 has a process which retrieves configuration data from internal tables to initialize and configure the CCM. The CCM modules also have internal tables which are used in conjunction with this procedure.

THE MESSAGE HANDLER

Figure 14:
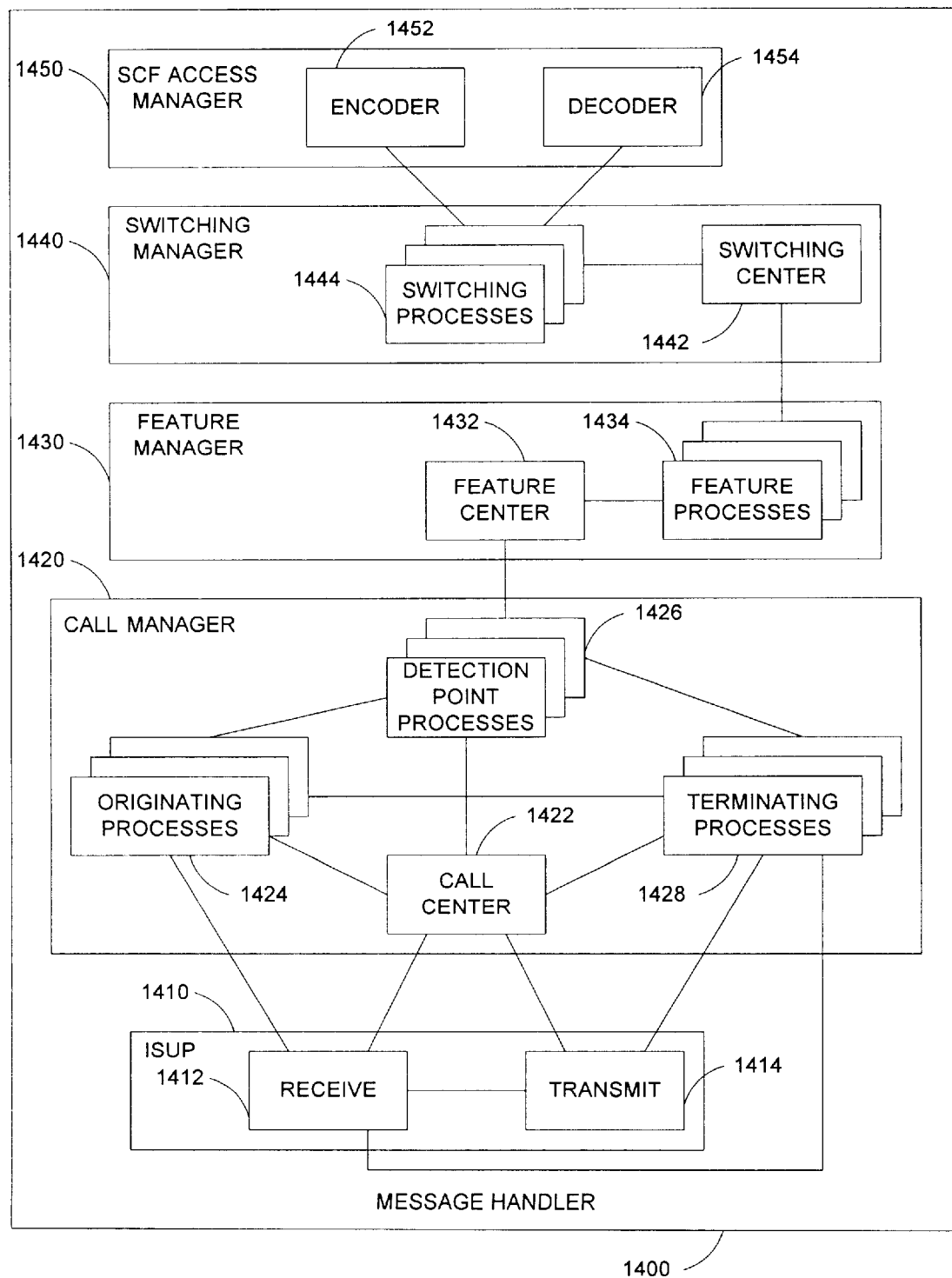
FIG. 14 is a logic diagram for a version of the invention.

FIG. 14 depicts a version of the message handler. External connections have been omitted for the sake of clarity. Message handler 1400 is shown and includes ISUP 1410, call manager 1420, feature manager 1430, switching manager 1440, and SCF access manager 1450. The primary function of message handler 1400 is to process ISUP messages for calls, generate subsequent messages, and invoke services. As a result of its processing, message handler 1400 is able to assign incoming access connections (CICs in SS7) to VPI/VCIs and instruct the mux to provide SVPs and SVCs through an ATM cross-connect system.

ISUP 1410 receives generic ISUP messages from the platform handler and converts them into specially formatted ISUP messages using receive 1412. ISUP 1410 reverses this process in transmit 1414 for messages sent to the platform handler. Receive 1412 forwards formatted messages to call manager 1420. ISUP 1410 also exchanges local management message with the platform handler.

Call manager 1420 could include the functionality specified in the Intelligent Network Call Model (INCM) of ITU-T Q.1214 which encompasses the main functionality of the CCF. Call center 1422 receives IAM messages and creates an originating call model process for each IAM. Each originating process is parameterized with data from its particular IAM. Additional origination processes can be created based on the IAM if it is a multi-party call. All of these originating processes are represented by originating processes 1424.

An originating process will typically create a detection point process. All of the detection point processes created are represented by detection point processes 1426. Each originating process will also set-up a call control block containing data for the call. Each origination process will execute through a point-in call to a detection point. When detection points are encountered, and the originating process has not been programmed to skip them, a signal representing the detection point is forwarded to the corresponding detection point process. As stated above, call processing can be streamlined by skipping selected detection points and points-in-call. When an originating process sends a detection point signal to the corresponding detection point process, processing is suspended at the originating process until a response is received from the detection point process.

Detection point processes 1426 provides a portion of the SSF and acts as a buffer between the call processes and feature manager 1430. A detection point process analyzes the detection point signal from the origination process to determine if is should be acted on or if it can be ignored. If the processing results in a service request or notification, a corresponding signal is sent to feature manager 1430. Detection point responses from feature manager 1430 are forwarded back to the appropriate call process. Once call set-up has been authorized for the originating process, a detection point process will also send a signal to call center 1422 to create a terminating process.

These terminating processes are represented by terminating processes 1428. A terminating process creates and interacts with detection point processes 1426 much like an originating process. A terminating process also creates a terminating call control block. ISUP information is transferred from the originating process for a call to the terminating process for the call. The platform handler is instructed of the originating and terminating processes so that subsequent ISUP messages related to that call can be transferred directly to the appropriate processes by the platform handler. Both originating and terminating processes have a local database. For example, a termination process might access local data to translate the NPA-NXX of a dialed number into the VPI to a destination mux.

The originating processes and terminating processes also exchange messages with bearer control. Typically, these messages relate to echo canceller and mux control. For calls that pass through two muxes (an originating mux into the ATM network and a terminating mux out of the ATM network), both an origination and termination process is required for each mux—a total of four call processes. The originating process for the originating mux will handle echo cancellation for the origination side of the call. The termination process for the origination mux will handle mapping the incoming DS0 to the VPI/VCI. The termination process for the terminating mux will map the VPI/VCI to an outgoing DS0 and handle echo cancellation for the terminating side of the call. If only one mux is used on the call (in and out of the network at the same mux), only a single origination process and a single termination process is required.

The originating processes and terminating processes also exchange messages with the record handler. Typically, these messages relate to billing and operational measurements. Upon call tear down, the record handler receives the originating and terminating call control blocks for billing purposes. These call control blocks typically would identify the following: the call control block ID, the originating/terminating process ID, the message handler, the originating LEC, the LEC trunk circuit (CIC), the ATM virtual circuit, the ATM virtual path, the caller's number, the dialed number, the translated dialed number, the originating line information, the ANI service class, the selected route, the number of the selected route, the SLS, the OPC, the DPC, the service indicator (SIO), echo cancellation status, reason of release, call status, and pointers to adjacent call control blocks. In addition, the call control block would also contain the various times that signaling messages are received, such the address complete message (ACM), the answer message (ANM), the suspend message (SUS), the resume message (RES), and the release message (REL). Those skilled in the art would be aware of other pertinent data to include.

Call manager 1420 communicates with feature manager 1430. Feature manager 1430 handles interaction of services for the call. Examples of services would be 800 calls, PCS calls, and VPN calls, but there are many others. Feature manager 1430 is comprised of feature center 1432 and feature processes 1434. Feature center 1432 receives the detection point messages from the detection point processes 1426. Feature center 1432 then creates a feature process for each call. These processes are represented by feature processes 1434. The feature process will determine if additional data is needed for the detection point. If so, a signal is sent to switching manager 1440. Responses from switching manager 1440 are sent to the appropriate detection point process by the feature process for the call.

In this embodiment, the feature process sends all such service signals to switching manager 1440. In other embodiments, services may be segregated into "IN" and "non-IN" services, the feature process would then have to select between an "IN" switching manager or a "non-IN" switching manager when sending service signals to switching manager 1440.

Switching manager 1440 is comprised of switching center 1442 and switching processes 1444. Switching manager creates a switching process for each service required on the call. These switching processes are represented by switching processes 1444. A switching process will communicate directly with the associated feature process for the call. The switching process will also interface with the SCF. As stated above, the SCF provides the service processing for the call and is preferably located at a remote database. A typical example of accessing SCF would be to send a TCAP query to a service Control Point (SCP) for an "800" number translation. In order to access the SCF, the switching process will use SCF access manager 1450. SCF access manager 1450 is comprised of encoder 1452 and decoder 1454. Encoder 1452 converts signals from switching processes 1444 into the proper format for SCF access. Decoder 1454 converts messages from the SCF back into the format for switching processes 1444. SCF access manager 1450 would typically access the SCF over standard communications links. One example would be an SS7 link using the TCAP/INAP/ASN.1 protocol specified by the ITU. If SS7 is used, SCF access manager 1450 could forward its TCAP messages to the MTP function (MTP 1310 of FIG. 13) for subsequent transfer to an STP and SCP.

From the above discussion, it should be clear that message handler 1400 is comprised of static processes identified as "centers" that create specific processes for each call. Once created, these specific call processes communicate directly with one another to accomplish call processing.

BEARER CONTROL AND THE RECORD HANDLER

The following discussion refers to both FIGS. 13 and 14. Depending on which call segment (originating or terminating) is being processed, the origination process or the termination process will check the user service information data and originating line information to assess the need for echo control. If the call is a data call, a message is sent to bearer control 1330. Based on the CIC, bearer control 1330 can select which echo canceller circuit needs to be disabled. A message will be generated to that effect and transmitted over a standard data link, such as UDP/IP, to the pertinent echo control system. If the echo canceller is remote, a T1 link may be desired for transport. As described above, echo control can be implemented by the multiplexer. Once a release (REL) message is received for the call, the echo canceller is re-enabled. On a typical call, this procedure will occur twice. Once for an echo canceller on the originating side of the call, and again for an echo canceller on the terminating side of the call. The CCM that handles the IAM for a particular call segment will control the particular echo cancellers for the segment. An example of an echo control system would be a Tellabs echo canceller controller with ethernet interfaces connected over an asynchronous bus to the echo cancellers. The echo cancellers could be integrated into the muxes.

After a release message on a call, the originating and terminating processes will forward the information in the call control block to record handler 1350. Record handler 1350 will use the call control block to create a billing record. The call control block would contain information from the ISUP messages for the call and from CCM processing. From the address complete message (ACM), the call control block would include the routing label, CIC, message type, and cause indicators. From the answer message (ANM), the call control block would include the routing label, CIC, message type, and backward call indicators. From the initial address message (IAM), the call control block would include the routing label, CIC, message type, forward call indicators, user service information, called party number, calling party number, carrier identification, carrier selection information, charge number, generic address, origination line information, original called number, and redirecting number. From the release message (REL), the call control block would include the routing label, CIC, message type, and cause indicators. From the suspend message (SUS) or the pass along message (PAM), the call control block would include the routing label, CIC, and message type. Those skilled in the art are familiar with other pertinent information for a billing record and appreciate that some of this information could be deleted. The billing record will be forwarded by record handler 1350 to a billing system over a billing interface. An example of such an interface is an ethernet—FTAM protocol.

CALL PROCESSING

SS7 messaging is well known in the art. SS7 ISUP messages contain numerous fields of information. Each message will have a routing label containing a destination point code (DPC), an origination point code (OPC), and a signaling link selection (SLS) which are used primarily for routing the message. Each message contains a circuit identification code (CIC) which identifies the circuit to which the message relates. Each message contains the message type which is used to recognize the message. ISUP messages also contain mandatory parts filled with fixed length data and variable length data, in addition to a part available for optional data. These parts vary from message type to message type depending on the information needed.

The initial address message (IAM) initiates the call and contains call set-up information, such as the dialed number. IAMs are transferred in the calling direction to set up the call. During this process, TCAP messages may be sent to access remote data and processing. When the IAMs have reached the final network element, an address complete message (ACM) is sent in the backward direction to indicate that the required information is available and the called party can be alerted. If the called party answers, an answer message (ANM) is sent in the backward direction indicating that the call/connection will be used. If the calling party hangs up, a release message (REL) is sent to indicate the connection is not being used and can be torn down. If the called party hangs up, a suspend message (SUS) is sent and if the called party reconnects, a resume (RES) message keeps the line open, but if their is no re-connection, a release message (REL) is sent. When the connections are free, release complete messages (RLC) are sent to indicate that the connection can be re-used for another call. Those skilled in the art are aware of other ISUP messages, however, these are the primary ones to be considered.

In the preferred embodiment, call processing deviates from the basic call model recommended by the ITU, although strict adherence to the model could be achieved in other embodiments. FIGS. 15–23 depict message sequence charts for the call processing in one embodiment. Message sequence charts are known in the art, and are a recognized format to depict call processing. At the top of the chart, the basic elements of the CCM are shown —the platform handler, the message handler, the bearer control, and the record handler. The blocks below the message handler indicate the processes for the message handler. Further specification at the process level for the platform handler, the bearer control, and the record handler is not required for this discussion. The charts are read down in a chronological sequence. Blocks indicate tasks performed by the process named above. Arrows indicate messages exchanged between the processes or the creation of a new process by an existing process.

Figure 15:
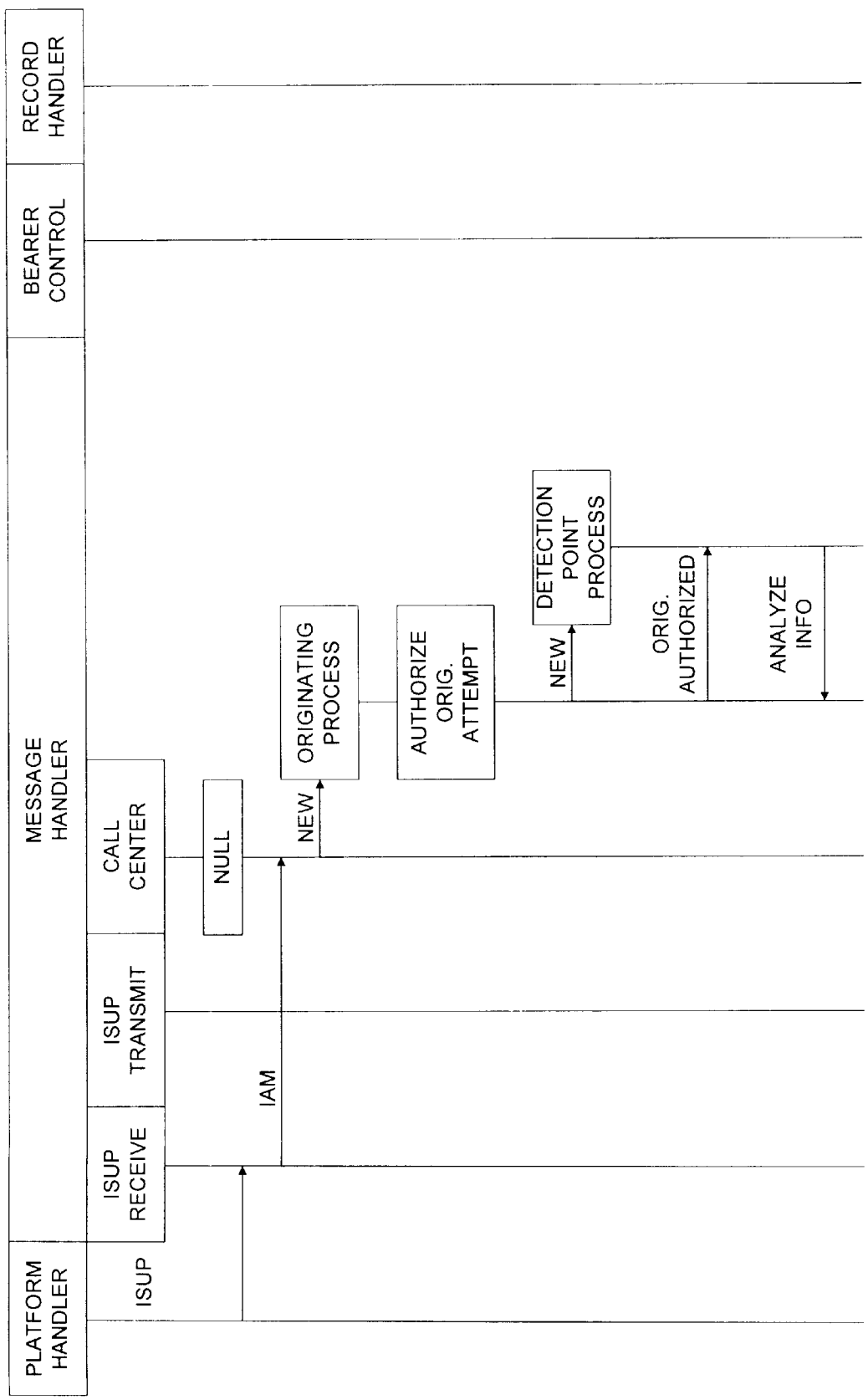
FIG. 15 is a message sequence chart for a version of the invention.
Figure 16:
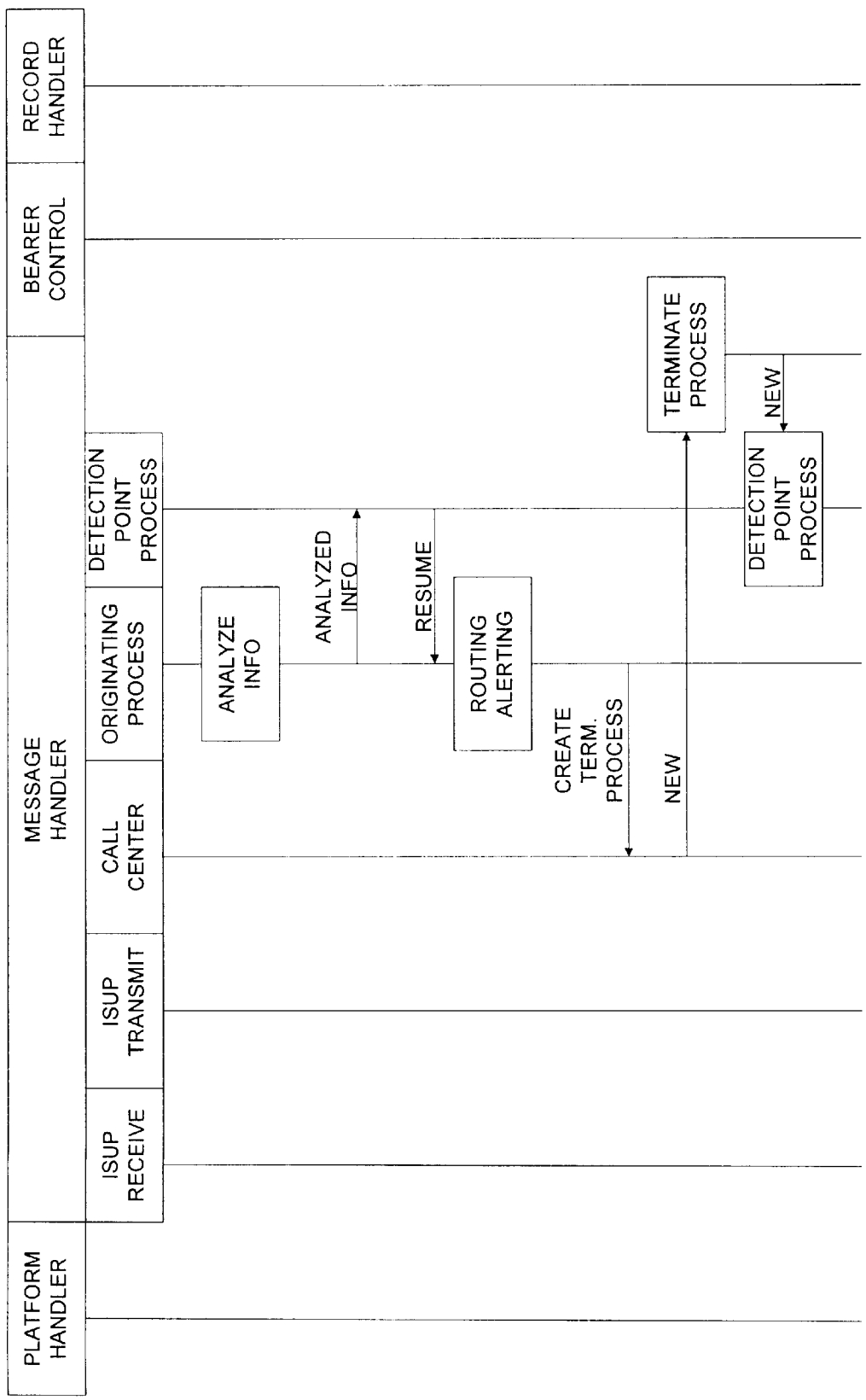
FIG. 16 is a message sequence chart for a version of the invention.

The sequence starts on FIG. 15 with an ISUP message at the platform handler. The platform handler forwards the message to the ISUP receive process of the message handler. If the ISUP message is an IAM, the ISUP receive process forwards the IAM to the call center. The call center had been in the "origination null" point-in-call, but the IAM causes the call center to create an originating call process perameterized with contents of the IAM. The originating process then executes through the "authorize origination attempt" point-in-call. This typically entails ANI validation in a look-up table, but prior to the look-up, call information is checked to determine if ANI validation is required. For particular types of calls, i.e. "800" calls, origination is authorized without ANI validation.

Once origination has been authorized, the originating process creates a detection point process and transmits a signal to the detection point process that origination has been authorized. The detection point process returns a message instructing the origination process to execute through the "analyze information" point-in-call, although a detection point could be programmed at this point if desired. Continuing on to FIG. 16, "Analyze information" typically entails verifying that the dialed number is legitimate and checking call information for any applicable services. A few examples of a services are "800" and PCS. In this example, no services are required for the call—the call is a typical POTS call. Once the analysis has been accomplished, the originating process sends a "analyzed information" message to the detection point process. Typically, the detection point process returns a "resume" message to the originating process, but detection points could be programmed here if desired.

The resume message causes the origination process to execute through the "routing and alerting" point-in-call. This typically entails translating the dialed number to select a destination address. For example, the NPA-NXX of the dialed number could be used in a look-up table to yield the address of the terminating mux and the device that should receive the call from the mux. The origination process will also send a message to the call center to create an terminating call process. The terminating call process is provided with the identity of the originating process. The terminating process also creates a detection point process to handle the detection points it encounters. For purposes of clarity, this is indicated along the same line as the originating process detection point, although it should be understood that each process communicates with its corresponding detection point.

Figure 17:
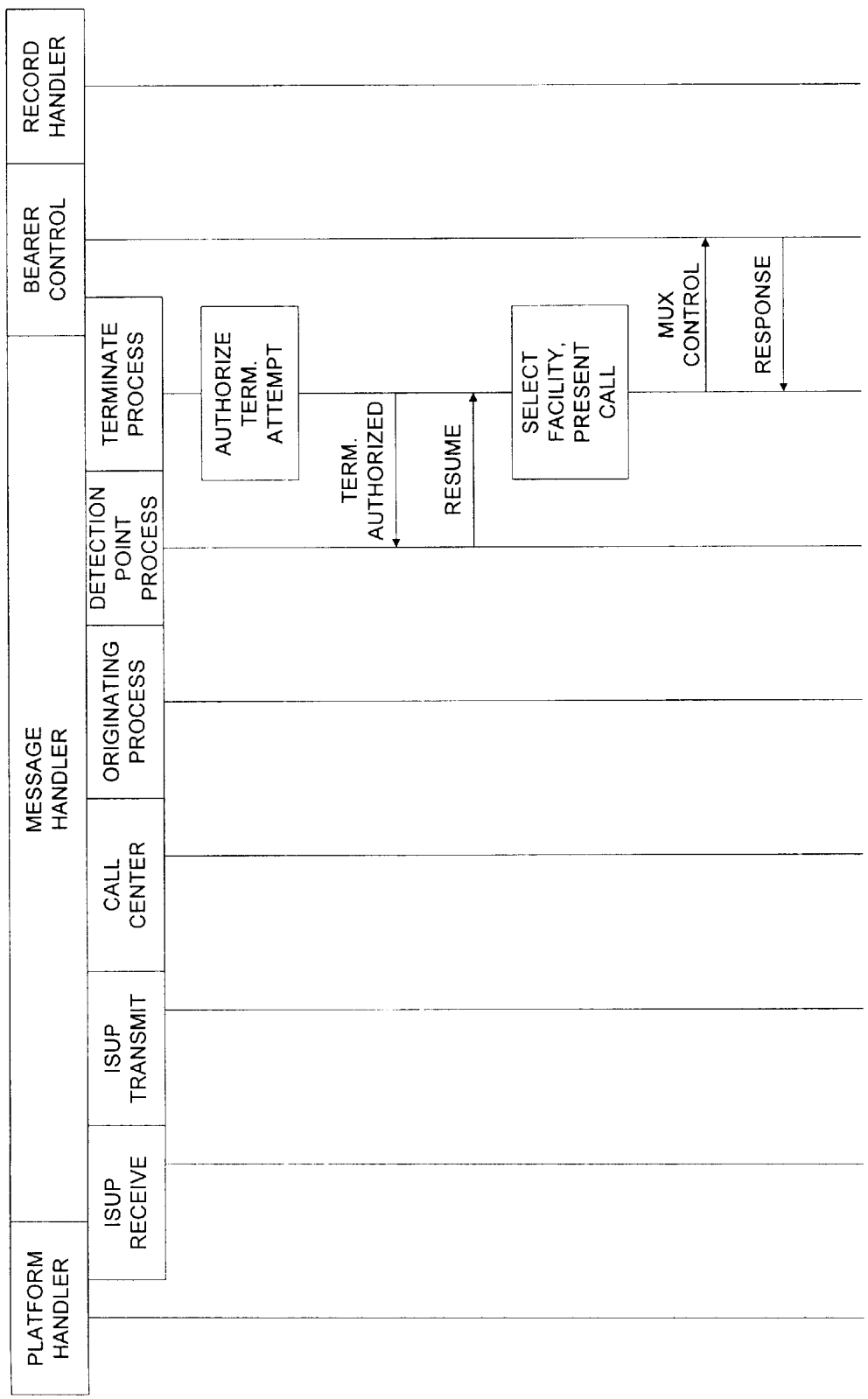
FIG. 17 is a message sequence chart for a version of the invention.
Figure 18:
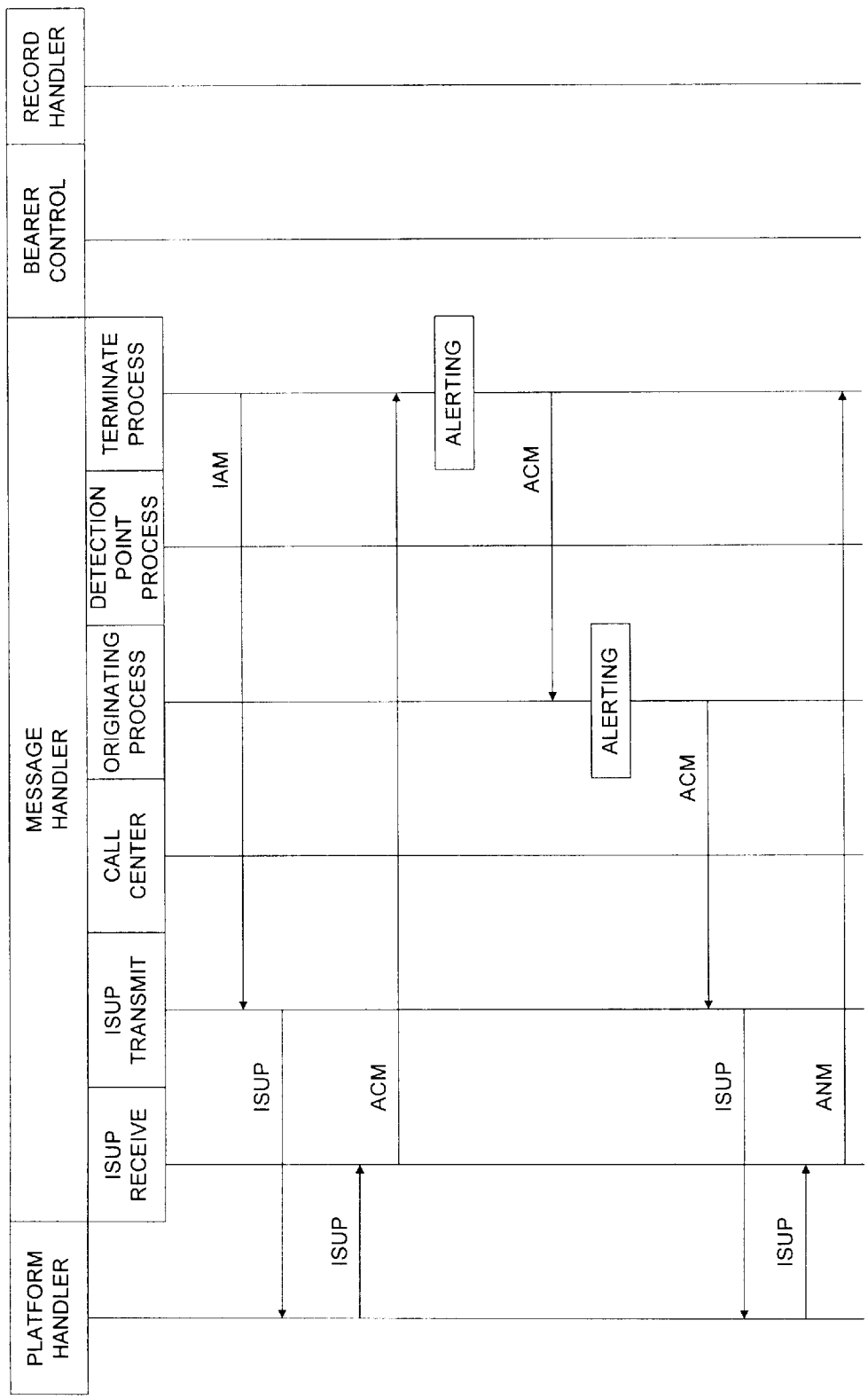
FIG. 18 is a message sequence chart for a version of the invention.
Figure 19:
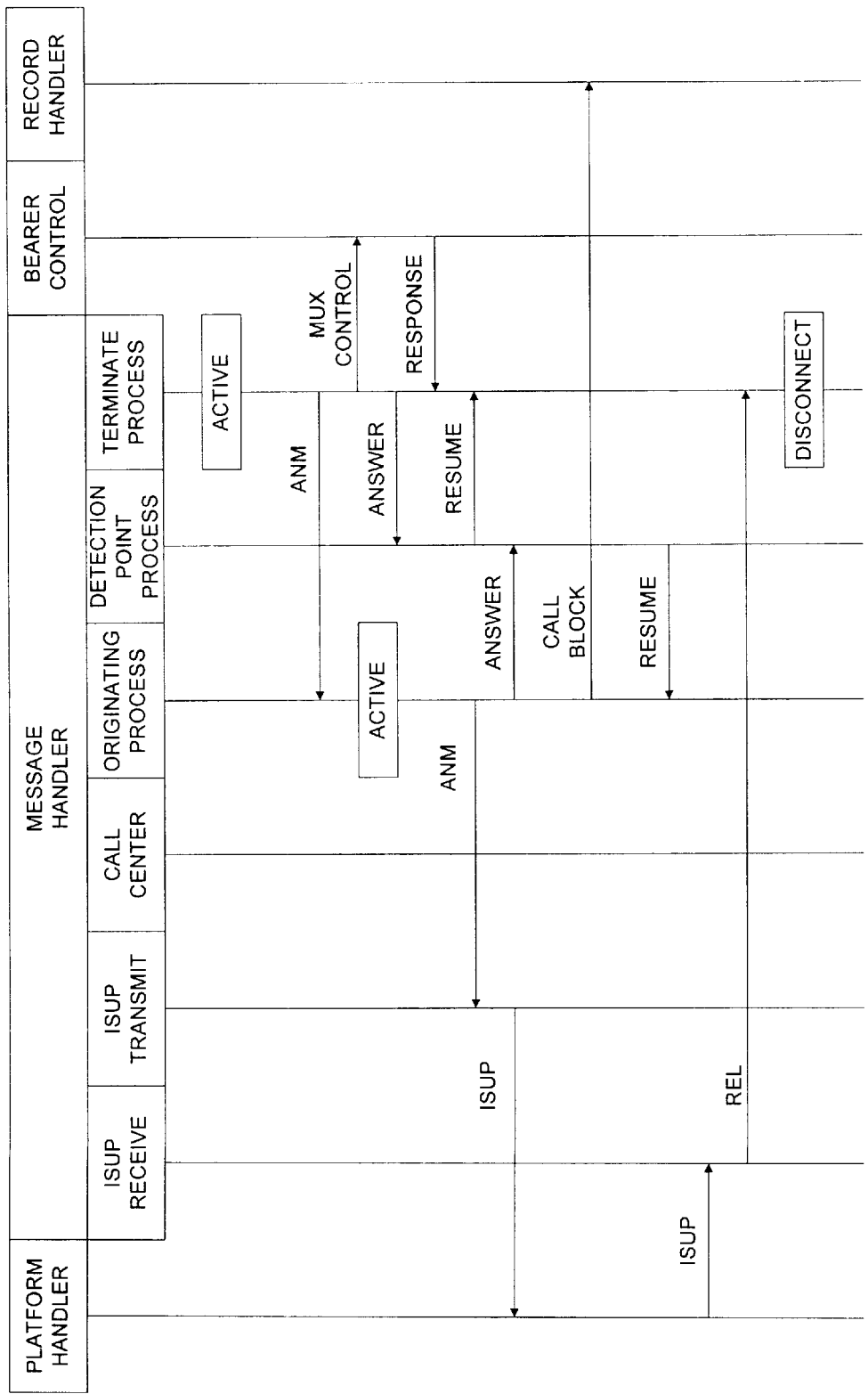
FIG. 19 is a message sequence chart for a version of the invention.
Figure 20:
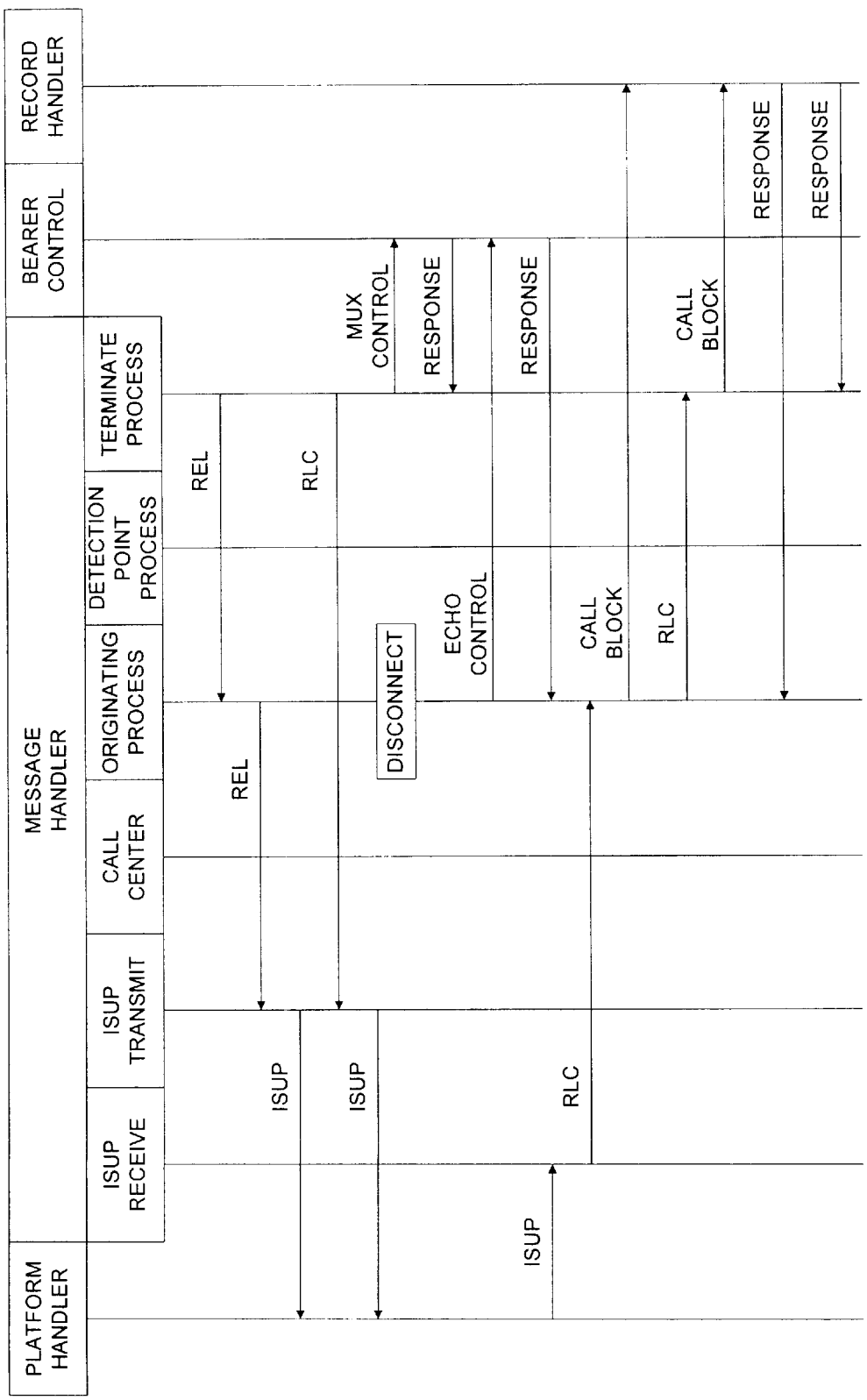
FIG. 20 is a message sequence chart for a version of the invention.
Figure 21:
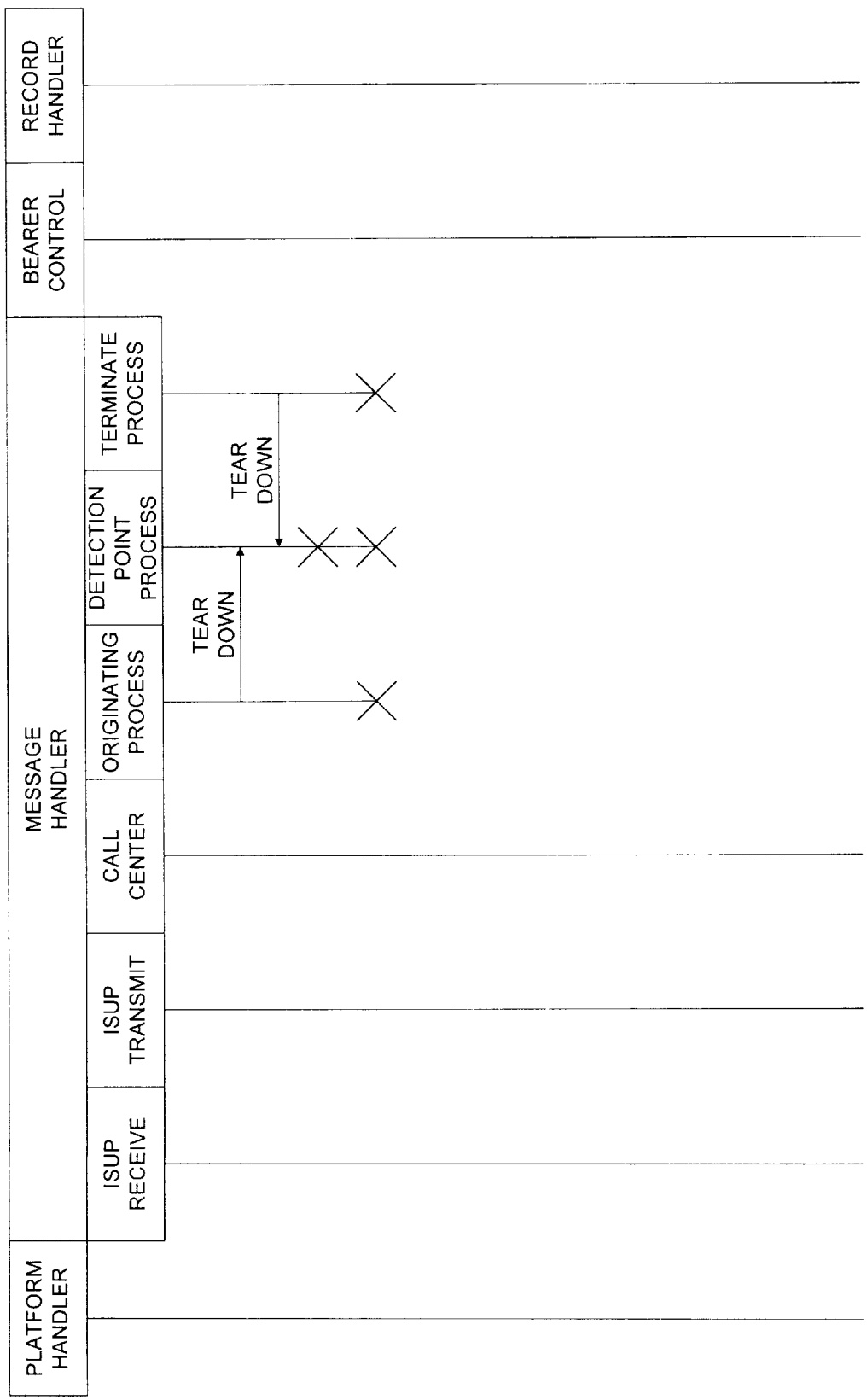
FIG. 21 is a message sequence chart for a version of the invention.

Continuing on to FIG. 17, the terminating process executes through the "authorize termination attempt" point-in-call. This typically entails verifying that an ATM connection to another mux can be attempted. For example, the CCM and the mux at the terminating end must be operational to handle the call. Once termination is authorized, an authorized message is sent to the detection point process, which returns a resume message to the termination manager (unless a detection point is programmed into the detection point process.)

The terminating process will then execute through the "select facility and present call" point-in-call. This typically entails selecting the actual VPI/VCI and outbound connection for the call. The destination has already been specified during the "routing" point-in-call, so the VPI/VCI and point codes can be looked-up accordingly. The terminating process will then send a message to bearer control requesting mux control. Bearer control would then create a message for the originating mux identifying the connections and devices relevant to the call. Bearer control would respond that mux control was handled. Continuing on to FIG. 18, the terminating process would then construct an IAM for transmission to the downstream CCM at the terminating mux. As discussed above, this message could be coded such that the downstream CCM could skip detailed call processing. The IAM would be provided to the ISUP sender and a formatted IAM would be provided to the platform handler for subsequent transmission to the downstream CCM.

On a typical call, the next message that would be received by the CCM that is related to the call would be an Address Complete Message (ACM) signifying that the terminating end of the call had the information required to complete the call. This would be the case if the downstream-terminating CCM received the above-mentioned IAM, selected the actual DS0, and sent a subsequent IAM to the external device. As mentioned above, the specially coded IAM would cause the terminating CCM to merely select the outbound DS0, notify the terminating mux, and generate the IAM to send to the external connection. The external device would send an ACM back to the terminating CCM which would pass on an ACM to the originating CCM. These procedures at the terminating CCM are not depicted in the message sequence chart. The message sequence chart continues with the ACM arriving at the originating CCM.

The ISUP receive process would forward the ACM to the terminating process. The terminating process would execute through the "alerting" point-in-call and would send ACM information to the originating process, which would also execute through the "alerting" point-in-call. Alerting entails alerting the users that a connection is available —i.e. ringing a telephone. Typically, no specific activity is required for "alerting", but detection points could be inserted into the process if desired. The originating process would forward an ACM to the ISUP sender which would provide a formatted ACM to the platform handler for subsequent transmission to devices at the origination side of the call.

On the typical call, an Answer Message (ANM) will be transferred from the terminating side of the call to the origination side of the call when the called party answers the phone. The ANM is received by the platform handler and forwarded to the ISUP receive process which forwards its version to the terminating process. Continuing on to FIG. 19, the terminating process executes though the "active" point-in-call and sends ANM information to the detection point process. Typically, the detection point process will return a resume message, although detection points could be included here if desired. The terminating process also sends a mux control message to bearer control to facilitate cut-through on the call at the mux. A acknowledgment response is sent back to the terminating process from bearer control. The terminating process also sends ANM information to the originating manager, which also executes through the "active" point-in-call. The originating process also sends an answer message to the detection point process and a partial call control block to the record handler. Typically, the detection point process will send a resume message back to the origination process. The originating process would forward an ANM to the ISUP sender which would provide a formatted ANM to the platform handler for subsequent transmission to devices at the origination side of the call. At this point, the call is in progress.

The message sequence continues with the receipt of a release message (REL) after the caller or called party hang up. As stated above, if the called party hangs up, a suspend message (SUS) is sent before the call is released, but if the caller hangs up, only an REL is sent. For clarity, the chart picks up with an REL arriving from the terminating side of the call. The REL is received by the platform handler and transferred to the ISUP receive process, which provides its version of the message to the terminating process. (Had the REL been from the originating side, it would have been provided to the originating process.) The terminating process executes through the "disconnect" point-in-call. Continuing on FIG. 20, the terminating process sends REL information to the originating process. The originating process would forward an REL to the ISUP sender which would provide a formatted REL to the platform handler for subsequent transmission to devices at the origination side of the call. In response to the REL, the terminating process will forward a Release Complete Message (RLC) to the ISUP sender which would provide a formatted RLC to the platform handler for subsequent transmission to the device that sent the REL. The RLC acknowledges the REL and signifies that the call connections may be torn down and re-used. The terminating process also sends a mux control message to bearer control to cause the relevant VPI/VCI to be torn down, and receives an acknowledgment response from bearer control. The originating process sends an echo control message to bearer control to ensure that the relevant echo canceller is enabled and receives and acknowledgment response from bearer control.

The next message will typically be an RLC in response to the REL sent to the originating side of the call. The RLC is received by the platform handler and forwarded to the ISUP receive process. ISUP receive provides its version of the message to the originating process. This causes the originating process to forward its final call control block to the record handler. The originating process also provides RLC information to the terminating process. This causes the terminating process to send its final call control block to the record handler. The record handler responds to each process with an acknowledgment response. Continuing on to FIG. 21, tear down messages are sent by the originating process and the terminating process to their respective detection point processes. Typically, no detection points will be programmed and the originating process, the terminating process, and the detection point processes will terminate and be cleared from the CCM.

Figure 22:
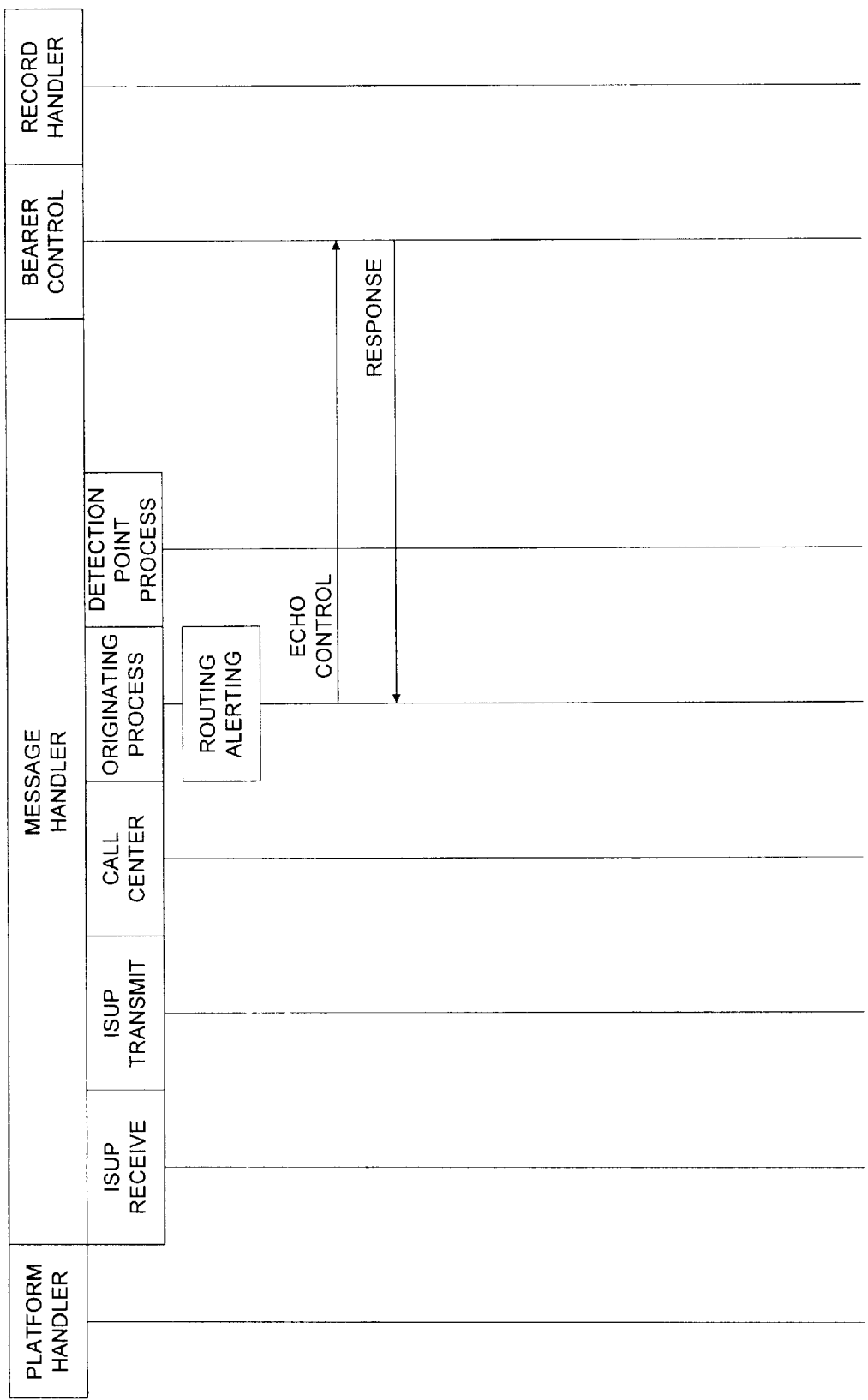
FIG. 22 is a message sequence chart for a version of the invention.
Figure 23:
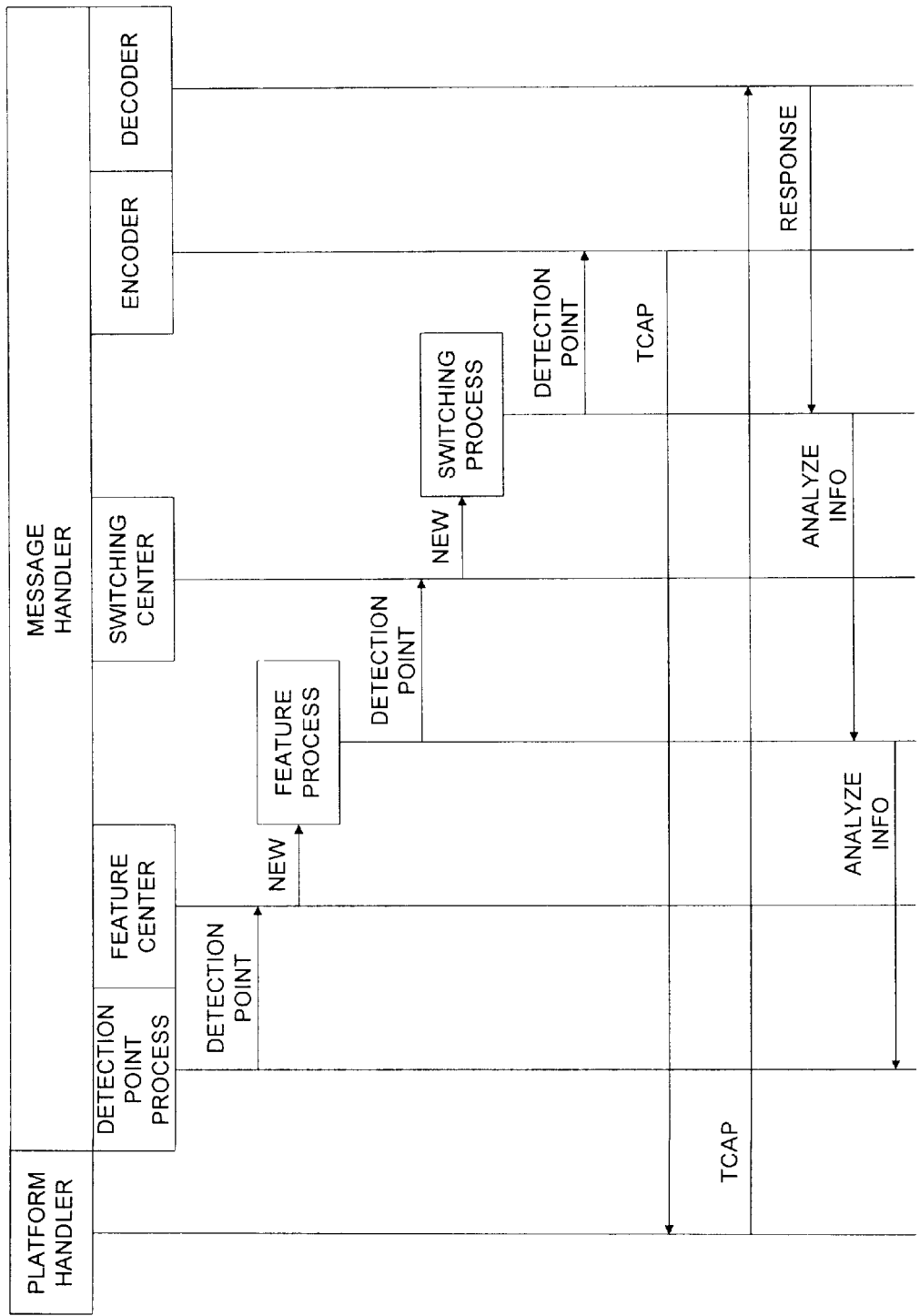
FIG. 23 is a message sequence chart for a version of the invention.

FIG. 22 depicts a modified excerpt from message sequence chart of FIG. 23. The modification is for a data call that requires the echo cancellation on the connection to be disabled. As shown, the message sequence chart picks up call processing at the "routing and alerting" point-in-call. Part of the execution through the "routing and alerting" point-in-call includes a check of IAM information to determine if echo cancellation should be disabled. If so, the originating process sends an echo control message to bearer control. Bearer control will send a message disabling the appropriate echo canceller. Bearer control also sends an acknowledgment response back to the originating process. Subsequent call processing continues as discussed above and the echo canceller is re-enabled after the call.

FIG. 23 also depicts a modified excerpt from the message sequence charts above. The modification is for a call that requires services. Services might include N00 or VPN calls, but many other services are known. In this embodiment, an SCP is accessed to provide information to implement the service. As shown, call processing picks up where the detection point process for either the originating process or the terminating process analyzes a detection point and determines that a service is required. Typically, this is done by examining the dialed number and the caller's number. Those skilled in the art are aware of how services can be determined from call information.

If it is determined that a service should be applied to the call, the detection point process sends detection point message to the feature center that causes the feature center to create an feature process. The feature process will be perameterized with call information and will send a detection point message to the switching center. In some embodiments, the feature process will choose between "IN" services and "non-IN" services and send the detection point message to the corresponding switching center. Upon receiving the message, the switching center creates a service process for each service to be applied to call. The service process formulates a request for service information and forwards it to the encoder of the SCF access manager. The encoder produces a TCAP message and transmits it over the appropriate link to a remote SCF. (possibly through the platform handler and/or the MTP interface). The remote SCF will return a response to the decoder. The response is formatted for the service process and sent to it. The service process takes the response and formulates an analyze information message that is transferred back through the feature process to the detection point process. The detection point process transfers the analyze information message to the applicable originating or terminating process. Subsequent call processing remains the same as discussed above. At call tear down, the feature process and the switching process are cleared from the CCM.

An example of the above scenario would be for an "800" call. The CCM would recognize that the "800" in the called number required service application. As a result, it would generate and transmit TCAP query to an SCP requesting an "800" translation. The SCP would process the query and translate the "800" number into a POTS number. The SCP would return the POTS number to the requesting CCM. The CCM would then process the POTS number as it would for a standard POTS call.

In some embodiments, the CCM processes SS7 signaling messages to accomplish the following functions: validation, routing, billing, and echo cancellation. SS7 messages are well known in the art. The following sections discuss SS7 processing, but those skilled in the art will recognize variations that are also contemplated. In SS7, the routing labels of the messages are used to correlate messages to calls. Contemporaneous messages with the same OPC, DPC, and CIC relate to the same call.

To validate a call, the routing label of messages should be checked. The Service Indicator should be checked to distinguish between an incoming message from outside of the network or a message from a network CCM. The Destination Point Code is screened to ensure the destination of the SS7 message is actually destined for the CCM. The Originating Point Code is screened to ensure the originating point code is allowed in the CCM. The Message Type is screened to ensure that the type of message is allowed in the CCM and that there are no protocol violations associated with the message.

Both the Circuit Reservation Message (CRM) and the IAM should have the Satellite Indicator screened to ensure that the limit on the number of Satellites in a circuit has not been exceeded. This will be on a trunk group by trunk group basis. The REL automatic congestion level will be screened to see if congestion arises. The CCM should then control calls to the associated network elements until the congestion abates. For non-call associated messages, the circuit group supervision message type indicator will be screened to compare the state of the circuits with the instructions incoming in the messages.

The IAM will receive additional treatment for validation. Information Transfer Capability will be screened to ensure that the connection for the call is capable of handling the transfer rate requested. The Coding Standard will be screened to ensure that the standard is coded 00. All others will be rejected. Transfer Mode will be screened to ensure that the mode is coded 00 for 64 Kbit/second calls. User Layer Protocol ID and the Rate field will be screened to ensure that there is no rate adaptation required for the call. The Network ID Plans and Digits, will be screened to ensure that the carrier identification field and the transit network carrier identification field is in the correct format. The Circuit Code will be screened to allow callers with the correct means of dialing to access the network.

The CCM will check the Hop Counter in the IAM to determine if it has reached its limit as set by this field (range 10 to 20 with a default of 20). If it has not, the CCM will increment the parameter. If it has reached the determined count, the CCM will send a release message back with a cause of "exchange routing error" to tell the preceding switch that the IAM has reached its limit in hops. If this field is left blank, the CCM will not increment the counter parameter and pass the IAM unchanged.

The IAM Called Party Number field should be handled as follows for validation. Nature of Address will tell the CCM what type of number was dialed for the called number. The screening of this field will be for a non-NPA number. If that occurs, the CCM will need to add the NPA from the Trunk Group to the call control block. Numbering Plan will be screened to check what type of plan the incoming called party number uses. The only allowable plans are Unknown and ISDN numbering plans. All others should be disallowed. Digits Field will be screened for the number of digits using the Nature of Number, Odd/Even, and Digits Fields to determine the correct number of digits.

The IAM Calling Party Number and Charge Number fields should be handled as follows for validation. Nature of Address will be screened to ensure that the calling party's number is in the proper format. Presentation Allowed/Restricted will be screened to check for N00 calling. Numbering Plan will be checked to ensure that the numbering plan is set at either unknown or ISDN numbering plan. Digits Field will be checked to ensure that there is enough digits for an ANI that can be billed. These digits will be validated in an ANI table for call authorization.

Routing is primarily accomplished by processing the IAM. Called Party Number—Nature of Address, Digits—This will tell the CCM what type of call this is. It will differentiate 0+, test calls, and International numbers from normal 1+ calls. The Calling Party's Category tells the CCM that the call is a test call with different routing than a normal call. The Carrier Identification Plan will be used to determine if the CCM receives the Carrier Identification Code of another carrier, since the CCM may wish to route the call based on the subscribers choice of carriers. The IAM Carrier Selection Information is used to route the call based on whether the subscriber was presubscribed or dialed the carrier access number. The IAM Originating Line Information will enable the CCM to route based on what type of originating line is being used for this call. An example is if a payphone makes a 1+ call, the CCM will be able to route the call directly to an operator for billing arrangements. The IAM Transit Network Selection fields will indicate the Carrier Identification Code of the International Carrier that is requested by the subscriber, so the CCM can route the international call to the correct switch. The Circuit Code will tell the CCM how the code was dialed. If the subscriber dialed an access code for a different international carrier, the CCM could route the call to an operator center for processing.

The IAM Called Party Number fields are handled as follows for routing. Nature of Address Indicator tells what type of call is being requested. This will include 0+ and 0− calls, international calls (operator and non operator calls), cut through, and 950 types of calls. With this information, the CCM can route the call directly to the international gateway or operator center without looking at the rest of the message. For normal 1+ calls, the Odd/Even field will be used with the digits fields to determine the number of digits. Numbering Plan field will be used to route calls differently if it has a "Private Numbering Plan" value in the field. Digits Field will be the digits that will be used to route the call through the network using table look-ups. Typically, the digits field houses the dialed number.

Billing will be based on the Call Control Blocks (CCBs) created by the call processes. A portion of these records are transferred from messages received by the CCM. The CCBs are discussed above. When the Calling Party Number is present in the IAM and there is no Charge Number present, the Calling Party Number is used to bill the call. If the Charge Number is present in the same message, then the Charge Number will be used for billing instead of the Calling Party Number. Various messages need to be tracked to measure the duration of the call. These include the IAM, ACM, ANM, SUS, REL, and RLC. The causes associated with these messages should also be considered.

As to echo control, messages should be examined to determine if either side of the call—originating or terminating—has already handled echo control. This can be done by looking at the Echo Suppresser Indicator in the Nature of Connection Indicators Parameter of the CRM or the IAM, or the Echo Control Device Indicator in the Backward Call Indicators Parameter of the ACM or the Call Progress Message (CPM). If no echo control has been provided, the CCM will implement echo control depending on the Information Transfer Capability in the User Service Indicator Parameter of the IAM.

ALTERNATIVE EMBODIMENT

Figure 24:
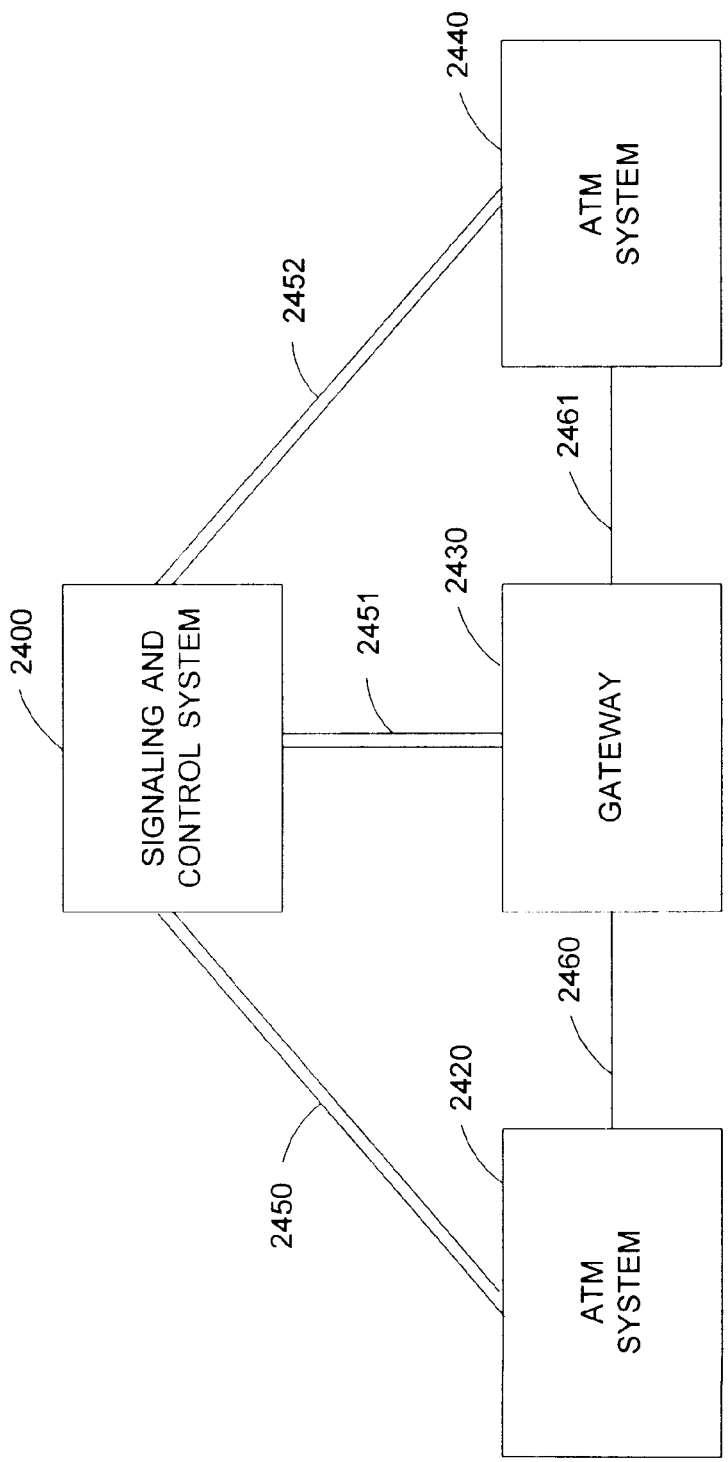
FIG. 24 is a block diagram for a version for the invention.

The connection processing system could also be used in the following context of an ATM gateway. FIG. 24 depicts signaling and control system 2400, ATM system 2420, ATM system 2440, and gateway 2430. These components are connected by connections 2460–2461 and linked by links 2450–2452 as shown. Those skilled in the art are aware that large networks have many more components than are shown, but the number of these components has been restricted for clarity.

ATM systems 2420 and 2440 are known in the art. They typically include ATM connections, cross-connects, and switches. Any source of ATM cells is contemplated. At least one of the ATM systems will have the need to control the VPI/VCIs of cells entering the network. This is because the cells entering the network have VPI/VCIs designated by the preceding network. These VPI/VCIs are not necessarily compatible with the routing configuration of the subsequent network accepting the cells. As such, the VPI/VCIs must be modified to be compatible the new VPI/VCI routing configuration. This is especially true if the ATM network is handling SVCs without an ATM switch to process signaling and select the proper SVCs in real time. If only pre-provisioned cross-connects are used, the VPI/VCI in the incoming cell effectively selects the VPI/VCI the cell will have when it exits the cross-connect. If SVCs are to be dynamically allocated on a per call basis through pre-provisioned cross-connects, a system is needed to modify the VPI/VCIs to allocate SVCs before the cells enter the cross-connect.

Gateway 2430 provides this capability. Gateway 2430 receives ATM cells entering a network and converts the VPI/VCIs in the cells so they are compatible with network routing configuration. Gateway 2430 would modify the VPI/VCIs of cells entering ATM system 2440 on a call-by-all basis. Gateway 2430 would use the above-described connection processing system to facilitate the modification of VPI/VCIs. This allows for the allocation SVCs. Gateway 2430 could also operate in a two-way fashion. This means it will modify the VPI/VCIs of cells entering ATM system 2420 according to ATM system 2420 requirements, and it will modify the VPI/VCIs of cells entering ATM system 2440 according to ATM system 2440 requirements. Gateway 2430 is capable of modifying VPI/VCIs based on control instructions from signaling and control system 2400.

Signaling and control system 2400 receives signaling passed between the two networks. Typically, the signaling would be Signaling System #7 (SS7) messages. Signaling and control system 2400 is able to receive and process SS7 signaling to select the appropriate VPI/VCI for cells entering a given network. It is similar to the signaling processing system described above. It passes this information to the gateway 2430 over control link 2451. Control link 2451 could be a bus, a data link or a signaling link. Those skilled in the art will appreciate various ways to couple signaling and control system 2400 with gateway 2430. It is important to note that signaling and control system 2400 and gateway 2430 do not comprise an ATM switch. Those skilled in the art will appreciate how these components can be constructed and operated without the complexities and cost of an ATM switch. Another advantage is that the gateway has single input/output throughput. This avoids many problems ATM switches encounter with multiple input and output ports. This also allows the gateway to concentrate traffic flowing into a network. In other words, the gateway is able to reorganize the traffic entering a network.

Figure 25:
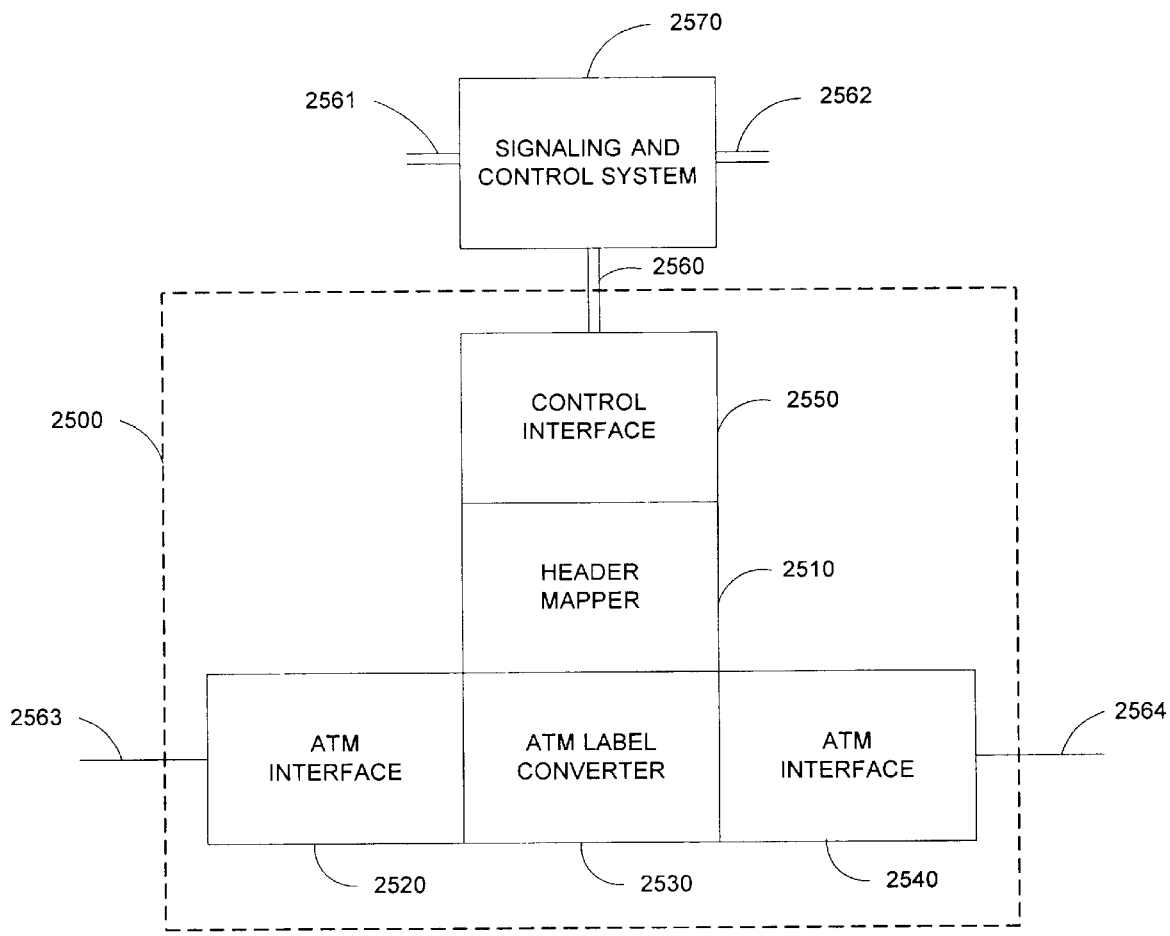
FIG. 25 is a block diagram for a version for the invention.

FIG. 25 depicts gateway 2500 composed of control interface 2550, header mapper 2510, ATM label converter 2530 and ATM interfaces 2520 and 2540. Connections 2563 and 2564 are ATM connections to ATM systems. Call/Connection Manager (CCM) 2570 is a version of signaling and control 100 from FIG. 1. CCM 2570 processes signaling and exerts control over the gateway 2500 via link 2560. This link could be any means of exchanging control information such as a signaling link, a data link, or a bus arrangement. Links 2561 and 2562 provide signaling to CCM 2570. An example would be an SS7 link, but other means to transfer signaling would be appreciated by one skilled in the art.

CCM 2570 is a processing system that receives and processes signaling messages. CCM 2570 processes the signaling messages to select VPI/VCI assignments for gateway 2500. In other words, it is a call processor. It is different from a switch in that it does not have a switching fabric, and it does not carry actual user traffic. Typically, the processing is based on a dialed number, and can include validation, routing, and billing. CCM 2570 would be functional to send control messages to the gateway 2500. For call set up, the control message would instruct gateway 2500 to modify the VPI/VCI in incoming cells to the VPI/VCI selected dynamically by CCM 2570. For call tear down, the control message would instruct gateway 2500 to disassociate the incoming VPI/VCI from the outgoing VPI/VCI. This releases the bandwidth associated with the call. CCM 2570 is similar to the CCM discussed in the previous embodiment.

Control interface 2550 is functional to receive control messages and transmit status information. It could be a conventional hardware/software interface. Header mapper 2510 includes a memory that contains the information used to associate incoming VPI/VCIs with outgoing VPI/VCIs. This memory is dynamic and is updated on a call by call basis. Header mapper 2510 would use the connection processing system described at the beginning of this disclosure to handle the association of VPI/VCIs. ATM label converter 2530 is functional to change the VPI/VCIs in incoming ATM cells to new VPI/VCIs based on header mapper 2510.

ATM interface 2520 is functional to accept incoming cells from connection 2563 and then send the cells through label converter 2530. ATM interface 2540 is functional to accept converted cells from ATM label converter 2530 and transmit these cells on connection 2564. These ATM interfaces are also able to perform reciprocal processing for ATM traffic flowing in the reverse direction.

Telecommunications signaling is used to set-up and tear down connections for a call. Setting-up a connection would entail creating a series of logically connected VPI/VCI communications paths from end to end. The following operation is described in terms of SS7, but those skilled in the art are aware of other signaling systems that could also be used. Some examples of these other signaling systems would be C7 and UNI.

Typically, the network providing cells to gateway 2500 does not have knowledge of the actual destination for these cells beyond gateway 2500. This "first" network will also produce an Initial Address Message (IAM) associated with the call. The IAM contains information that can be used to route the cells for the call. The IAM is transferred to CCM 2570. CCM 2570 will process the IAM according to the requirements of the "second" network receiving cells from gateway 2500. CCM 2570 will select a new VPI/VCI based on the IAM.

In one embodiment, the system would operate as follows for a call incoming over connection 2563. Typically, the network providing the call to gateway 2500 will seize an available connection (VPI/VCI) to gateway 2500. This connection is represented by connection 2563. CCM 2570 will receive the IAM produced in association with the call over link 2561. If narrowband SS7 signaling is used, the routing label in the IAM contains a Circuit Identification Code (CIC). The CIC could be configured to identify the VPI/VCI in the incoming cells for the call. In other words, the CIC in the IAM identifies the seized connection (in connection 2563) to gateway 2500. If broadband signaling (B-ISUP) is used, this VPI/VCI could be directly identified in the VPI/VCI field. CCM 2570 will select the VPI/VCI for routing the call over connection 2564. CCM 2570 then sends a control message to control interface 2550 through link 2560. The control message will instruct gateway 2500 to modify the VPI/VCI of the incoming cells so they contain the VPI/VCI selected by CCM 2570. This would be accomplished using the above-described connection processing system. Control interface 2550 responds with an acknowledgment over link 2560 to CCM 2570. In the case of error conditions, the acknowledgment will be negative acknowledgment. Header mapper 2510 will receive the instruction information from control interface 2550 and will store this information for the duration of the call. CCM 2570 would also generate another IAM for transfer over link 2562 to the next node requiring a call message.

Cells for the call will arrive at ATM label converter 2530 from ATM interface 2520 and connection 2563. ATM label converter 2530 will use the VPI/VCI of the incoming cells as the incoming VPI/VCIs in the above-described connection processing system. The index would be used to enter header mapper 2510 memory to yield the new VPI/VCI. ATM label converter 2530 will modify the VPI/VCI in the cell headers to the new VPI/VCI. The cells are then forwarded to ATM interface 2540 for transmission over connection 2564.

At the end of the call, a release message (REL) is received by CCM 2570 over link 2561. The REL will cause CCM 2570 to begin call tear down procedures. CCM 2570 will send a control message to control interface 2550 over link 2560. Control interface 2550 will send the information to header mapper 2510 disassociating the incoming and outgoing VPI/VCI for the call. This will cause gateway 2500 to terminate the call connection. CCM 2570 will then send an appropriate REL over link 2562 to the next node. Those skilled in the art will appreciate that other procedures can also be used at the end of the call. For example, the CCM may allow the VPI/VCI assignment to remain for a specified duration.

Preferably, connection 2564 would transfer these modified cells to an ATM cross-connect system that has pre-provisioned VPI/VCIs to potential network destinations. Because the VPI/VCI is selected in real time by CCM 2570 based on the signaling and the routing configuration, gateway 2500 is able to implement SVCs on a call by call basis. In can be appreciated that by using the requirements for the network accepting the cells, CCM 2570 and gateway 2500 can implement SVCs for calls proceeding in both directions. It is also important to note that this can be done without the need for a complex ATM switch with signaling and call processing capability.

Figure 26:
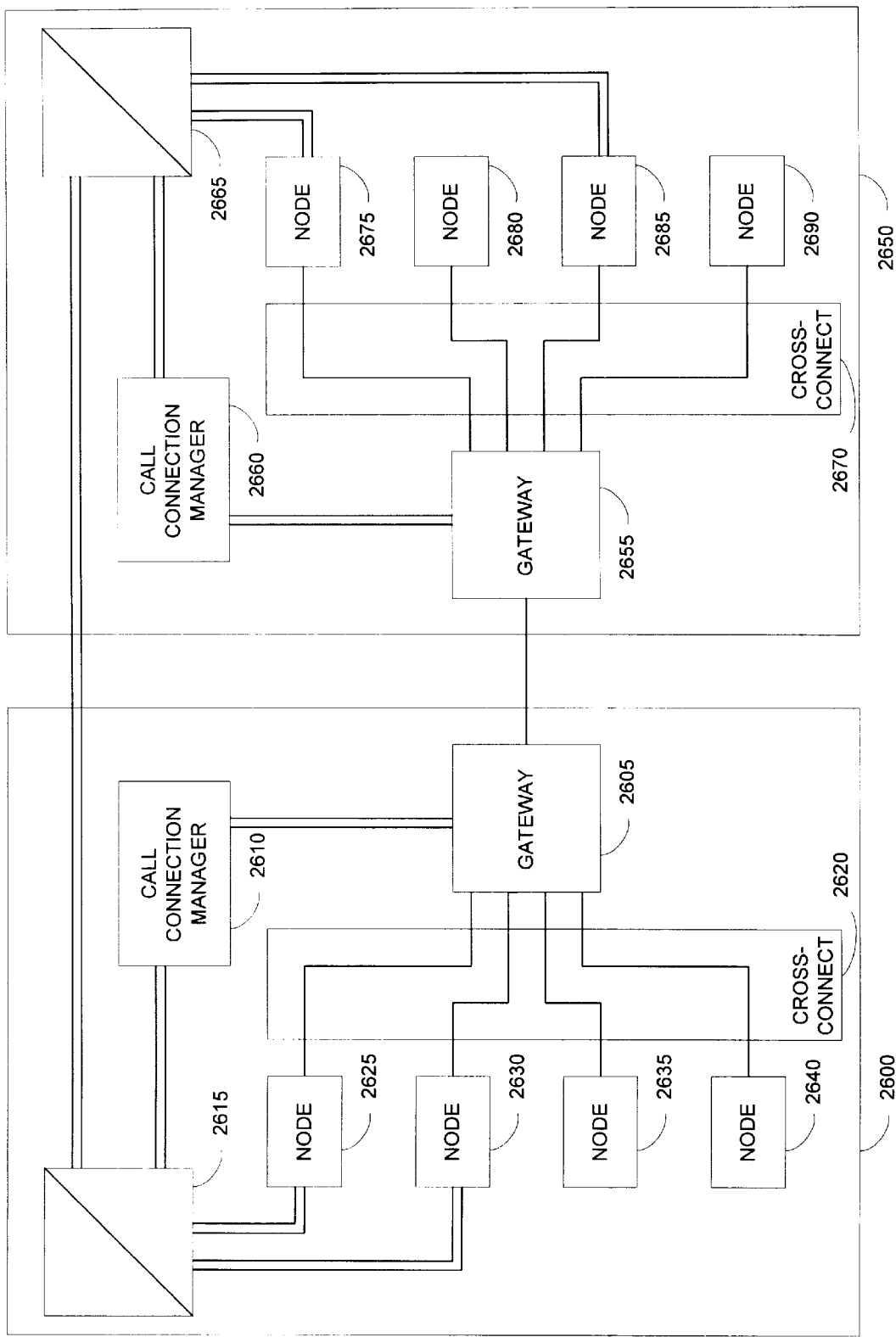
FIG. 26 is a block diagram for a version for the invention.

FIG. 26 shows ATM system 2600 and ATM system 2650. ATM system 2600 is comprised of gateway 2605, call/connection manager (CCM) 2610, Signal Transfer Point (STP) 2615, ATM cross-connect 2620, and nodes 2625, 2630, 2635, and 2640. ATM system 2650 is comprised of gateway 2655, CCM 2660, STP 2665, ATM cross-connect 2670, and nodes 2675, 2680, 2685, and 2690.

For the sake of clarity, the connections and links are not numbered. Virtual paths are shown (single lines) provisioned through ATM cross-connect 2620 between gateway 2605 and nodes 2625, 2630, 2635, and 2640. Virtual paths are shown provisioned through ATM cross-connect 2670 between gateway 2655 and nodes 2675, 2680, 2685, and 2690. Gateway 2605 and gateway 2655 are connected by a virtual path as well. Signaling links are shown interconnecting the various components (as discussed above, the link between the CCM and the gateway could also be a conventional datalink or bus arrangement). Note that cross-connects 2620 and 2670 do not require signaling. They are provisioned and do not need signaling/switching capability on a call-by-call basis.

Gateway 2605 and 2655 have been described above. They modify the VPI/VCIs in ATM cells as instructed by control messages from the CCMs. CCM 2610 and 2660 are described above. They process signaling and select VPI/VCIs on a call by call basis. The selections are provided to the gateways. STPs 2615 and 2665 are known in the art. They route signaling messages. ATM cross-connects 2620 and 2670 are known in the art. They route ATM cells based on a pre-provisioned routing configuration and the VPI/VCI in the cells. Nodes 2625, 2630, 2635, 2640, 2675, 2680, 2685, and 2690 are ATM devices. Any device that transmits or receives ATM cells is contemplated. Some examples are ATM switches, ATM cross-connects, and ATM Customer Premises Equipment (CPE). Some of these nodes may use signaling and some may not need signaling.

In operation for a call from node 2625 to node 2685, node 2625 would recognize that the call did not terminate within network 2600 and would seize a connection to gateway 2655. This connection would be provisioned through cross-connect 2620 and represented by the VPI/VCI in the cell headers. Gateway 2605 is inactive on this call and could even be omitted. It is shown to illustrate the Gateway function could be implemented for calls passing in the other direction. Node 2625 would also transfer an IAM to CCM 2660 identifying the seized VPI/VCI. The IAM would be routed by STP 2615 and STP 2665 to CCM 2660. It is important to note that ATM system 2600 does not know the routing configuration of ATM system 2650.

CCM 2660 will process the IAM from Node 2625 to select a VPI/VCI to node 2685. Gateway 2655 has a provisioned virtual path to node 2685 through cross-connect 2670. CCM 2655 would select an available VCI within that VPI. CCM 2655 would identify both the VPI/VCI from gateway 2605 and the VPI/VCI to node 2685 in a control message to gateway 2655. Using the connection processing system, gateway 2655 would modify the old VPI/VCI to the new VPI/VCI selected by CCM 2655 and transfer the modified cells to cross-connect 2670. Based on its pre-provisioned routing configuration and the VPI/VCI selected by CCM 2655, cross-connect 2670 would transfer these cells to node 2685. If necessary, CCM 2655 would transfer an IAM node 2685 through STP 2665.

It should be appreciated that the above procedure could be repeated for multiple calls between different nodes. This includes calls from network 2650 to network 2600. The CCM, the gateway, and the cross-connect work together to provide SVCs on a call-by-call basis. This accomplished without the cost or complexities of an ATM switch.

After reviewing the above description, those skilled in the art will appreciate possible variations that could be made to the specific examples of the invention disclosed above. In addition to the disclosed examples, the invention encompasses these variations as well. As a result, the invention should not be limited to the specific examples disclosed above, but should only be measured by the following claims.

We claim:

1. A connection processing method wherein there are a plurality of connection identifiers wherein one of the connection identifiers is a first connection identifier that identifies a first connection and wherein another one of the connection identifiers is a second connection identifier that identifies a second connection, wherein there are a plurality of index latches and a plurality of associated indexes wherein one of the indexes is a first index that is associated with a first index latch and wherein another one of the indexes is a second index that is associated with a second index latch, the method comprising:

assigning the first connection identifier to the first index and assigning the second connection identifier to the second index, wherein the first index is associated with the first index latch and the second index is associated with the second index latch;

storing the first connection identifier in the first index latch and storing the second connection identifier in the second index latch, wherein the assignment and storage creates assigned connection identifiers in the first and second index latches;

receiving communications over the first connection and obtaining the first connection identifier;

providing the first connection identifier to each index latch and comparing the first connection identifier to any assigned connection identifiers stored in the index latches;

providing the first index associated with the first index latch in response to the first connection identifier matching the assigned connection identifier stored in the first index latch;

receiving communications over the second connection and obtaining the second connection identifier;

providing the second connection identifier to each index latch and comparing the second connection identifier to any assigned connection identifiers stored in the index latches; and providing the second index associated with the second index latch in response to the second connection identifier matching the assigned connection identifier stored in the second index latch.

2. The method of claim 1 further comprising:

storing a processing instruction for the first connection in a memory location that can be accessed with the first index; and using the first index provided by the first index latch to access the processing instruction in the memory location.

3. The method of claim 2 wherein the processing instruction identifies a virtual connection.

4. The method of claim 2 wherein the processing instruction identifies a VPI/VCI.

5. The method of claim 2 wherein the processing instruction identifies a DS0 connection.

6. The method of claim 2 wherein the processing instruction identifies a Circuit Identification Code (CIC).

7. The method of claim 1 wherein the connection identifiers are virtual connection identifiers.

8. The method of claim 1 wherein the connection identifiers are Virtual Path Identifier/Virtual Path Identifiers (VPI/VCIs).

9. The method of claim 1 wherein the connection identifiers are DS0 identifiers.

10. The method of claim 1 wherein the connection identifiers are Circuit Identification Codes (CICs).

11. The method of claim 1 wherein the indexes are virtual connection identifiers.

12. The method of claim 1 wherein the indexes are Virtual Path Identifier/Virtual Path Identifiers (VPI/VCIs).

13. The method of claim 1 wherein the indexes are DS0 identifiers.

14. The method of claim 1 wherein the indexes are Circuit Identification Codes (CICs).

15. The method of claim 1 further comprising;

receiving write and read instructions wherein addresses in the instructions represent one of the incoming connection register, one of the index latches, or the assigned index register; and decoding the instructions to determine what the address represents to facilitate execution of the instructions.

16. A virtual connection processing method wherein there are a plurality of Virtual Path Identifiers/Virtual Channel Identifiers (VPI/VCIS) wherein one of the VPI/VCIs is a first VPI/VCI that identifies a first virtual connection and wherein another one of the VPI/VCIs is a second VPI/VCI that identifies a second virtual connection, wherein there are a plurality of index latches and a plurality of associated indexes wherein one of the indexes is a first index that is associated with a first index latch and wherein another one of the indexes is a second index that is associated with a second index latch, the method comprising:

assigning the first VPI/VCI to the first index and assigning the second VPI/VCI to the second index, wherein the first index is associated with the first index latch and the second index is associated with the second index latch;

storing the first VPI/VCI in the first index latch and storing the second VPI/VCI in the second index latch, wherein the assignment and storage creates assigned VPI/VCIs in the first and second index latches;

receiving communications over the first virtual connection and obtaining the first VPI/VCI;

providing the first VPI/VCI to each index latch and comparing the first VPI/VCI to any assigned VPI/VCIs stored in the index latches;

providing the first index associated with the first index latch in response to the first VPI/VCI matching the assigned VPI/VCI stored in the first index latch;

receiving communications over the second virtual connection and obtaining the second VPI/VCI;

providing the second VPI/VCI to each index latch and comparing the second VPI/VCI to any assigned VPI/VCIs stored in the index latches; and providing the second index associated with the second index latch in response to the second VPI/VCI matching the assigned VPI/VCI stored in the second index latch.

17. The method of claim 16 further comprising:

storing a processing instruction for the first virtual connection in a memory location that can be accessed with the first index; and using the first index provided by the first index latch to access the processing instruction in the memory location.

18. The method of claim 17 wherein the processing instruction identifies a virtual connection.

19. The method of claim 17 wherein the processing instruction identifies a VPI/VCI.

20. The method of claim 17 wherein the processing instruction identifies a DS0 connection.

21. The method of claim 17 wherein the processing instruction identifies a Circuit Identification Code (CIC).

22. The method of claim 16 wherein the indexes are virtual connection identifiers.

23. The method of claim 16 wherein the indexes are Virtual Path Identifier/Virtual Path Identifiers (VPI/VCIs).

24. The method of claim 16 wherein the indexes are DS0 identifiers.

25. The method of claim 16 wherein the indexes are Circuit Identification Codes (CICs).

26. The method of claim 16 further comprising;

receiving write and read instructions wherein addresses in the instructions represent one of the incoming connection register, one of the index latches, or the assigned index register; and decoding the instructions to determine what the address represents to facilitate execution of the instructions.

27. A DS0 connection processing method wherein there are a plurality of DS0 identifiers wherein one of the DS0 identifiers is a first DS0 identifier that identifies a first DS0 and wherein another one of the DS0 identifiers is a second DS0 identifier that identifies a second DS0, wherein there are a plurality of index latches and a plurality of associated indexes wherein one of the indexes is a first index that is associated with a first index latch and wherein another one of the indexes is a second index that is associated with a second index latch, the method comprising:

assigning the first DS0 identifier to the first index and assigning the second DS0 identifier to the second index, wherein the first index is associated with the first index latch and the second index is associated with the second index latch;

storing the first DS0 identifier in the first index latch and storing the second DS0 identifier in the second index latch, wherein the assignment and storage creates assigned DS0 identifiers in the first and second index latches;

receiving communications over the first DS0 and obtaining the first DS0 identifier;

providing the first DS0 identifier to each index latch and comparing the first DS0 identifier to any assigned DS0 identifiers stored in the index latches;

providing the first index associated with the first index latch in response to the first DS0 identifier matching the assigned DS0 identifier stored in the first index latch;

receiving communications over the second DS0 and obtaining the second DS0 identifier;

providing the second DS0 identifier to each index latch and comparing the second DS0 identifier to any assigned DS0 identifiers stored in the index latches; and providing the second index associated with the second index latch in response to the second DS0 identifier matching the assigned DS0 identifier stored in the second index latch.

28. The method of claim 27 further comprising:

storing a processing instruction for the first DS0 in a memory location that can be accessed with the first index; and using the first index provided by the first index latch to access the processing instruction in the memory location.

29. The method of claim 28 wherein the processing instruction identifies a virtual connection.

30. The method of claim 28 wherein the processing instruction identifies a VPI/VCI.

31. The method of claim 28 wherein the processing instruction identifies a DS0 connection.

32. The method of claim 28 wherein the processing instruction identifies a Circuit Identification Code (CIC).

33. The method of claim 27 wherein the DS0 identifiers are Circuit Identification Codes (CICs).

34. The method of claim 27 wherein the indexes are virtual connection identifiers.

35. The method of claim 27 wherein the indexes are Virtual Path Identifier/Virtual Path Identifiers (VPI/VCIs).

36. The method of claim 27 wherein the indexes are DS0 identifiers.

37. The method of claim 27 wherein the indexes are Circuit Identification Codes (CICs).

38. The method of claim 27 further comprising:

receiving write and read instructions wherein addresses in the instructions represent one of the incoming connection register, one of the index latches, or the assigned index register; and decoding the instructions to determine what the address represents to facilitate execution of the instructions.

39. A system for processing connection identifiers for connections wherein the connection identifiers are assigned to indexes to create assigned connection identifiers and corresponding assigned indexes, and wherein the connections are identified by incoming connection identifiers when incoming communications from the connections are received by the system, the system comprising:

a plurality of index latches that are each associated with one of the indexes and that are each operational to receive and store one of the assigned connection identifiers, to receive and compare the incoming connection identifiers with the stored assigned connection identifier, and to produce the associated index if one of the incoming connection identifiers matches the stored assigned connection identifier;

an incoming connection register that is connected to each index latch and that is operational to receive the incoming connection identifiers and provide them to each index latch; and an assigned index register that is connected to each index latch and that is operational to receive the associated indexes from the index latches.

40. The system of claim 39 that further comprises:

a microprocessor that is operational to provide write and read instructions that comprise first instructions to write the assigned connection identifiers to addresses that represent the index latches that are associated with the assigned indexes, a second instruction to write the incoming connection identifier to an address that represents the incoming connection identifier register, and a third instruction to read the assigned index from an address that represents the assigned index register; and an address decoder that is operational to receive the first instructions and to provide the assigned connection identifiers to the index latches that are associated with the assigned indexes, to receive the second instruction and to provide the incoming connection identifier to the incoming connection register, and to receive the third instruction and to provide the assigned index to the microprocessor from the assigned index register.

41. A method of operating a telecommunications system to provide a call with a virtual connection wherein a user transmits user information to the telecommunications system over a particular connection for the call and sends signaling for the call to the telecommunications system, wherein the system comprises an ATM interworking multiplexer and a signaling processor coupled to the ATM interworking multiplexer, the method comprising:

receiving the signaling for the call into the signaling processor;

processing the signaling for the call in the signaling processor to select the virtual connection;

generating a control message in the signaling processor that contains a particular connection identifier and a selected virtual connection identifier;

transmitting the control message to the ATM interworking multiplexer;

storing the virtual connection identifier in a memory location that can be accessed with an index;

storing the particular connection identifier in a particular index latch associated with the index;

receiving the user information for the call from the particular connection into the ATM interworking multiplexer, and as a result, providing the particular connection identifier to a plurality of index latches that includes the particular index latch;

providing the index from the particular index latch when the particular connection identifier matches the particular connection identifier previously stored in the particular index latch;

using the index to access the virtual connection identifier from the memory location;

converting the user information from the particular connection into ATM cells that identify the virtual connection; and transmitting the ATM cells from the ATM interworking multiplexer over the virtual connection.

42. A method of operating an ATM interworking multiplexer to provide a call with a virtual connection wherein a user transmits user information to the telecommunications system over a particular connection for the call and sends signaling for the call to the telecommunications system, wherein the telecommunications system comprises an ATM interworking multiplexer, and wherein the telecommunications system provides a control message that contains a particular connection identifier and a selected virtual connection identifier for the call to the ATM interworking multiplexer, the method comprising:

receiving the control message for the call into the ATM interworking multiplexer;

storing the virtual connection identifier in a memory location that can be accessed with an index;

storing the particular connection identifier in a particular index latch associated with the index;

receiving the user information for the call from the particular connection into the ATM interworking multiplexer, and as a result, providing the particular connection identifier to a plurality of index latches that includes the particular index latch;

providing the index from the particular index latch when the particular connection identifier matches the particular connection identifier previously stored in the particular index latch;

using the index to access the virtual connection identifier from the memory location;

placing the user information from the particular connection into ATM cells that identify the virtual connection; and transmitting the ATM cells from the ATM interworking multiplexer over the virtual connection.

43. A telecommunications system to provide a call received over a particular connection with a virtual connection in response to signaling for the call, the system comprising:

a signaling processor operable to receive and process the signaling for the call to select the virtual connection for the call, and to generate and transmit a control message that contains a particular connection identifier and a selected virtual connection identifier for the call; and an ATM interworking multiplexer operable to receive the control message, to store the virtual connection identifier in a memory location that can be accessed with an index, to store the particular connection identifier in a particular index latch associated with the index, to receive the user information from the particular connection, and as a result, to provide the particular connection identifier to a plurality of index latches that includes the particular index latch, to provide the index from the particular index latch when the particular connection identifier matches the particular connection identifier previously stored in the particular index latch, to use the index to access the virtual connection identifier from the memory location, to convert the user information into ATM cells that identify the virtual connection, and to transmit the ATM cells from the ATM interworking multiplexer over the virtual connection.

44. An ATM interworking multiplexer for providing calls with virtual connections in response to a control message for each of the calls, the multiplexer comprising:

an access interface operable to receive user information for each call from a particular connection for that call;

a control interface operable to receive the control message for each call that contains a particular connection identifier and a selected virtual connection identifier for that call;

an ATM adaption processor coupled to the access interface and the control interface and operable to receive the control message, to store the virtual connection identifier in a memory location that can be accessed with an index, to store the particular connection identifier in a particular index latch associated with the index, to receive the user information from the particular connection, and as a result, to provide the particular connection identifier to a plurality of index latches that includes the particular index latch, to provide the index from the particular index latch when the particular connection identifier matches the particular connection identifier previously stored in the particular index latch, to use the index to access the virtual connection identifier from the memory location, and to convert the user information into ATM cells that identify the virtual connection; and an ATM interface coupled to the ATM adaption processor and operable to transmit the ATM cells for each call over the virtual connection for that call.

45. A method of operating a telecommunications system to provide a call with a particular connection wherein user information is transmitted over a virtual connection, and wherein the system comprises an ATM interworking multiplexer and a signaling processor coupled to the ATM interworking multiplexer, the method comprising:

receiving signaling for the call into the signaling processor;

processing the signaling for the call in the signaling processor to select the particular connection;

generating a control message in the signaling processor that contains a selected particular connection identifier and a virtual connection identifier for the call;

transmitting the control message to the ATM interworking multiplexer;

storing the particular connection identifier in a memory location that can be accessed with an index;

storing the virtual connection identifier in a particular index latch associated with the index;

receiving the user information for the call from the virtual connection into the ATM interworking multiplexer, and as a result, providing the virtual connection identifier to a plurality of index latches that includes the particular index latch;

providing the index from the particular index latch when the virtual connection identifier matches the virtual connection identifier previously stored in the particular index latch;

using the index to access the particular connection identifier from the memory location;

converting the user information from the virtual connection into a format suitable for the particular connection; and transmitting the user information from the ATM interworking multiplexer over the particular connection.

46. A method of operating an ATM interworking multiplexer to provide a call with a particular connection wherein user information is transmitted over a virtual connection for the call, wherein the telecommunications system comprises an ATM interworking multiplexer, and wherein the telecommunications system provides a control message that contains a selected particular connection identifier and a virtual connection identifier for the call;

receiving the control message for the call into the ATM interworking multiplexer;

storing the particular connection identifier in a memory location that can be accessed with an index;

storing the virtual connection identifier in a particular index latch associated with the index;

receiving the user information for the call from the virtual connection into the ATM interworking multiplexer, and as a result, providing the virtual connection identifier to a plurality of index latches that includes the particular index latch;

providing the index from the particular index latch when the virtual connection identifier matches the virtual connection identifier previously stored in the particular index latch;

using the index to access the particular connection identifier from the memory location;

converting the user information from the virtual connection into a format suitable for the particular connection; and transmitting the user information from the ATM interworking multiplexer over the particular connection.

47. A telecommunications system to provide a call transmitted on a virtual connection with a particular connection in response to signaling for the call, the system comprising:

a signaling processor operable to receive and process the signaling for the call to select the particular connection for the call, and to generate and transmit a control message that contains a selected particular connection identifier and a virtual connection identifier; and an ATM interworking multiplexer operable to receive the control message, to store the particular connection in a memory location that can be accessed with an index, to store the virtual connection identifier in a particular index latch associated with the index, to receive the user information from the virtual connection, and as a result, to provide the virtual connection identifier to a plurality of index latches that includes the particular index latch, to provide the index from the particular index latch when the virtual connection identifier matches the virtual connection identifier previously stored in the particular index latch, to use the index to access the particular connection identifier from the memory location, to convert the user information into a format suitable for the particular connection, and to transmit the user information from the ATM interworking multiplexer over the particular connection.

48. An ATM interworking multiplexer for providing calls with particular connections in response to a control message for each of the calls, the multiplexer comprising:

an ATM interface operable to receive user information for each call from a virtual connection for that call;

a control interface operable to receive the control message for each call that contains a selected particular connection identifier and a virtual connection identifier;

an ATM adaption processor coupled to the access interface and the control interface and operable to receive the control message, to store the particular connection identifier in a memory location that can be accessed with an index, to store the virtual connection identifier in a particular index latch associated with the index, to receive the user information from the virtual connection, and as a result, to provide the virtual connection identifier to a plurality of index latches that includes the particular index latch, to provide the index from the particular index latch when the virtual connection identifier matches the virtual connection identifier previously stored in the particular index latch, to use the index to access the particular connection from the memory location, to convert the user information into a format suitable for the particular connection; and a connection interface coupled to the ATM adaption processor and operable to transmit the user information from the ATM interworking multiplexer over the particular connection for each call.

* * * * *